(12) United States Patent
Wellington et al.

(10) Patent No.: US 8,268,164 B2
(45) Date of Patent: *Sep. 18, 2012

(54) SYSTEMS AND METHODS OF PRODUCING A CRUDE PRODUCT

(75) Inventors: Scott Lee Wellington, Bellaire, TX (US); Stanley Nemec Milam, Houston, TX (US)

(73) Assignee: Shell Oil Company, Houston, TX (US)

( * ) Notice: Subject to any disclaimer, the term of this patent is extended or adjusted under 35 U.S.C. 154(b) by 929 days.

This patent is subject to a terminal disclaimer.

(21) Appl. No.: 12/119,230

(22) Filed: May 12, 2008

(65) Prior Publication Data

US 2008/0245701 A1  Oct. 9, 2008

Related U.S. Application Data

(62) Division of application No. 11/013,995, filed on Dec. 16, 2004, now Pat. No. 7,402,547.

(60) Provisional application No. 60/531,506, filed on Dec. 19, 2003, provisional application No. 60/618,814, filed on Oct. 14, 2004.

(51) Int. Cl.
*C10M 101/02* (2006.01)
*C10L 1/00* (2006.01)

(52) U.S. Cl. ........ 208/15; 208/14; 208/16; 208/17; 585/14; 44/300

(58) Field of Classification Search .......... 208/15, 208/16, 17
See application file for complete search history.

(56) References Cited

U.S. PATENT DOCUMENTS

| | | | |
|---|---|---|---|
| 1,111,580 | A | 9/1914 | Herber |
| 2,362,670 | A | 11/1944 | Schulze |
| 2,559,325 | A | 7/1951 | Spillane |
| 2,652,319 | A | 9/1953 | Sweetser et al. |
| 2,738,307 | A | 3/1956 | Beckberger |
| 2,854,496 | A | 9/1958 | Wright |
| 3,051,645 | A | 8/1962 | Wilson et al. |
| 3,080,435 | A | 8/1962 | Nager |
| 3,081,256 | A | 3/1963 | Hendal et al. |
| 3,136,714 | A | 6/1964 | Gibson et al. |
| 3,139,398 | A | 6/1964 | Bray et al. |
| 3,164,545 | A | 1/1965 | Mattox |
| 3,179,584 | A | 4/1965 | Hamner et al. |
| 3,252,773 | A | 5/1966 | Solomon et al. |

(Continued)

FOREIGN PATENT DOCUMENTS

CA  1121293  4/1982

(Continued)

OTHER PUBLICATIONS

"Refining Processes 2000", Hydrocarbon Processing, Gulf Publishing Co., Houston, Texas, 2000, pp. 87-142.

(Continued)

*Primary Examiner* — Ellen McAvoy

(57) ABSTRACT

The present invention is directed to a crude product composition. The crude product has, per gram of crude product: at least 0.001 grams of naphtha, the naphtha having an octane number of at least 70, and the naphtha having at most 0.15 grams of olefins per gram of naphtha; at least 0.001 grams of kerosene, the kerosene having at least 0.2 grams of aromatics per gram of kerosene and a freezing point at a temperature of at most −30° C.; and at most 0.05 grams of residue.

10 Claims, 9 Drawing Sheets

U.S. PATENT DOCUMENTS

| | | | |
|---|---|---|---|
| 3,387,054 A | 6/1968 | Schuman |
| 3,417,029 A | 12/1968 | McMahon |
| 3,553,279 A | 1/1971 | Bawa |
| 3,558,474 A | 1/1971 | Gleim et al. |
| 3,622,495 A | 11/1971 | Gatsis et al. |
| 3,663,431 A | 5/1972 | Wagner |
| 3,677,932 A | 7/1972 | Hardesty et al. |
| 3,679,577 A | 7/1972 | Wantland et al. |
| 3,714,031 A | 1/1973 | Van der Toorn et al. |
| 3,715,303 A | 2/1973 | Wennerberg et al. |
| 3,716,478 A | 2/1973 | Kodera et al. |
| 3,716,479 A | 2/1973 | Weisz et al. |
| 3,740,193 A | 6/1973 | Aldridge et al. |
| 3,745,109 A | 7/1973 | Heredy et al. |
| 3,759,677 A | 9/1973 | White |
| 3,765,851 A | 10/1973 | White |
| 3,766,054 A | 10/1973 | Weisz et al. |
| 3,786,138 A | 1/1974 | Shalit et al. |
| 3,803,023 A | 4/1974 | Hamner |
| 3,812,028 A | 5/1974 | Wennerberg et al. |
| 3,816,298 A | 6/1974 | Aldridge |
| 3,841,981 A | 10/1974 | Layng |
| 3,847,797 A | 11/1974 | Pasternak et al. |
| 3,849,242 A | 11/1974 | Takeya et al. |
| 3,862,025 A | 1/1975 | Steele et al. |
| 3,876,532 A | 4/1975 | Plundo et al. |
| 3,887,455 A | 6/1975 | Hamner et al. |
| 3,890,432 A | 6/1975 | White |
| 3,901,792 A | 8/1975 | Wolk et al. |
| 3,923,635 A | 12/1975 | Schulman et al. |
| 3,948,759 A | 4/1976 | King et al. |
| 3,957,620 A | 5/1976 | Fukui et al. |
| 3,960,706 A | 6/1976 | McCollum et al. |
| 3,960,708 A | 6/1976 | McCollum et al. |
| 4,003,823 A | 1/1977 | Baird, Jr. et al. |
| 4,003,824 A | 1/1977 | Baird, Jr. et al. |
| 4,007,109 A | 2/1977 | Baird, Jr. et al. |
| 4,017,379 A | 4/1977 | Iida et al. |
| 4,051,015 A | 9/1977 | Bearden, Jr. et al. |
| 4,067,799 A | 1/1978 | Bearden, Jr. et al. |
| 4,087,348 A | 5/1978 | Baird, Jr. et al. |
| 4,087,349 A | 5/1978 | Baird, Jr. |
| 4,115,324 A | 9/1978 | Ozaki et al. |
| 4,119,528 A | 10/1978 | Baird, Jr. et al. |
| 4,127,470 A | 11/1978 | Baird, Jr. et al. |
| 4,212,729 A | 7/1980 | Hensley, Jr. et al. |
| 4,214,977 A | 7/1980 | Ranganathan et al. |
| 4,224,140 A | 9/1980 | Fujimori et al. |
| 4,231,858 A | 11/1980 | Seitzer et al. |
| 4,256,654 A | 3/1981 | Schlinger et al. |
| 4,271,042 A | 6/1981 | Oleck et al. |
| 4,276,153 A | 6/1981 | Yoshitake et al. |
| 4,313,818 A | 2/1982 | Aldridge et al. |
| 4,336,034 A | 6/1982 | Lang et al. |
| 4,357,229 A | 11/1982 | Bearden, Jr. et al. |
| 4,376,037 A | 3/1983 | Dahlberg et al. |
| 4,389,301 A | 6/1983 | Dahlberg et al. |
| 4,424,110 A | 1/1984 | Bearden, Jr. et al. |
| 4,427,535 A | 1/1984 | Nongbri et al. |
| 4,437,980 A | 3/1984 | Heredy et al. |
| 4,438,218 A | 3/1984 | Boorman et al. |
| 4,460,707 A | 7/1984 | Simpson |
| 4,473,462 A | 9/1984 | Swanson |
| 4,498,979 A | 2/1985 | Eberly, Jr. |
| 4,500,323 A | 2/1985 | Siegfried et al. |
| 4,541,841 A | 9/1985 | Reinhardt |
| 4,564,439 A | 1/1986 | Kuehler et al. |
| 4,591,426 A | 5/1986 | Krasuk et al. |
| 4,609,456 A | 9/1986 | Deschamps et al. |
| 4,626,412 A | 12/1986 | Ebner et al. |
| 4,659,454 A | 4/1987 | Verghese et al. |
| 4,661,265 A | 4/1987 | Olson et al. |
| 4,665,261 A | 5/1987 | Mazurek |
| 4,666,878 A | 5/1987 | Jacobson et al. |
| 4,810,365 A | 3/1989 | Dohler et al. |
| 4,886,594 A | 12/1989 | Miller |
| 4,917,789 A | 4/1990 | Butler et al. |
| 4,937,218 A | 6/1990 | Ramirez de Aqudelo et al. |
| 4,937,221 A | 6/1990 | Erekson et al. |
| 4,941,966 A | 7/1990 | Merz et al. |
| 4,945,078 A | 7/1990 | Erekson et al. |
| 4,954,473 A | 9/1990 | Gatsis |
| 4,956,327 A | 9/1990 | Erekson et al. |
| 4,963,247 A | 10/1990 | Belinko et al. |
| 4,976,848 A | 12/1990 | Johnson |
| 5,039,489 A | 8/1991 | Gleaves et al. |
| 5,064,523 A | 11/1991 | Kretschmar et al. |
| 5,108,581 A | 4/1992 | Aldridge et al. |
| 5,124,024 A | 6/1992 | Krzywicki et al. |
| 5,164,078 A | 11/1992 | Hung et al. |
| 5,166,118 A | 11/1992 | Kretschmar et al. |
| 5,264,183 A | 11/1993 | Ebner et al. |
| 5,279,801 A | 1/1994 | Colombet et al. |
| 5,288,681 A | 2/1994 | Gatsis |
| 5,296,130 A | 3/1994 | Kriz et al. |
| 5,300,217 A | 4/1994 | Simpson et al. |
| 5,316,996 A | 5/1994 | Itoh |
| 5,320,741 A | 6/1994 | Johnson et al. |
| 5,358,629 A | 10/1994 | Tamalis et al. |
| 5,374,348 A | 12/1994 | Sears et al. |
| 5,382,349 A | 1/1995 | Yoshita et al. |
| 5,468,372 A | 11/1995 | Seamans et al. |
| 5,474,977 A | 12/1995 | Gatsis |
| 5,529,968 A | 6/1996 | Sudhakar et al. |
| 5,620,592 A | 4/1997 | Threlkel |
| 5,688,736 A | 11/1997 | Seamans et al. |
| 5,744,025 A | 4/1998 | Boon et al. |
| 5,817,229 A | 10/1998 | Sudhakar et al. |
| 5,847,249 A | 12/1998 | Maraschino |
| 5,851,381 A | 12/1998 | Tanaka et al. |
| 5,871,636 A | 2/1999 | Trachte et al. |
| 5,885,441 A | 3/1999 | Pereira et al. |
| 5,897,769 A | 4/1999 | Trachte et al. |
| 5,914,030 A | 6/1999 | Bearden et al. |
| 5,928,497 A | 7/1999 | Iaccino |
| 5,928,501 A | 7/1999 | Sudhakar et al. |
| 5,928,502 A | 7/1999 | Bearden et al. |
| 5,961,815 A | 10/1999 | Hickey et al. |
| 6,063,266 A | 5/2000 | Grande et al. |
| 6,136,179 A | 10/2000 | Sherwood, Jr. et al. |
| 6,149,799 A | 11/2000 | Raybaud et al. |
| 6,203,313 B1 | 3/2001 | Holmes et al. |
| 6,203,695 B1 | 3/2001 | Harle et al. |
| 6,210,564 B1 | 4/2001 | Brons et al. |
| 6,218,333 B1 | 4/2001 | Gabrielov et al. |
| 6,277,269 B1 | 8/2001 | Myers et al. |
| 6,290,841 B1 | 9/2001 | Gabrielov et al. |
| 6,342,152 B1 | 1/2002 | Yoshita |
| 6,454,932 B1 | 9/2002 | Baldassari et al. |
| 6,509,291 B2 | 1/2003 | Eijsbouts |
| 6,524,469 B1 | 2/2003 | Schucker |
| 6,547,957 B1 | 4/2003 | Sudhakar et al. |
| 6,582,590 B1 | 6/2003 | Riley et al. |
| 6,620,313 B1 | 9/2003 | Demmin et al. |
| 6,635,599 B1 | 10/2003 | Eijsbouts et al. |
| 6,652,738 B2 | 11/2003 | Eijsbouts et al. |
| 6,776,897 B2 * | 8/2004 | Bacha et al. .................... 208/14 |
| 6,972,084 B1 * | 12/2005 | Nakashima et al. ............. 208/15 |
| 7,179,364 B2 * | 2/2007 | O'Rear et al. ................... 208/15 |
| 7,311,814 B2 * | 12/2007 | Guyomar et al. .............. 208/108 |
| 7,402,547 B2 * | 7/2008 | Wellington et al. ............ 502/222 |
| 7,431,821 B2 * | 10/2008 | O'Rear et al. ................... 208/14 |
| 7,479,168 B2 * | 1/2009 | O'Rear et al. ................... 44/412 |
| 7,692,049 B2 * | 4/2010 | Kuechler et al. .................... 585/1 |
| 7,811,445 B2 * | 10/2010 | Wellington et al. ............. 208/14 |
| 7,828,958 B2 * | 11/2010 | Wellington et al. ............. 208/14 |
| 2002/0056664 A1 | 5/2002 | Chabot |
| 2002/0070147 A1 | 6/2002 | Sonnemans et al. |
| 2002/0155045 A1 | 10/2002 | Kumagai et al. |
| 2003/0000867 A1 | 1/2003 | Reynolds |
| 2003/0024854 A1 | 2/2003 | Wen et al. |
| 2003/0042174 A1 | 3/2003 | Austin |
| 2003/0062163 A1 | 4/2003 | Moulton et al. |
| 2003/0070808 A1 | 4/2003 | Allison |
| 2003/0070963 A1 | 4/2003 | Zimmermann et al. |
| 2003/0085155 A1 | 5/2003 | Chabot |
| 2003/0111391 A1 | 6/2003 | Bhan |

| | | |
|---|---|---|
| 2003/0130118 A1 | 7/2003 | Koyama et al. |
| 2003/0149317 A1 | 8/2003 | Rendina |
| 2003/0150778 A1 | 8/2003 | Haluska et al. |
| 2003/0170873 A1 | 9/2003 | Ranson et al. |
| 2003/0170874 A1 | 9/2003 | Ranson et al. |
| 2003/0196884 A1 | 10/2003 | Dell'Orfano |

FOREIGN PATENT DOCUMENTS

| | | |
|---|---|---|
| CA | 1195639 | 10/1985 |
| DE | 2558505 | 11/1976 |
| DE | 2530600 | 1/1977 |
| EP | 0024104 B1 | 3/1983 |
| EP | 0429132 | 5/1991 |
| EP | 0318125 | 6/1992 |
| EP | 286206 | 1/1993 |
| EP | 0400743 | 8/1994 |
| EP | 0721917 | 7/1996 |
| EP | 1153107 | 4/2003 |
| EP | 1397130 | 3/2004 |
| FR | 2780307 A1 | 12/1999 |
| GB | 0306050 A1 | 2/1929 |
| GB | 400743 | 11/1933 |
| GB | 1310283 | 3/1973 |
| GB | 1405664 | 9/1975 |
| GB | 2120675 | 12/1983 |
| JP | 54-107906 | 8/1979 |
| JP | 56118490 | 9/1981 |
| JP | 2002-129171 | 5/2002 |
| RU | 2186090 | 7/2002 |
| WO | WO00/18854 | 4/2000 |
| WO | WO02/33029 | 4/2002 |
| WO | WO02/086022 | 10/2002 |
| WO | WO03/042333 | 5/2003 |
| WO | WO2005066302 | 7/2005 |

OTHER PUBLICATIONS

Brauer, ed. Handbook of Preparative Inorganic Chemistry, vol. 2., Second Edition, Academic Press Inc., New York, N.Y., 1965, p. 1507.
Nickless, ed., Inorganic Sulfur Chemistry, Elsevier, Amsterdam, 1968, pp. 669-747.
Heithaus, "Measurement and Significance of Asphaltene Peptization," Jounal of the Institute of Petroleum, 1962, vol. 48(458) pp. 45-53.
U.S. Appl. No. 11/014,297, filed Dec. 16, 2004.
U.S. Appl. No. 11/014,004, filed Dec. 16, 2004.
U.S. Appl. No. 11/013,999, filed Dec. 16, 2004.
U.S. Appl. No. 11/014,281, filed Dec. 16, 2004.
U.S. Appl. No. 11/013,995, filed Dec. 16, 2004.
U.S. Appl. No. 11/013,904, filed Dec. 16, 2004.
U.S. Appl. No. 11/013,952, filed Dec. 16, 2004.
U.S. Appl. No. 11/425,992, filed Dec. 16, 2004.
U.S. Appl. No. 11/014,381, filed Dec. 16, 2004.
U.S. Appl. No. 11/014,346, filed Dec. 16, 2004.
U.S. Appl. No. 11/014,028, filed Dec. 16, 2004.
U.S. Appl. No. 11/013,826, filed Dec. 16, 2004.
U.S. Appl. No. 11/013,622, filed Dec. 16, 2004.

* cited by examiner

| TABLE 2 | | |
|---|---|---|
| Weight Percentage of Hydrocarbon Components in Crude Feed and Non-Condensable Hydrocarbons Produced at 8000 $Nm^3/m^3$ Using the TMS Catalyst | | |
| Component | Crude Feed | Non-Condensable Hydrocarbons |
| Example | 2 | 2 |
| Methane, wt% | 0 | 26.9 |
| Ethane, wt% | 0 | 19 |
| Ethylene, wt% | 0 | 1.5 |
| Propane, wt% | 0 | 18.9 |
| Propylene, wt% | 0 | 5 |
| n-Butane, wt% | 0 | 14.4 |
| Iso-butane, wt% | 0 | 2.8 |

TABLE 1

| Property | Crude Feed | Crude Product | Crude Product |
|---|---|---|---|
| Example | | 2 | 4 |
| Ratio of hydrogen to crude feed, $Nm^3/m^3$ | ---- | 8000 | 16000 |
| Hydrogen Content, wt% | 10.6 | 11.6 | 11.5 |
| Carbon Content, wt% | 84.3 | 86 | 85.9 |
| H/C ratio | 1.5 | 1.6 | 1.6 |
| Oxygen Content, wt% | 0.5 | ---- | ---- |
| Nitrogen Content, wt% | 0.4 | 0.3 | 0.3 |
| Sulfur Content, wt% | 4.1 | 1.8 | 2.0 |
| Nickel Content, wtppm | 63.6 | <1 | <2 |
| Vanadium Content, wtppm | 149 | <1 | <1 |
| Iron Content, wtppm | 7.3 | <1 | <1 |
| Micro-Carbon Residue, wt% | 13.73 | * | * |
| $C_5$ Asphaltenes, wt% | 18.72 | * | * |
| TAN | 1.1 | <03/12 | <0.1 |
| Density at 15.56 °C (60 °F), $g/cm^3$ | 1.0034 | 0.916 | 0.9301 |
| API Gravity at 15.56 °C (60 °F) | 9.38 | 22.82 | 20.6 |
| Viscosity, Pa·s (cP) | 21.7 (21,725) @ 37.8 °C (100 °F) | 0.008 (7.9) @ 40 °C (104 °F) | 0.017 (17.2) @ 40 °C (104 °F) |
| Boiling Range Distribution | ASTM D5307 °C (°F) | ASTM D2887 °C (°F) | ASTM D2887 °C (°F) |
| IBP | 207 (405) | 54 (129) | 97 (206) |
| 5% | 302 (576) | 128 (262) | 187 (369) |
| 10% | 336 (636) | 178 (353) | 238 (461) |
| 15% | 363 (683) | 222 (431) | 273 (524) |
| 30% | 422 (792) | 301 (574) | 342 (647) |
| 50% | 496 (925) | 364 (687) | 402 (756) |
| 60% | 537 (999) | 391 (736) | 427 (801) |
| 70% | >538 (1000) | 417 (783) | 452 (845) |
| 90% | >538 (1000) | 480 (896) | 506 (942) |
| 95% | >538 (1000) | 505 (941) | 527 (980) |
| Final Boiling Point | >538 (1000) | 553 (1028) | 581 (1078) |
| Weight Percentage of Components in Crude Feed and Crude Product (ASTM D2892 and D5236) | | | |
| Component | Crude Feed | Crude Product | Crude Product |
| Naptha Components wt% | 0.14 | 11.8 | 7.5 |
| Kerosene Components wt% | 0.80 | 8.4 | 7.7 |
| Diesel Components wt% | 6.42 | 20.7 | 18.8 |
| Distillate Components wt%, (kerosene plus diesel) | 7.20 | 29.1 | 26.5 |
| VGO Component, wt% | 38.7 | 55.6 | 61.1 |
| Residue, wt% | 53.8 | 2.8 | 4.4 |
| Coke, wt% | Not detected | Not detected | Not detected |

FIG. 8

Table 3

| Example | 2 | | | | 4 | | | |
|---|---|---|---|---|---|---|---|---|
| Ratio of hydrogen to crude feed, Nm³/m³ | 8000 | | | | 16000 | | | |
| | Naphtha | Kerosene | Diesel | VGO | Naphtha | Kerosene | Diesel | VGO |
| Hydrogen Content, wt% | 13.88 | 12.19 | 11.75 | 11.01 | 13.54 | 12.18 | 11.78 | 11.08 |
| Carbon Content, wt% | 85.2 | 85.1 | 85.77 | 86.41 | 85.34 | 85.01 | 85.54 | 86.21 |
| Nitrogen Content, wt% | 0.12 | 0.17 | 0.19 | 0.42 | 0.17 | 0.16 | 0.16 | 0.40 |
| Sulfur Content | 0.65 | 2.38 | 2.13 | 1.87 | 0.95 | 2.46 | 2.25 | 2.01 |
| n-Paraffins, wt% | 20.5 | | | | 17.4 | | | |
| Isoparaffins, wt% | 25.4 | | | | 22.1 | | | |
| Olefins, wt% | 7.8 | Non-Aromatic 62.6 | Non-Aromatic 52.0 | Non-Aromatic 43.3 | 4.8 | Non-Aromatic 62.5 | Non-Aromatic 50.1 | Non-Aromatic 37.8 |
| Naphthenes, wt% | 16.7 | | | | 13.4 | | | |
| C₁₄+, wt% | 0.1 | | | | 0.1 | | | |
| Other components, wt% | 9.9 | | | | 18.6 | | | |
| Multi-substituted aromatics, wt% | 13.2 | --- | --- | --- | 16.1 | --- | --- | --- |
| Monocyclic ring Aromatics, wt% | 19.5 | 23.9 | --- | --- | 22.7 | 23.8 | --- | --- |
| Benzene, wt% | 0.3 | --- | --- | --- | 0.12 | --- | --- | --- |
| Polyaromatic, wt% | 0.3 | 13.5 | --- | --- | 0.8 | 13.7 | --- | --- |
| Total Aromatics, wt% | 19.7 | 37.4 | 48.0 | 56.7 | 23.5 | 37.5 | 49.9 | 62.3 |
| Freezing Point, °C | | -43.4 | | | | -39.5 | | |
| Octane Number | 74.9 | | | | 80.4 | | | |

FIG. 10

Table 4

| Example Number | Catalyst | Contacting Temperature, °C | Steam, flow rate, g/min | H₂ flow rate at 0.1 MPa, cm³/min | Crude Product, wt% | Gas Produced, wt% | Coke Produced, wt% | Sulfur Content in Crude Product, wt% | Atomic H/C in Crude Product |
|---|---|---|---|---|---|---|---|---|---|
| 17 | K₂CO₃/Rb₂CO₃/Cs₂CO₃ | 375 | 0.4 | 250 | 79 | 2 | 17 | 1 | 1.8 |
| 18 | K₂CO₃/Rb₂CO₃/Cs₂CO₃ | 500 to 600 | 0 at 500 °C; 0.4 at 600 °C | 250 | 85 | 5 | 9 | 0.8 | 1.8 |
| 19 | CaCO₃ | 500 | 0.4 | 250 | 82 | 9 | 9 | >1 | 1.7 |
| 20 | SiC | 500 | 0 | 250 | 53 | 25 | 22 | 3.6 | 1.5 |

SYSTEMS AND METHODS OF PRODUCING A CRUDE PRODUCT

PRIORITY CLAIM

This application is a divisional of U.S. patent application Ser. No. 11/013,995 entitled "SYSTEMS AND METHODS FOR PRODUCING A CRUDE PRODUCT" filed on Dec. 16, 2004, now U.S. Pat. No. 7,402,547 which claimed priority from Provisional Patent Application No. 60/531,506 entitled "METHODS OF PREPARING IMPROVED CRUDE FEED" filed on Dec. 19, 2003, and Provisional Patent Application No. 60/618,814 entitled "SYSTEMS AND METHODS OF PRODUCING A CRUDE PRODUCT" filed on Oct. 14, 2004.

FIELD OF THE INVENTION

The present invention generally relates to systems and methods for treating crude feed, and to compositions that are produced, for example, using such systems and methods. More particularly, embodiments described herein relate to systems and methods for conversion of a crude feed that has a residue content of at least 0.2 grams of residue per gram of crude feed to a crude product that is (a) a liquid mixture at 25° C. and 0.101 MPa, and (b) has one or more properties that are improved in comparison to the same properties of the crude feed.

DESCRIPTION OF RELATED ART

Crudes that have one or more unsuitable properties that do not allow the crudes to be economically transported, or processed using conventional facilities, are commonly referred to as "disadvantaged crudes".

Disadvantaged crudes often contain relatively high levels of residue. Such crudes tend to be difficult and expensive to transport and/or process using conventional facilities. High residue crudes may be treated at high temperatures to convert the crude to coke. Alternatively, high residue crudes are typically treated with water at high temperatures to produce less viscous crudes and/or crude mixtures. During processing, water removal from the less viscous crudes and/or crude mixtures may be difficult using conventional means.

Disadvantaged crudes may include hydrogen deficient hydrocarbons. When processing of hydrogen deficient hydrocarbons, consistent quantities of hydrogen generally need to be added, particularly if unsaturated fragments resulting from cracking processes are produced. Hydrogenation during processing, which typically involves the use of an active hydrogenation catalyst, may be needed to inhibit unsaturated fragments from forming coke. Hydrogen is costly to produce and/or costly to transport to treatment facilities.

Coke may form and/or deposit on catalyst surfaces at a rapid rate during processing of disadvantaged crudes. It may be costly to regenerate the catalytic activity of a catalyst contaminated by coke. High temperatures used during regeneration may also diminish the activity of the catalyst and/or cause the catalyst to deteriorate.

Disadvantaged crudes may include acidic components that contribute to the total acid number ("TAN") of the crude feed. Disadvantaged crudes with a relatively high TAN may contribute to corrosion of metal components during transporting and/or processing of the disadvantaged crudes. Removal of acidic components from disadvantaged crudes may involve chemically neutralizing acidic components with various bases. Alternately, corrosion-resistant metals may be used in transportation equipment and/or processing equipment. The use of corrosion-resistant metal often involves significant expense, and thus, the use of corrosion-resistant metal in existing equipment may not be desirable. Another method to inhibit corrosion may involve addition of corrosion inhibitors to disadvantaged crudes before transporting and/or processing of the disadvantaged crudes. The use of corrosion inhibitors may negatively affect equipment used to process the crudes and/or the quality of products produced from the crudes.

Disadvantaged crudes may contain relatively high amounts of metal contaminants, for example, nickel, vanadium, and/or iron. During processing of such crudes, metal contaminants, and/or compounds of metal contaminants, may deposit on a surface of the catalyst or the void volume of the catalyst. Such deposits may cause a decline in the activity of the catalyst.

Disadvantaged crudes often include organically bound heteroatoms (for example, sulfur, oxygen, and nitrogen). Organically bound heteroatoms may, in some situations, have an adverse effect on catalysts. Alkali metal salts and/or alkaline-earth metal salts have been used in processes for desulfurization of residue. These processes tend to result in poor desulfurization efficiency, production of oil insoluble sludge, poor demetallization efficiency, formation of substantially inseparable salt-oil mixtures, utilization of large quantities of hydrogen gas, and/or relatively high hydrogen pressures.

Some processes for improving the quality of crude include adding a diluent to disadvantaged crudes to lower the weight percent of components contributing to the disadvantaged properties. Adding diluent, however, generally increases costs of treating disadvantaged crudes due to the costs of diluent and/or increased costs to handle the disadvantaged crudes. Addition of diluent to a disadvantaged crude may, in some situations, decrease stability of such crude.

U.S. Pat. Nos. 3,136,714 to Gibson et al.; 3,558,747 to Gleim et al.; 3,847,797 to Pasternak et al.; 3,948,759 to King et al.; 3,957,620 to Fukui et al.; 3,960,706 to McCollum et al.; 3,960,708 to McCollum et al.; 4,119,528 to Baird, Jr. et al.; 4,127,470 to Baird, Jr. et al.; 4,224,140 to Fujimori et al.; 4,437,980 to Heredy et al.; 4,591,426 to Krasuk et al.; 4,665,261 to Mazurek; 5,064,523 to Kretschmar et al.; 5,166,118 to Kretschmar et al.; 5,288,681 to Gatsis; 6,547,957 to Sudhakar et al.; and U.S. Patent Application Publication Nos. 20030000867 to Reynolds and 20030149317 to Rendina, all of which are incorporated herein by reference, describe various processes and systems used to treat crudes. The process, systems, and catalysts described in these patents, however, have limited applicability because of many of the technical problems set forth above.

In sum, disadvantaged crudes generally have undesirable properties (for example, relatively high residue, a tendency to corrode equipment, and/or a tendency to consume relatively large amounts of hydrogen during treatment). Other undesirable properties include relatively high amounts of undesirable components (for example, relatively high TAN, organically bound heteroatoms, and/or metal contaminants). Such properties tend to cause problems in conventional transportation and/or treatment facilities, including increased corrosion, decreased catalyst life, process plugging, and/or increased usage of hydrogen during treatment. Thus, there is a significant economic and technical need for improved systems, methods, and/or catalysts for conversion of disadvantaged crudes into crude products with properties that are more desirable.

SUMMARY OF THE INVENTION

Inventions described herein generally relate to systems and methods for contacting a crude feed with one or more catalysts to produce a total product comprising a crude product and, in some embodiments, non-condensable gas. Inventions described herein also generally relate to compositions that have novel combinations of components therein. Such compositions can be obtained by using the systems and methods described herein.

In certain embodiments, the invention provides a method of preparing a crude product, comprising contacting a crude feed with a hydrogen source in the presence of one or more catalysts comprising a transition metal sulfide catalyst to produce a total product that includes the crude product, wherein the crude product is a liquid mixture at 25° C. and 0.101 MPa, and the transition metal sulfide catalyst comprises $K_3Fe_{10}S_{14}$.

In certain embodiments, the invention provides a method of producing a crude product, comprising: contacting a crude feed with a hydrogen source in the presence of one or more catalysts to produce a total product that includes the crude product, wherein the crude product is a liquid mixture at 25° C. and 0.101 MPa, at least one of the catalysts comprising one or more transition metal sulfides, and the crude feed having a residue content of at least 0.2 grams of residue per gram of crude feed, as determined by ASTM Method D5307; and controlling contacting conditions such that the crude product has at most 0.05 grams of coke per gram of crude product, the crude product has at least 0.001 grams of naphtha per gram of crude product, and the naphtha has an octane number of at least 70.

In some embodiments, the invention provides a method of preparing a crude product, comprising: contacting a crude feed with a hydrogen source in the presence of one or more catalysts to produce a total product that includes the crude product, wherein the crude product is a liquid mixture at 25° C. and 0.101 MPa, at least one of the catalysts comprising one or more transition metal sulfides, and the crude feed having a residue content of at least 0.2 grams of residue per gram of crude feed, as determined by ASTM Method D5307; and controlling contacting conditions such that the crude product comprises kerosene, the kerosene having at least 0.2 grams of aromatics per gram of kerosene, as determined by ASTM Method D5186, the kerosene having a freezing point at a temperature of at most −30° C., as determined by ASTM Method D2386, and the crude product having at most 0.05 grams of coke per gram of crude product.

In certain embodiments, the invention provides a method of producing a crude product, comprising: contacting a crude feed with a hydrogen source in the presence of one or more catalysts to produce a total product that includes the crude product, wherein the crude product is a liquid mixture at 25° C. and 0.101 MPa, at least one of the catalysts comprising one or more transition metal sulfides, and the crude feed having a residue content of at least 0.2 grams of residue per gram of crude feed; and controlling contacting conditions such that the crude product has at most 0.05 grams of coke per gram of crude product with a weight ratio of atomic hydrogen to atomic carbon (H/C) in the crude product of at most 1.75, as determined by ASTM Method D6730.

In some embodiments, the invention provides a method of producing a crude product, comprising: contacting a crude feed with a hydrogen source in the presence of one or more catalysts to produce a total product that includes the crude product, wherein the crude product is a liquid mixture at 25° C. and 0.101 MPa, at least one of the catalysts comprising one or more transition metal sulfides, and the crude feed having a residue content of at least 0.2 grams of residue per gram of crude feed, as determined by ASTM Method D5307, and a weight ratio of atomic hydrogen to atomic carbon (H/C) in the crude feed is at least 1.5; and controlling contacting conditions such that the crude product has an atomic H/C ratio of about 80-120% of the atomic H/C ratio of the crude feed, the crude product having a residue content of at most 30% of the residue content of the crude feed, as determined by ASTM Method D5307, the crude product having at least 0.001 grams of naphtha per gram of crude product, and the naphtha having an octane number of at least 70.

In certain embodiments, the invention provides a method of producing a crude product, comprising: contacting a crude feed with a hydrogen source in the presence of one or more catalysts, to produce a total product that includes the crude product, wherein the crude product is a liquid mixture at 25° C. and 0.101 MPa, at least one of the catalysts comprising one or more transition metal sulfides, and the crude feed has a residue content of at least 0.2 grams of residue per gram of crude feed, as determined by ASTM Method D5307; and controlling contacting conditions such that the crude product has, per gram of crude product: at least 0.001 grams of naphtha, the naphtha having an octane number of at least 70; at least 0.001 grams of kerosene, the kerosene comprising aromatics, the kerosene having at least 0.2 grams of aromatics per gram of kerosene, as determined by ASTM Method D5186, and the kerosene having a freezing point at a temperature of at most −30° C., as determined by ASTM Method D2386; at least 0.001 grams of vacuum gas oil (VGO), the VGO having at least 0.3 grams of aromatics per gram of VGO, as determined by IP Method 368/90; and at most 0.05 grams of residue, as determined by ASTM Method D5307.

In some embodiments, the invention provides a method of producing a crude product, comprising: contacting a crude feed with a hydrogen source in the presence of one or more catalysts comprising a transition metal sulfide catalyst to produce a total product that includes the crude product, wherein the crude product is a liquid mixture at 25° C. and 0.101 MPa, the transition metal sulfide catalyst having a total of at least 0.4 grams of one or more transition metal sulfides per gram of total transition metal sulfide catalyst, the crude feed having a residue content of at least 0.2 grams of residue per gram of crude feed, as determined by ASTM Method D5307; and controlling contacting conditions such that the crude product has at most 0.05 grams of coke per gram of crude product, and the crude product has a residue content of at most 30% of the residue content of the crude feed, as determined by ASTM Method D5307.

In certain embodiments, the invention provides a method of producing a crude product, comprising: contacting a crude feed with a hydrogen source in the presence of one or more catalysts comprising a transition metal sulfide catalyst to produce a total product that includes the crude product, wherein the crude product is a liquid mixture at 25° C. and 0.101 MPa, the transition metal sulfide catalyst having a total of at least 0.4 grams of one or more transition metal sulfides per gram of transition metal sulfide catalyst, the crude feed having a nitrogen content of at least 0.001 grams of nitrogen per gram of crude feed, and the crude feed having a residue content of at least 0.2 grams of residue per gram of crude feed; and controlling contacting conditions such that the crude product has a nitrogen content of at most 90% of the nitrogen content of the crude feed, and the crude product has a residue content of at most 30% of the residue content of the crude feed, wherein nitrogen content is as determined by ASTM Method D5762 and residue content is as determined by ASTM Method D5307.

In some embodiments, the invention provides a method of producing a crude product, comprising: contacting a crude feed with a hydrogen source in the presence of one or more catalysts comprising a transition metal sulfide catalyst to produce a total product that includes the crude product, wherein the crude product is a liquid mixture at 25° C. and 0.101 MPa, the transition metal sulfide catalyst has a total of at least 0.4 grams of one or more transition metal sulfides per gram of total transition metal sulfide catalyst, the crude feed has a total Ni/V/Fe content of at least 0.0001 grams of Ni/V/Fe per gram of crude feed, and the crude feed has a residue content of at least 0.2 grams of residue per gram of crude feed; and controlling contacting conditions such that the crude product has at most 0.05 grams of coke per gram of crude product, the crude product has a total Ni/V/Fe content of at most 90% of the Ni/V/Fe content of the crude feed, the crude product has a residue content of at most 30% of the residue content of the crude feed, and wherein Ni/V/Fe content is as determined by ASTM Method D5863, and residue content is as determined by ASTM Method D5307.

In some embodiments, the invention provides a method of producing a crude product, comprising: contacting a crude feed with a hydrogen source in the presence of one or more catalysts comprising a transition metal sulfide catalyst to produce a total product that includes the crude product, wherein the crude product is a liquid mixture at 25° C. and 0.101 MPa, the transition metal sulfide catalyst having a total of at least 0.4 grams of one or more transition metal sulfides per gram of total transition metal sulfide catalyst, the crude feed having a sulfur content of at least 0.001 grams of sulfur per gram of crude feed, and the crude feed having a residue content at least 0.2 grams of residue per gram of crude feed; and controlling contacting conditions such that the crude product has a sulfur content of at most 70% of the sulfur content of the crude feed, and the crude product has a residue content of at most 30% of the residue content of the crude feed, wherein sulfur content is as determined by ASTM Method D4294 and residue content is as determined by ASTM Method D5307.

In certain embodiments, the invention provides a method of producing a transition metal sulfide catalyst composition, comprising: mixing a transition metal oxide and a metal salt to form a transition metal oxide/metal salt mixture; reacting the transition metal oxide/metal salt mixture with hydrogen to form an intermediate; and reacting the intermediate with sulfur in the presence of one or more hydrocarbons to produce the transition metal sulfide catalyst.

In some embodiments, the invention provides a method of producing a crude product, comprising: contacting a crude feed with a hydrogen source in the presence of one or more catalysts comprising a transition metal sulfide catalyst to produce a total product that includes the crude product, wherein the crude product is a liquid mixture at 25° C. and 0.101 MPa, the transition metal sulfide catalyst comprises a transition metal sulfide, the crude feed having a residue content of at least 0.2 grams of residue per gram of crude feed, as determined by ASTM Method D5307; controlling contact conditions such that the crude product has a residue content of at most 30% of the residue content of the crude feed; and wherein the transition metal sulfide catalyst is obtainable by: mixing a transition metal oxide and a metal salt to form a transition metal oxide/metal salt mixture; reacting the transition metal oxide/metal salt mixture with hydrogen to form an intermediate; and reacting the intermediate with sulfur in the presence of one or more hydrocarbons to produce the transition metal sulfide catalyst.

In certain embodiments, the invention provides a method of producing a crude product, comprising: contacting a crude feed with a hydrogen source in the presence of one or more catalysts to produce a total product that includes the crude product, wherein the crude product is a liquid mixture at 25° C. and 0.101 MPa, and the crude feed having at least 0.2 grams of residue per gram of crude feed, as determined by ASTM Method D5307; producing at least a portion of the total product as a vapor; condensing at least a portion of the vapor at 25° C. and 0.101 MPa; and forming the crude product, wherein the crude product has, per gram of crude product: at least 0.001 grams of naphtha, the naphtha having an octane number of at least 70; at least 0.001 grams of vacuum gas oil (VGO), the VGO having at least 0.3 grams of aromatics per gram of VGO, as determined by IP Method 368/90; and at most 0.05 grams of residue, as determined by ASTM Method D5307.

In some embodiments, the invention provides a method of producing a crude product, comprising: contacting a crude feed with a hydrogen source in the presence of an inorganic salt catalyst to produce a total product that includes the crude product, wherein the crude feed has a residue content of at least 0.2 grams of residue per gram of crude feed, as determined by ASTM Method D5307, the crude product is a liquid mixture at 25° C. and 0.101 MPa, and the crude product has, per gram of crude product: at least 0.001 grams of naphtha, the naphtha having at least 0.001 grams of monocyclic ring aromatics per gram of naphtha, as determined by ASTM Method D6730; at least 0.001 grams of distillate; and at most 0.05 grams of residue, as determined by ASTM Method D5307.

In certain embodiments, the invention provides a method of producing a crude product, comprising: contacting a crude feed with a hydrogen source in the presence of an inorganic salt catalyst to produce a total product that includes the crude product, wherein the crude feed has a residue content of at least 0.2 grams of residue per gram of crude feed, as determined by ASTM Method D5307, the crude product is a liquid mixture at 25° C. and 0.101 MPa, and the crude product has, per gram of crude product: at least 0.001 grams of diesel, and the diesel has at least 0.3 grams of aromatics per gram of diesel, as determined by IP Method 368/90; at least 0.001 grams of vacuum gas oil (VGO), and the VGO has at least 0.3 grams of aromatics per gram of VGO, as determined by IP Method 368/90; and at most 0.05 grams of residue, as determined by ASTM Method D5307.

In some embodiments, the invention provides a method of producing a crude product, comprising: contacting a crude feed with a hydrogen source in the presence of an inorganic salt catalyst to produce a total product that includes the crude product, wherein the crude product is a liquid mixture at 25° C. and 0.101 MPa, the crude feed has a residue content of at least 0.2 grams of residue per gram of crude feed, as determined by ASTM Method D5307, and the crude feed has a monocyclic ring aromatics content of at most 0.1 grams of monocyclic ring aromatics per gram of crude feed; and controlling contacting conditions such that during the contacting at most 0.2 grams of hydrocarbons that are not condensable at 25° C. and 0.101 MPa are formed per gram of crude feed, as determined by mass balance, and such that the crude product has a monocyclic ring aromatics content of at least 5% greater than a monocyclic ring aromatics content of the crude feed, wherein monocyclic ring aromatics content is as determined by ASTM Method D6730.

In certain embodiments, the invention provides a method of producing a crude product, comprising: contacting a crude feed with a hydrogen source in the presence of an inorganic salt catalyst to a produce a total product that includes the crude product, wherein the crude product is a liquid mixture at 25° C. and 0.101 MPa, the crude feed has a residue content of at least 0.2 grams of residue per gram of crude feed, as determined by ASTM Method D5307, and the crude feed has an olefins content, expressed in grams of olefins per gram of crude feed; and controlling contacting conditions such that the crude product has an olefins content of at least 5% greater than the olefins content of the crude feed, wherein olefin content is as determined by ASTM Method D6730.

In some embodiments, the invention provides a method of producing a crude product, comprising: contacting a crude feed with a hydrogen source in the presence of an inorganic salt catalyst to produce a total product that includes the crude product, wherein the crude product is a liquid mixture at 25° C. and 0.101 MPa, the crude feed having a residue content of at least 0.2 grams of residue per gram of crude feed, and the inorganic salt catalyst exhibits an emitted gas inflection of an emitted gas in a temperature range between about 50° C. and about 500° C., as determined by Temporal Analysis of Products (TAP); and controlling contacting conditions such that the crude product has a residue content, expressed in grams of residue per gram of crude product, of at most 30% of the residue content of the crude feed, wherein residue content is as determined by ASTM Method D5307.

In certain embodiments, the invention provides a method of producing a crude product, comprising: contacting a crude feed with a hydrogen source in the presence of an inorganic salt catalyst to produce a total product that includes the crude product, wherein the crude product is a liquid mixture at 25° C. and 0.101 MPa, the crude feed has a residue content of at least 0.2 grams of residue per gram of crude feed, the inorganic salt catalyst comprises at least two inorganic metal salts, and the inorganic salt catalyst exhibits an emitted gas inflection of an emitted gas in a temperature range, as determined by Temporal Analysis of Products (TAP), wherein the emitted gas inflection temperature range is between (a) a DSC temperature of at least one of the two inorganic metal salts and (b) a DSC temperature of the inorganic salt catalyst; and controlling contacting conditions such that the crude product has a residue content, expressed in grams of residue per gram of crude product, of at most 30% of the residue content of the crude feed, wherein residue content is as determined by ASTM Method D5307.

In some embodiments, the invention provides a method of producing a crude product, comprising: contacting a crude feed with a hydrogen source in the presence of an inorganic salt catalyst to produce a total product that includes the crude product, wherein the crude product is a liquid mixture at 25° C. and 0.101 MPa, the crude feed has a residue content of at least 0.2 grams of residue per gram of crude feed, as determined by ASTM Method D5307, and the inorganic salt catalyst exhibits an emitted gas inflection of an emitted gas in a temperature range between about 50° C. and about 500° C., as determined by Temporal Analysis of Products (TAP); and producing the crude product such that a volume of the crude product produced is at least 5% greater than the volume of the crude feed, when the volumes are measured at 25° C. and 0.101 MPa.

In certain embodiments, the invention provides a method of producing a crude product, comprising: contacting a crude feed with a hydrogen source in the presence of an inorganic salt catalyst to produce a total product that includes the crude product, wherein the crude product is a liquid mixture at 25° C. and 0.101 MPa, the crude feed has a residue content of at least 0.2 grams of residue per gram of crude feed, and the inorganic salt catalyst exhibits an emitted gas inflection of an emitted gas in a temperature range between about 50° C. and about 500° C., as determined by Temporal Analysis of Products (TAP); and controlling contacting conditions such that during the contacting at most 0.2 grams of hydrocarbons that are not condensable at 25° C. and 0.101 MPa are formed per gram of crude feed, as determined by mass balance.

In some embodiments, the invention provides a method of producing a crude product, comprising: contacting a crude feed with a hydrogen source in the presence of an inorganic salt catalyst to produce a total product that includes the crude product, wherein the crude product is a liquid mixture at 25° C. and 0.101 MPa, the crude feed having a residue content of at least 0.2 grams of residue per gram of crude feed, and the inorganic salt catalyst has a heat transition in a temperature range between about 200° C. and about 500° C., as determined by differential scanning calorimetry (DSC), at a rate of about 10° C. per minute; and controlling contacting conditions such that the crude product has a residue content, expressed in grams of residue per gram of crude product, of at most 30% of the residue content of the crude feed, wherein residue content is as determined by ASTM Method D5307.

In certain embodiments, the invention provides a method of producing a crude product, comprising: contacting a crude feed with a hydrogen source in the presence of an inorganic salt catalyst to produce a total product that includes the crude product, wherein the crude product is a liquid mixture at 25° C. and 0.101 MPa, the crude feed having a residue content of at least 0.2 grams of residue per gram of crude feed, and the inorganic salt catalyst has ionic conductivity that is at least the ionic conductivity of at least one of the inorganic salts of the inorganic salt catalyst at a temperature in a range from about 300° C. and about 500° C.; and controlling contacting conditions such that the crude product has a residue content, expressed in grams of residue per gram of crude product, of at most 30% of the residue content of the crude feed, wherein residue content is as determined by ASTM Method D5307.

In certain embodiments, the invention provides a method of producing a crude product, comprising: contacting a crude feed with a hydrogen source in the presence of an inorganic salt catalyst to produce a total product that includes the crude product, wherein the crude product is a liquid mixture at 25° C. and 0.101 MPa, the crude feed has a residue content of at least 0.2 grams of residue per gram of crude feed, the inorganic salt catalyst comprises alkali metal salts, wherein at least one of the alkali metal salts is an alkali metal carbonate, and the alkali metals have an atomic number of at least 11, and at least one atomic ratio of an alkali metal having an atomic number of at least 11 to an alkali metal having an atomic number greater than 11 is in a range from about 0.1 to about 10; and controlling contacting conditions such that the crude product has a residue content of at most 30% of the residue content of the crude feed, wherein residue content is as determined by ASTM Method D5307.

In some embodiments, the invention provides a method of producing a crude product, comprising: contacting a crude feed with a hydrogen source in the presence of an inorganic salt catalyst to produce a total product, wherein the crude feed has a residue content of at least 0.2 grams of residue per gram of crude feed, the inorganic salt catalyst comprises alkali metal salts, wherein at least one of the alkali metal salts is an alkali metal hydroxide, and the alkali metals have an atomic number of at least 11, and at least one atomic ratio of an alkali metal having an atomic number of at least 11 to an alkali metal having an atomic number greater than 11 is in a range from about 0.1 to about 10; producing at least a portion of the total product as a vapor; condensing at least a portion of the vapor at 25° C. and 0.101 MPa; and forming the crude product, wherein the crude product has a residue content of at most 30% of the residue content of the crude feed.

In certain embodiments, the invention provides a method of producing a crude product, comprising: contacting a crude feed with a hydrogen source in the presence of an inorganic salt catalyst to produce a total product, wherein the crude feed has a residue content of at least 0.2 grams of residue per gram of crude feed, the inorganic salt catalyst comprises alkali metal salts, wherein at least one of the alkali metal salts is an alkali metal hydride, and the alkali metals have an atomic number of at least 11, and at least one atomic ratio of an alkali metal having an atomic number of at least 11 to an alkali metal having an atomic number greater than 11 is in a range from about 0.1 to about 10; producing at least a portion of the total product as a vapor; condensing at least a portion of the vapor at 25° C. and 0.101 MPa; and forming the crude product, wherein the crude product has a residue content of at most 30% of the residue content of the crude feed.

In some embodiments, the invention provides a method of producing a crude product, comprising: contacting a crude feed with a hydrogen source in the presence of an inorganic salt catalyst to produce a total product that includes the crude product, wherein the crude product is a liquid mixture at 25° C. and 0.101 MPa, the crude feed has a residue content of at least 0.2 grams of residue per gram of crude feed, the inorganic salt catalyst comprises one or more alkali metal salts, one or more alkaline-earth metal salts, or mixtures thereof, wherein one of the alkali metal salts is an alkali metal carbonate, wherein the alkali metals have an atomic number of at least 11; and controlling contacting conditions such that the crude product has a residue content of at most 30% of the residue content of the crude feed, wherein residue content is as determined by ASTM Method D5307.

In certain embodiments, the invention provides a method of producing a crude product, comprising: contacting a crude feed with a hydrogen source in the presence of an inorganic salt catalyst to produce a total product that includes the crude product, wherein the crude product is a liquid mixture at 25° C. and 0.101 MPa, the crude feed has a residue content of at least 0.2 grams of residue per gram of crude feed, the inorganic salt catalyst comprises one or more alkali metal hydroxides, one or more alkaline-earth metal salts, or mixtures thereof, wherein the alkali metals have an atomic number of at least 11; and controlling contacting conditions such that the crude product has a residue content of at most 30% of the residue content of the crude feed, wherein residue content is as determined by ASTM Method D5307.

In some embodiments, the invention provides a method of producing a crude product, comprising: contacting a crude feed with a hydrogen source in the presence of an inorganic salt catalyst to produce a total product that includes the crude product, wherein the crude product is a liquid mixture at 25° C. and 0.101 MPa, the crude feed has a residue content of at least 0.2 grams of residue per gram of crude feed, the inorganic salt catalyst comprises one or more alkali metal hydrides, one or more alkaline-earth salts, or mixtures thereof, and wherein the alkali metals have an atomic number of at least 11; and controlling contacting conditions such that the crude product has a residue content, expressed in grams of residue per gram of crude product, of at most 30% of the residue content of the crude feed, wherein residue content is as determined by ASTM Method D5307.

In certain embodiments, the invention provides a method of producing hydrogen gas, comprising: contacting a crude feed with one or more hydrocarbons in the presence of an inorganic salt catalyst and water, the hydrocarbons have carbon numbers in a range from 1 to 6, the crude feed has a residue content of at least 0.2 grams of residue per gram of crude feed, and the inorganic salt catalyst exhibits an emitted gas inflection of an emitted gas in a temperature range between about 50° C. and about 500° C., as determined by Temporal Analysis of Products (TAP); and producing hydrogen gas.

In some embodiments, the invention provides a method of producing a crude product, comprising: contacting a first crude feed with an inorganic salt catalyst in the presence of steam to generate a gas stream, the gas stream comprising hydrogen, wherein the first crude feed has a residue content of at least 0.2 grams of residue per gram of first crude feed, as determined using ASTM Method D5307, and the inorganic salt catalyst exhibits an emitted gas inflection of an emitted gas in a temperature range between about 50° C. and about 500° C., as determined by Temporal Analysis of Products (TAP); contacting a second crude feed with a second catalyst in the presence of at least a portion of the generated gas stream to produce a total product that includes the crude product, wherein the crude product is a liquid mixture at 25° C. and 0.101 MPa; and controlling contacting conditions such that one or more properties of the crude product change by at least 10% relative to the respective one or more properties of the second crude feed.

In certain embodiments, the invention provides a method of generating a gas stream, comprising: contacting a crude feed with an inorganic salt catalyst in the presence of steam, wherein the crude feed has a residue content of at least 0.2 grams of residue per gram of crude feed, as determined by ASTM Method 5307; and generating a gas stream, the gas stream comprising hydrogen, carbon monoxide, and carbon dioxide, and wherein a molar ratio of the carbon monoxide to the carbon dioxide is at least 0.3.

In some embodiments, the invention provides a method of producing a crude product comprising: conditioning an inorganic salt catalyst; contacting a crude feed with a hydrogen source in the presence of the conditioned inorganic salt catalyst to produce a total product that includes the crude product, wherein the crude product is a liquid mixture at 25° C. and 0.101 MPa, the crude feed having a residue content of at least 0.2 grams of residue per gram of crude feed; and controlling contacting conditions such that the crude product has a residue content, expressed in grams of residue per gram of crude product, of at most 30% of the residue content of the crude feed, wherein residue content is as determined by ASTM Method D5307.

In certain embodiments, the invention provides a crude composition, comprising hydrocarbons that have a boiling range distribution between about 30° C. and about 538° C. (1,000° F.) at 0.101 MPa, the hydrocarbons comprising iso-paraffins and n-paraffins with a weight ratio of the iso-paraffins to n-paraffins of at most 1.4, as determined by ASTM Method D6730.

In some embodiments, the invention provides a crude composition having, per gram of composition: at least 0.001 grams of hydrocarbons with a boiling range distribution of at most 204° C. (400° F.) at 0.101 MPa, at least 0.001 grams of hydrocarbons with a boiling range distribution between about 204° C. and about 300° C. at 0.101 MPa, at least 0.001 grams of hydrocarbons with a boiling range distribution between about 300° C. and about 400° C. at 0.101 MPa, and at least 0.001 grams of hydrocarbons with a boiling range distribution between about 400° C. and about 538° C. (1,000° F.) at 0.101 MPa, and wherein the hydrocarbons that have a boiling range distribution of at most 204° C. comprise iso-paraffins and n-paraffins with a weight ratio of the iso-paraffins to the n-paraffins of at most 1.4, as determined by ASTM Method D6730.

In certain embodiments, the invention provides a crude composition having, per gram of composition: at least 0.001 grams of naphtha, the naphtha having an octane number of at least 70, and the naphtha having at most 0.15 grams of olefins per gram of naphtha, as determined by ASTM Method D6730; at least 0.001 grams of kerosene, the kerosene having at least 0.2 grams of aromatics per gram of kerosene, as determined by ASTM D5186, and the kerosene having a freezing point at a temperature of at most −30° C., as determined by ASTM Method D2386; and at most 0.05 grams of residue, as determined by ASTM Method D5307.

In some embodiments, the invention provides a crude composition having, per gram of composition: at most 0.15 grams of hydrocarbon gas that is non-condensable at 25° C. and 0.101 MPa, the non-condensable hydrocarbon gas having at most 0.3 grams of hydrocarbons with a carbon number from 1 to 3 ($C_1$ to $C_3$), per gram of non-condensable hydrocarbon gas; at least 0.001 grams of naphtha, the naphtha having an octane number of at least 70; at least 0.001 grams of kerosene, the kerosene having a freezing point at a temperature of at most −30° C., as determined by ASTM Method D2386, and the kerosene having at least 0.2 grams of aromatics per gram of kerosene, as determined by ASTM Method D5186; and at most 0.05 grams of residue, as determined by ASTM Method D5307.

In certain embodiments, the invention provides a crude composition, having, per gram of composition: at most 0.05 grams of residue, as determined by ASTM Method D5307; at least 0.001 grams of hydrocarbons with a boiling range distribution of at most 204° C. (400° F.) at 0.101 MPa; at least 0.001 grams of hydrocarbons with a boiling range distribution between about 204° C. and about 300° C. at 0.101 MPa; at least 0.001 grams of hydrocarbons with a boiling range distribution between about 300° C. and about 400° C. at 0.101 MPa; at least 0.001 grams of hydrocarbons with a boiling range distribution between about 400° C. and about 538° C. (1,000° F.) at 0.101 MPa; and wherein the hydrocarbons in a boiling range distribution between about 20° C. and about 204° C. comprise olefins having terminal double bonds and olefins having internal double bonds with a molar ratio of olefins having terminal double bonds to olefins having internal double bonds of at least 0.4, as determined by ASTM Method D6730.

In some embodiments, the invention provides a crude composition, having, per gram of composition: at most 0.05 grams of residue, as determined by ASTM Method D5307; and at least 0.001 grams of a mixture of hydrocarbons that have a boiling range distribution between about 20° C. and about 538° C. (1,000° F.), as determined by ASTM Method D5307, and the hydrocarbon mixture has, per gram of hydrocarbon mixture: at least 0.001 grams of paraffins, as determined by ASTM Method D6730; at least 0.001 grams of olefins, as determined by ASTM Method D6730, and the olefins have at least 0.001 grams of terminal olefins per gram of olefins, as determined by ASTM Method D6730; at least 0.001 grams of naphtha; at least 0.001 grams of kerosene, the kerosene having at least 0.2 grams of aromatics per gram of kerosene, as determined by ASTM Method D5186; at least 0.001 grams of diesel, the diesel having at least 0.3 grams of aromatics per gram of diesel, as determined by IP Method 368/90; and at least 0.001 grams of vacuum gas oil (VGO), the VGO having at least 0.3 grams of aromatics per gram of VGO, as determined by IP Method 368/90.

In certain embodiments, the invention provides a crude composition having, per gram of composition: at most 0.05 grams of residue, as determined by ASTM Method D5307; at least 0.001 grams of hydrocarbons with a boiling range distribution of at most 204° C. (400° F.) at 0.101 MPa; at least 0.001 grams of hydrocarbons with a boiling range distribution between about 204° C. and about 300° C. at 0.101 MPa; at least 0.001 grams of hydrocarbons with a boiling range distribution between about 300° C. and about 400° C. at 0.101 MPa; and at least 0.001 grams of hydrocarbons with a boiling range distribution between about 400° C. and about 538° C. (1,000° F.) at 0.101 MPa, as determined by ASTM Method D2887; and wherein the hydrocarbons having a boiling range distribution of at most 204° C. have, per gram of hydrocarbons having a boiling range distribution of at most 204° C.: at least 0.001 grams of olefins, as determined by ASTM Method D6730; and at least 0.001 grams of paraffins, the paraffins comprising iso-paraffins and n-paraffins with a weight ratio of iso-paraffins to n-paraffins of at most 1.4, as determined by ASTM Method D6730.

In some embodiments, the invention provides a crude composition having, per gram of composition: at most 0.05 grams of residue, as determined by ASTM Method D5307; and at least 0.001 grams of hydrocarbons with a boiling range distribution of at most 204° C. (400° F.) at 0.101 MPa; at least 0.001 grams of hydrocarbons with a boiling range distribution between about 204° C. and about 300° C. at 0.101 MPa; at least 0.001 grams of hydrocarbons with a boiling range distribution between about 300° C. and about 400° C. at 0.101 MPa; and at least 0.001 grams of hydrocarbons with a boiling range distribution between about 400° C. and about 538° C. (1,000° F.) at 0.101 MPa, as determined by ASTM Method D2887; and wherein the hydrocarbons having a boiling range distribution between about −10° C. and about 204° C. comprise compounds with a carbon number of 4 ($C_4$), the $C_4$ compounds having at least 0.001 grams of butadiene per gram of $C_4$ compounds.

In certain embodiments, the invention provides a crude composition having, per gram of composition: at most 0.05 grams of residue; at least 0.001 grams of hydrocarbons with a boiling range distribution of at most 204° C. (400° F.) at 0.101 MPa, at least 0.001 grams of hydrocarbons with a boiling range distribution between about 204° C. and about 300° C. at 0.101 MPa, at least 0.001 grams of hydrocarbons with a boiling range distribution between about 300° C. and about 400° C. at 0.101 MPa, and at least 0.001 grams of hydrocarbons with a boiling range distribution between about 400° C. and about 538° C. at 0.101 MPa; and greater than 0 grams, but less than 0.01 grams of one or more catalyst, wherein the catalyst has at least one or more alkali metals.

In some embodiments, the invention also provides, in combination with one or more of the above embodiments, a crude feed that: (a) has not been treated in a refinery, distilled, and/or fractionally distilled; (b) comprises components having a carbon number above 4, and the crude feed has at least 0.5 grams of such components per gram of crude feed; (c) comprises hydrocarbons of which a portion has: a boiling range distribution below 100° C. at 0.101 MPa, a boiling range distribution between 100° C. and 200° C. at 0.101 MPa, a boiling range distribution between about 200° C. and about 300° C. at 0.101 MPa, a boiling range distribution between about 300° C. and about 400° C. at 0.101 MPa, and a boiling range distribution between about 400° C. and about 700° C. at 0.101 MPa; (d) has, per gram of crude feed: at least 0.001 grams of hydrocarbons having a boiling range distribution below 100° C. at 0.101 MPa, at least 0.001 grams of hydrocarbons having a boiling range distribution between 100° C. and 200° C. at 0.101 MPa, at least 0.001 grams of hydrocarbons having a boiling range distribution between about 200° C. and about 300° C. at 0.101 MPa, at least 0.001 grams of hydrocarbons having a boiling range distribution between about 300° C. and about 400° C. at 0.101 MPa, and at least 0.001 grams of hydrocarbons having a boiling range distribution between about 400° C. and about 700° C. at 0.101 MPa; (e) has a TAN; (f) has from about 0.2-0.99 grams, about 0.3-0.8 grams, or about 0.4-0.7 grams of residue per gram of crude feed; (g) comprises nickel, vanadium, iron, or mixtures thereof; (h) comprises sulfur; and/or (i) nitrogen containing hydrocarbons.

In some embodiments, the invention also provides, in combination with one or more of the above embodiments, the hydrogen source that: (a) is gaseous; (b) comprises molecular hydrogen; (c) comprises light hydrocarbons; (d) comprises methane, ethane, propane, or mixtures thereof; (e) comprises water; and/or (f) mixtures thereof.

In some embodiments, the invention also provides, in combination with one or more of the above embodiments, a method that includes conditioning the inorganic salt catalyst, wherein conditions the inorganic catalyst comprises: (a) heating the inorganic salt catalyst to a temperature of at least 300° C.; and/or (b) heating the inorganic salt catalyst to a temperature of at least 300° C. and cooling the inorganic salt catalyst to a temperature of at most 500° C.

In some embodiments, the invention also provides, in combination with one or more of the above embodiments, a method that comprises contacting a crude feed with one or more catalysts and controlling contacting conditions: (a) such that during the contacting at most 0.2 grams, at most 0.15 grams, at most 0.1 grams, or at most 0.05 grams of hydrocarbons that are not condensable at 25° C. and 0.101 MPa are formed per gram of crude feed, as determined by mass balance; (b) such that a contacting temperature is in a range from about 250-750° C. or between about 260-550° C.; (c) a pressure is in a range from about 0.1-20 MPa; (d) such that a ratio of a gaseous hydrogen source to the crude feed is in a range from about 1-16100 or about 5-320 normal cubic meters of the hydrogen source per cubic meter of the crude feed; (e) to inhibit coke formation; (f) to inhibit formation of coke in the total product or in the crude feed during the contacting; (g) such that the crude product also has at most 0.05 grams, at most 0.03 grams, at most 0.01 grams, or at most 0.003 grams of coke per gram of crude product; (h) such that at least a portion of the inorganic salt catalyst is semi-liquid or liquid at such contacting conditions; (i) such that the crude product has a TAN of at most 90% of the TAN of the crude feed; (j) such that the crude product has a total Ni/V/Fe content of at most 90%, at most 50%, or at most 10% of the Ni/V/Fe content of the crude feed; (k) such that the crude product has a sulfur content of at most 90%, at most 60%, or at most 30% of the sulfur content of the crude feed; (l) such that the crude product has a nitrogen content of at most 90%, at most 70%, at most 50%, or at most 10% of the nitrogen content of the crude feed; (m) such that the crude product has a residue content of at most 30%, at most 10%, or at most 5% of the residue content of the crude feed; (n) such that ammonia is co-produced with the crude product; (o) such that the crude product comprises methanol, and the method further comprises: recovering the methanol from the crude product; combining the recovered methanol with additional crude feed to form an additional crude feed/methanol mixture; and heating the additional crude feed/methanol mixture such that TAN of the additional crude feed is reduced to below 1; (p) such that one or more properties of the crude product change by at most 90% relative to the respective one or more properties of the crude feed; (q) such that an amount of catalyst in the contacting zone ranges from about 1-60 grams of total catalyst per 100 grams of crude feed; and/or (r) such that a hydrogen source is added to the crude feed prior to or during the contacting.

In some embodiments, the invention also provides, in combination with one or more of the above embodiments, contacting conditions that comprise: (a) mixing the inorganic salt catalyst with the crude feed at a temperature below 500° C., wherein the inorganic salt catalyst is substantially insoluble in the crude feed; (b) agitating the inorganic catalyst in the crude feed; and/or (c) contacting the crude feed with the inorganic salt catalyst in the presence of water and/or steam to produce a total product that includes the crude product that is a liquid mixture at STP.

In some embodiments, the invention also provides, in combination with one or more of the above embodiments, a method that comprises contacting a crude feed with an inorganic salt catalyst and that further comprises: (a) providing steam to a contacting zone prior to or during contacting; (b) forming an emulsion of the crude feed with water prior to contacting the crude feed with the inorganic salt catalyst and the hydrogen source; (c) spraying the crude feed into the contacting zone; and/or (d) contacting steam with the inorganic salt catalyst to at least partially remove coke from the surface of the inorganic salt catalyst.

In some embodiments, the invention also provides, in combination with one or more of the above embodiments, a method that comprises contacting a crude feed with an inorganic salt catalyst to produce a total product wherein at least a portion of the total product is produced as a vapor, and the method further comprises condensing at least a portion of the vapor at 25° C. and 0.101 MPa to form the crude product, the contacting conditions are controlled such that: (a) the crude product further comprises components with a selected boiling range distribution; and/or (b) the crude product comprises components having a selected API gravity.

In some embodiments, the invention also provides, in combination with one or more of the above embodiments, a method that comprises contacting a crude feed with an one or more catalysts and that the one or more catalysts are nonacidic.

In some embodiments, the invention also provides, in combination with one or more of the above embodiments, a $K_3Fe_{10}S_{14}$ catalyst or a transition metal sulfide catalyst that: (a) has a total of at least 0.4 grams, at least 0.6 grams, or at least 0.8 grams of at least one of transition metal sulfides per gram of the $K_3Fe_{10}S_{14}$ catalyst or the transition metal sulfide catalyst; (b) has an atomic ratio of transition metal to sulfur in the $K_3Fe_{10}S_{14}$ catalyst or the transition metal sulfide catalyst in a range from about 0.2 to about 20; (c) further comprises one or more alkali metals, one or more compounds of one or more alkali metals, or mixtures thereof; (d) further comprises one or more alkaline-earth metals, one or more compounds of one or more alkaline-earth metals, or mixtures thereof; (e) further comprises one or more alkali metals, one or more compounds of one or more alkali metals, or mixtures thereof, wherein an atomic ratio of transition metal to sulfur in the $K_3Fe_{10}S_{14}$ catalyst or the transition metal sulfide catalyst is in a range from about 0.5-2.5 and an atomic ratio of the alkali metals to the transition metal is in a range from above 0 to about 1; (f) further comprises one or more alkaline-earth metals, one or more compounds of one or more alkaline-earth metals, or mixtures thereof, an atomic ratio of transition metal to sulfur in the $K_3Fe_{10}S_{14}$ catalyst or the transition metal sulfide catalyst is in a range from about 0.5-2.5; and an atomic ratio of the alkaline-earth metal to the transition metal is in a range from above 0 to about 1; (g) further comprises zinc; (h) further comprises $KFe_2S_3$; (i) further comprises $KFeS_2$; and/or (j) is nonacidic.

In some embodiments, the transition metal sulfide catalyst comprises a mixture of one or more transition metal sulfides, one or more alkali metals, one or more compounds of one or more alkali metals, or mixtures thereof, and during contacting a portion of the transition metal sulfides are convert to $K_3Fe_{10}S_{14}$.

In some embodiments, the invention also provides, in combination with one or more of the above embodiments, one or more of the transition metal sulfides that or in which: (a) comprise one or more transition metals from Columns 6-10 of the Periodic Table, one or more compounds of one or more transition metals from Columns 6-10, or mixtures thereof; (b) comprise one or more iron sulfides; (c) comprises FeS; (d) comprises $FeS_2$; (e) comprise a mixture of iron sulfides, wherein the iron sulfides are represented by the formula $Fe_{(1-b)}S$, where b is in a range from above 0 to about 0.17; (f) further comprises $K_3Fe_{10}S_{14}$ after contact with the crude feed; (g) at least one of the transition metals of the one or more transition metal sulfides is iron; and/or (h) are deposited on a support, and the transition metal sulfide catalyst has at most 0.25 grams of total support per 100 grams of catalyst.

In some embodiments, the invention also provides, in combination with one or more of the above embodiments, a method of forming a transition metal sulfide catalyst composition the method comprising mixing a transition metal oxide and a metal salt to form a transition metal oxide/metal salt mixture; reacting the transition metal oxide/metal salt mixture with hydrogen to form an intermediate; and reacting the intermediate with sulfur in the presence of one or more hydrocarbons to produce the transition metal sulfide catalyst: (a) in which the transition metal oxide/metal salt mixture comprises a hydrate; (b) the metal salt comprises an alkali metal carbonate; (c) that further comprises dispersing the intermediate in the one or more liquid hydrocarbons while it is reacted with the sulfur; (d) in which one or more of the hydrocarbons have a boiling point of at least 100° C.; (e) in which one or more of the hydrocarbons is VGO, xylene, or mixtures thereof; (f) in which mixing the transition metal oxide and the metal salt comprises: mixing the transition metal oxide and the metal salt in the presence of de-ionized water to from a wet paste; drying the wet paste at a temperature in a range from about 150-250° C.; and calcining the dried paste at a temperature in a range from about 300-600° C.; (g) in which reacting the intermediate with sulfur comprises heating the intermediate in the presence of at least one of the hydrocarbons to a temperature in the range from about 240-350° C.; and/or (h) that further comprises contacting the catalyst composition with a crude feed that comprises sulfur and a hydrogen source.

In some embodiments, the invention also provides, in combination with one or more of the above embodiments, an inorganic salt catalyst that comprises: (a) one or more alkali metal carbonates, one or more alkaline-earth metal carbonates, or mixtures thereof; (b) one or more alkali metal hydroxides, one or more alkaline-earth metal hydroxides, or mixtures thereof; (c) one or more alkali metal hydrides, one or more alkaline-earth metal hydrides, or mixtures thereof; (d) one or more sulfides of one or more alkali metals, one or more sulfides of one or more alkaline-earth metals, or mixtures thereof; (e) one or more amides of one or more alkali metals, one or more amides of one or more alkaline-earth metals, or mixtures thereof; (f) one or more metals from Columns 6-10 of the Periodic Table, one or more compounds of one or more metals from Columns 6-10 of the Periodic Table, or mixtures thereof; (g) one or more inorganic metal salts, and wherein at least one of the inorganic metal salts generates hydride during use of the catalyst; (h) sodium, potassium, rubidium, cesium, or mixtures thereof; (i) calcium and/or magnesium; (j) a mixture of a sodium salt and a potassium salt and the potassium salt comprises potassium carbonate, potassium hydroxide, potassium hydride, or mixtures thereof, and the sodium salt comprises sodium carbonate, sodium hydroxide, sodium hydride, or mixtures thereof; and/or (k) mixtures thereof.

In some embodiments, the invention also provides, in combination with one or more of the above embodiments, an inorganic salt catalyst that includes alkali metals in which: (a) the atomic ratio of an alkali metal having an atomic number of at least 11 to an alkali metal having an atomic number greater than 11 is in a range from about 0.1 to about 4; (b) at least two of the alkali metals are sodium and potassium and an atomic ratio of sodium to potassium is in a range from about 0.1 to about 4; (c) at least three of the alkali metals are sodium, potassium, and rubidium, and each of the atomic ratios of sodium to potassium, sodium to rubidium, and potassium to rubidium is in a range from about 0.1 to about 5; (d) at least three of the alkali metals are sodium, potassium, and cesium, and each of the atomic ratios of sodium to potassium, sodium to cesium, and potassium to cesium is in a range from about 0.1 to about 5; (e) at least three of the alkali metals are potassium, cesium, rubidium, and each of the atomic ratios of potassium to cesium, potassium to rubidium, and cesium to rubidium is in a range from about 0.1 to about 5.

In some embodiments, the invention also provides, in combination with one or more of the above embodiments, an inorganic salt catalyst comprising a support material, and: (a) the support material comprises zirconium oxide, calcium oxide, magnesium oxide, titanium oxide, hydrotalcite, alumina, germania, iron oxide, nickel oxide, zinc oxide, cadmium oxide, antimony oxide, or mixtures thereof; and/or (b) incorporated in the support material are: one or more metals from Columns 6-10 of the Periodic Table, one or more compounds of one or more metals from Columns 6-10 of the Periodic Table; one or more alkali metal carbonates, one or more alkali metal hydroxides, one or more alkali metal hydrides, one or more alkaline-earth metal carbonates, one or more alkaline-earth metal hydroxides, one or more alkaline-earth metal hydrides, and/or mixtures thereof.

In some embodiments, the invention also provides, in combination with one or more of the above embodiments, a method comprises contacting a crude feed with an inorganic salt catalyst that: (a) the catalytic activity of the inorganic salt catalyst is substantially unchanged in the presence of sulfur; and/or (b) the inorganic salt catalyst is continuously added to the crude feed.

In some embodiments, the invention also provides, in combination with one or more of the above embodiments, an inorganic salt catalyst that exhibits: (a) an emitted gas inflection in a TAP temperature range, and the emitted gas comprises water vapor and/or carbon dioxide; (b) a heat transition in a temperature range between about 200-500° C., about 250-450° C., or about 300-400° C., as determined by differential scanning calorimetry, at a heating rate of about 10° C. per minute; (c) a DSC temperature in a range between about 200-500° C., or about 250-450° C.; (d) at a temperature of at least 100° C., an x-ray diffraction pattern that is broader than an x-ray diffraction pattern of the inorganic salt catalyst below 100° C.; and/or (e) after conditioning, ionic conductivity, at 300° C., that is less than ionic conductivity of the inorganic salt catalyst before conditioning.

In some embodiments, the invention also provides, in combination with one or more of the above embodiments, an inorganic salt catalyst that exhibits an emitted inflection in a temperature range, as determined by TAP, and the contacting conditions are also controlled such that a contacting temperature is: (a) above $T_1$, wherein $T_1$ is 30° C., 20° C., or 10° C. below the TAP temperature of the inorganic salt catalyst; (b) at or above a TAP temperature; and/or (c) at least the TAP temperature of the inorganic salt catalyst.

In some embodiments, the invention also provides, in combination with one or more of the above embodiments, an inorganic salt catalyst that or in which: (a) is liquid or semi-liquid at least at the TAP temperature of the inorganic salt catalyst, and the inorganic salt catalyst is substantially insoluble in the crude feed at least at the TAP temperature, wherein the TAP temperature is the minimum temperature at which the inorganic salt catalyst exhibits an emitted gas inflection; (b) is a mixture of a liquid phase and a solid phase at a temperature in a range from about 50° C. to about 500° C.; and/or (c) at least one of the two inorganic salts has a DSC temperature above 500° C.

In some embodiments, the invention also provides, in combination with one or more of the above embodiments, an inorganic salt catalyst that when tested in the form of particles that can pass through a 1000 micron filter, self-deforms under gravity and/or under a pressure of at least 0.007 MPa when heated to a temperature of at least 300° C., such that the inorganic salt catalyst transforms from a first form to a second form, and the second form is incapable of returning to the first form upon cooling of the inorganic salt catalyst to about 20° C.

In some embodiments, the invention also provides, in combination with one or more of the above embodiments, an inorganic salt catalyst that has, per gram of inorganic salt catalyst: (a) at most 0.01 grams of lithium, or compounds of lithium, calculated as the weight of lithium; (b) at most 0.001 grams of halide, calculated as the weight of halogen; and/or (c) at most 0.001 grams of glassy oxide compounds.

In some embodiments, the invention also provides, in combination with one or more of the above embodiments, the total product that has at least 0.8 grams of crude product per gram of total product.

In some embodiments, the invention also provides, in combination with one or more of the above embodiments, a crude product that: (a) has at most 0.003 grams, at most 0.02 grams, at most 0.01 grams, at most 0.05 grams, most 0.001 grams, from about 0.000001-0.1 grams, about 0.00001-0.05 grams, or about 0.0001-0.03 grams of residue per gram of crude product; (b) has from about 0 grams to about 0.05 grams, about 0.00001-0.03 grams, or about 0.0001-0.01 grams of coke per gram of crude product; (c) has an olefins content of at least 10% greater than the olefins content of the crude feed; (d) has greater than 0 grams, but less than 0.01 grams of total inorganic salt catalyst per gram of crude product, as determined by mass balance; (e) has at least 0.1 grams, from about 0.00001-0.99 grams, from 0.04-0.9 grams from about 0.6-0.8 grams of VGO per gram of crude product; (f) comprises VGO and the VGO has at least 0.3 grams of aromatics per gram of VGO; (g) has 0.001 grams or from about 0.1-0.5 grams of distillate; (h) an atomic H/C of at most 1.4; (i) has an atomic H/C of about 90-110% of the H/C of the crude feed; (j) has a monocyclic ring aromatic content of at least 10% greater than the monocyclic ring aromatic content of the crude feed; (k) has monocyclic ring aromatics that comprise xylenes, ethylbenzene or compounds of ethylbenzene; (l) has, per gram of crude product, at most 0.1 grams of benzene, from about 0.05-0.15 grams of toluene, from about 0.3-0.9 grams of meta-xylene, from about 0.5-0.15 grams of ortho-xylene, and from about 0.2-0.6 grams of para-xylene; (m) has at least 0.0001 grams or from about 0.01-0.5 grams of diesel; (n) comprises diesel, and the diesel has at least 0.3 grams of aromatics per gram of diesel; (o) has at least 0.001 grams, from above 0 to about 0.7 grams, or from about 0.001-0.5 grams of kerosene; (p) comprises kerosene, and the kerosene has at least 0.2 grams or at least 0.5 grams of aromatics per gram of kerosene, and/or a freezing point at a temperature of at most −30° C., at most −40° C., or at most −50° C.; (q) has at least 0.001 grams or at least 0.5 grams of naphtha; (r) comprises naphtha, and the naphtha has at most 0.01 grams, at most 0.05 grams, or at most 0.002 grams of benzene per gram of naphtha, an octane number of at least 70, at least 80, or at least 90, and/or iso-paraffins and normal paraffins with a weight ratio of iso-paraffins to normal paraffins in the naphtha of at most 1.4; and/or (s) has a volume that is at least 10% greater than the volume of the crude feed.

In some embodiments, the invention also provides, in combination with one or more of the above embodiments, a method that comprises contacting a crude feed with a catalyst to form a total product that comprises a crude product, further comprising: (a) combining the crude product with a crude that is the same or different from the crude feed to form a blend suitable for transporting; (b) combining the crude product with a crude that is the same or different from the crude feed to form a blend suitable for treatment facilities; (c) fractionating the crude product; (d) fractionating the crude product into one or more distillate fractions, and producing transportation fuel from at least one of the distillate fractions; and/or (e) when the catalyst is a transition metal sulfide catalyst, treating the transition metal sulfide catalyst to recover metals from the transition metal sulfide catalyst.

In some embodiments, the invention also provides, in combination with one or more of the above embodiments, a crude composition that has, per gram of composition: (a) at least 0.001 grams of VGO, and the VGO has at least 0.3 grams of aromatics per gram of VGO; (b) at least 0.001 grams of diesel, and the diesel has at least 0.3 grams of aromatics per gram of diesel; (c) at least 0.001 grams of naphtha, and the naphtha: having at most 0.5 grams of benzene per gram of naphtha, an octane number of at least 70, and/or iso-paraffins and n-paraffins with a weight ratio of the iso-paraffins to the n-paraffins of at most 1.4; (d) a total of at least 0.001 grams of a mixture of components that have a boiling range distribution of at most 204° C. (about 400° F.), and the mixture having at most 0.15 grams of olefins per gram of mixture; (e) a weight ratio of atomic hydrogen to atomic carbon in the composition of at most 1.75, or at most 1.8; (f) at least 0.001 grams of kerosene, and the kerosene has: at least 0.5 grams of aromatics per gram of kerosene and/or has a freezing point at a temperature of at most −30° C.; (g) from about 0.09-0.13 grams of atomic hydrogen per gram of composition; (h) non-condensable hydrocarbon gases and naphtha, which, when combined, have at most 0.15 grams of olefins per gram of the combined non-condensable hydrocarbon gases and naphtha; (i) non-condensable hydrocarbon gases and naphtha, which, when combined, comprise iso-paraffins and n-paraffins with a weight ratio of the iso-paraffins to the n-paraffins in the combined naphtha and non-condensable hydrocarbon gases of at most 1.4; (j) the hydrocarbons with a carbon number of up to 3 comprising: olefins and paraffins with carbon numbers of 2 ($C_2$) and 3 ($C_3$), and a weight ratio of the combined $C_2$ and $C_3$ olefins to the combined $C_2$ and $C_3$ paraffins is at most 0.3; olefins and paraffins with a carbon number of 2 ($C_2$), wherein a weight ratio of the $C_2$ olefins to the $C_2$ paraffins is at most 0.2; and/or olefins and paraffins with a carbon number of 3 ($C_3$), wherein a weight ratio of the $C_3$ olefins to the $C_3$ paraffins is at most 0.3; (k) has butadiene content of at least 0.005 grams; (l) has an API graving in a range from about 15 to about 30 at 15.5° C.; (m) has at most 0.00001 grams of total Ni/V/Fe per gram of composition; (n) a paraffins content of the hydrocarbons having a boiling range distribution of at most 204° C. in a range from about 0.7-0.98 grams; (o) hydrocarbons with a boiling range distribution of at most 204° C. that have, per gram of olefins hydrocarbons having a boiling range distribution of at most 204° C., from about 0.001-0.5 grams of olefins (p) hydrocarbons with a boiling range distribution of at most 204° C. that comprise olefins, and the olefins have at least 0.001 grams of terminal olefins per gram of olefins; (q) hydrocarbons with a boiling range distribution of at most 204° C. that comprise olefins, and the olefins have a molar ratio of terminal olefins to internal olefins of at least 0.4; and/or (r) from about 0.001-0.5 grams of olefins per gram of hydrocarbons in a boiling range distribution between about 20° C. and about 204° C.

In some embodiments, the invention also provides, in combination with one or more of the above embodiments, a crude composition that has at least one of the catalysts comprising one or more alkali metals, in which: (a) at least one of the alkali metals is potassium, rubidium; or cesium, or mixtures thereof; and/or (b) at least one of the catalysts further comprises a transition metal, a transition metal sulfide and/or bartonite.

In further embodiments, features from specific embodiments may be combined with features from other embodiments. For example, features from the any one of the series of embodiments may be combined with features from any of the other series of embodiments.

In further embodiments, crude products are obtainable by any of the methods and systems described herein.

In further embodiments, additional features may be added to the specific embodiments described herein.

BRIEF DESCRIPTION OF THE DRAWINGS

Advantages of the present invention will become apparent to those skilled in the art with the benefit of the following detailed description and upon reference to the accompanying drawings in which:

FIG. 8 is a tabulation of properties of the crude feed and properties of crude products obtained from embodiments of contacting the crude feed with the transition metal sulfide catalyst.

FIG. 10 is a tabulation of properties and compositions of crude products obtained from embodiments of contacting the crude feed with the transition metal sulfide catalyst.

FIG. 16 is a tabulation of components produced from embodiments of contacting the crude feed with inorganic salt catalysts, a metal salt, or silicon carbide.

Figure 1:
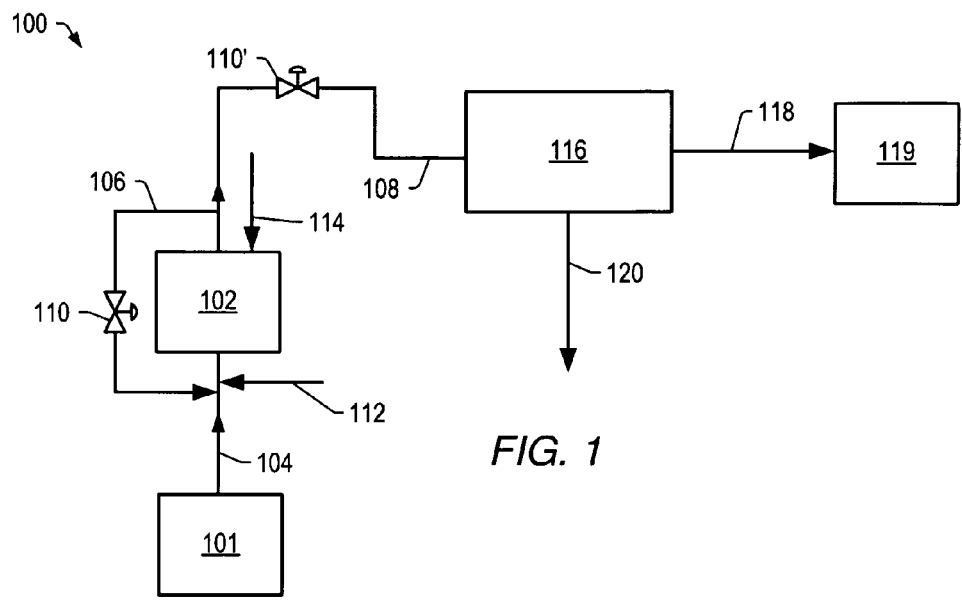
FIG. 1 is a schematic of an embodiment of a contacting system for contacting the crude feed with a hydrogen source in the presence of one or more catalysts to produce the total product.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but on the contrary, the intention is to cover all modifications, equivalents, and alternatives falling within the spirit and scope of the present invention.

DETAILED DESCRIPTION OF THE INVENTION

Certain embodiments of the inventions are described herein in more detail. Terms used herein are defined as follows.

"Alkali metal(s)" refer to one or more metals from Column 1 of the Periodic Table, one or more compounds of one or more metals from Column 1 of the Periodic Table, or mixtures thereof.

"Alkaline-earth metal(s)" refer to one or more metals from Column 2 of the Periodic Table, one or more compounds of one or more metals from Column 2 of the Periodic Table, or mixtures thereof.

"AMU" refers to atomic mass unit.

"ASTM" refers to American Standard Testing and Materials.

"$C_5$ asphaltenes" refer to asphaltenes that are insoluble in pentane. $C_5$ asphaltenes content is as determined by ASTM Method D2007.

Atomic hydrogen percentage and atomic carbon percentage of crude feed, crude product, naphtha, kerosene, diesel, and VGO are as determined by ASTM Method D5291.

"API gravity" refers to API gravity at 15.5° C. API gravity is as determined by ASTM Method D6822.

"Bitumen" refers to one type of crude produced and/or retorted from a hydrocarbon formation.

Boiling range distributions for the crude feed and/or total product are as determined by ASTM Methods D5307, unless otherwise mentioned. Content of hydrocarbon components, for example, paraffins, iso-paraffins, olefins, naphthenes and aromatics in naphtha are as determined by ASTM Method D6730. Content of aromatics in diesel and VGO is as determined by IP Method 368/90. Content of aromatics in kerosene is as determined by ASTM Method D5186.

"Brønsted-Lowry acid" refers to a molecular entity with the ability to donate a proton to another molecular entity.

"Brønsted-Lowry base" refers to a molecular entity that is capable of accepting protons from another molecular entity. Examples of Brønsted-Lowry bases include hydroxide (OH$^-$), water (H$_2$O), carboxylate (RCO$_2^-$), halide (Br$^-$, Cl$^-$, F$^-$, I$^-$), bisulfate (HSO$_4^-$), and sulfate (SO$_4^{2-}$).

"Carbon number" refers to the total number of carbon atoms in a molecule.

"Coke" refers to solids containing carbonaceous solids that are not vaporized under process conditions. The content of coke is as determined by mass balance. The weight of coke is the total weight of solid minus the total weight of input catalysts.

"Content" refers to the weight of a component in a substrate (for example, a crude feed, a total product, or a crude product) expressed as weight fraction or weight percentage based on the total weight of the substrate. "Wtppm" refers to parts per million by weight.

"Diesel" refers to hydrocarbons with a boiling range distribution between 260° C. and 343° C. (500-650° F.) at 0.101 MPa. Diesel content is as determined by ASTM Method D2887.

"Distillate" refers to hydrocarbons with a boiling range distribution between 204° C. and 343° C. (400-650° F.) at 0.101 MPa. Distillate content is as determined by ASTM Method D2887. Distillate may include kerosene and diesel.

"DSC" refers to differential scanning calorimetry.

"Freeze point" and "freezing point" refer to the temperature at which formation of crystalline particles occurs in a liquid. A freezing point is as determined by ASTM D2386.

"GC/MS" refers to gas chromatography in combination with mass spectrometry.

"Hard base" refers to anions as described by Pearson in *Journal of American Chemical Society*, 1963, 85, p. 3533, which is incorporated by reference herein.

"H/C" refers to a weight ratio of atomic hydrogen to atomic carbon. H/C is as determined from the values measured for weight percentage of hydrogen and weight percentage of carbon by ASTM Method D5291.

"Heteroatoms" refer to oxygen, nitrogen, and/or sulfur contained in the molecular structure of a hydrocarbon. Heteroatoms content is as determined by ASTM Methods E385 for oxygen, D5762 for nitrogen, and D4294 for sulfur.

"Hydrogen source" refers to hydrogen, and/or a compound and/or compounds when in the presence of a crude feed and the catalyst react to provide hydrogen to one or more compounds in the crude feed. A hydrogen source may include, but is not limited to, hydrocarbons (for example, $C_1$ to $C_6$ hydrocarbons such as methane, ethane, propane, butane, pentane, naphtha), water, or mixtures thereof. A mass balance is conducted to assess the net amount of hydrogen provided to one or more compounds in the crude feed.

"Inorganic salt" refers to a compound that is composed of a metal cation and an anion.

"IP" refers to the Institute of Petroleum, now the Energy Institute of London, United Kingdom.

"Iso-paraffins" refer to branched-chain saturated hydrocarbons.

"Kerosene" refers to hydrocarbons with a boiling range distribution between about 204° C. and about 260° C. (400-500° F.) at 0.101 MPa. Kerosene content is as determined by ASTM Method D2887.

"Lewis acid" refers to a compound or a material with the ability to accept one or more electrons from another compound.

"Lewis base" refers to a compound and/or material with the ability to donate one or more electrons to another compound.

"Light Hydrocarbons" refer to hydrocarbons having carbon numbers in a range from 1 to 6.

"Liquid mixture" refers to a composition that includes one or more compounds that are liquid at standard temperature and pressure (25° C., 0.101 MPa, hereinafter referred to as "STP"), or a composition that includes a combination of one or more compounds that are liquid at STP with one or more compounds that are solid at STP.

"Micro-Carbon Residue" ("MCR") refers to a quantity of carbon residue remaining after evaporation and pyrolysis of a substance. MCR content is as determined by ASTM Method D4530.

"Naphtha" refers to hydrocarbon components with a boiling range distribution between 38° C. and 204° C. (100-400° F.) at 0.101 MPa. Naphtha content is as determined by ASTM Method D2887.

"Ni/V/Fe" refers to nickel, vanadium, iron, or combinations thereof.

"Ni/V/Fe content" refers to Ni/V/Fe content in a substrate. Ni/V/Fe content is as determined by ASTM Method D5863.

"Nm$^3$/m$^3$" refers to normal cubic meters of gas per cubic meter of crude feed.

"Nonacidic" refers to Lewis base and/or Brønsted-Lowry base properties.

"Non-condensable gas" refers to components and/or a mixture of components that are gases at standard temperature and pressure (25° C., 0.101 MPa, hereinafter referred to as "STP").

"n-Paraffins" refer to normal (straight chain) saturated hydrocarbons.

"Octane number" refers to a calculated numerical representation of the antiknock properties of a motor fuel compared to a standard reference fuel. A calculated octane number of naphtha is as determined by ASTM Method D6730.

"Olefins" refer to compounds with non-aromatic carbon-carbon double bonds. Types of olefins include, but are not limited to, cis, trans, terminal, internal, branched, and linear.

"Periodic Table" refers to the Periodic Table as specified by the International Union of Pure and Applied Chemistry (IUPAC), November 2003.

"Polyaromatic compounds" refer to compounds that include two or more aromatic rings. Examples of polyaromatic compounds include, but are not limited to, indene, naphthalene, anthracene, phenanthrene, benzothiophene, and dibenzothiophene.

"Residue" refers to components that have a boiling range distribution above 538° C. (1000° F.) at 0.101 MPa, as determined by ASTM Method D5307.

"Semiliquid" refers to a phase of a substance that has properties of a liquid phase and a solid phase of the substance. Examples of semiliquid inorganic salt catalysts include a slurry and/or a phase that has a consistency of, for example, taffy, dough, or toothpaste.

"SCFB" refers to standard cubic feet of gas per barrel of crude feed.

"Superbase" refers to a material that can deprotonate hydrocarbons such as paraffins and olefins under reaction conditions.

"TAN" refers to a total acid number expressed as milligrams ("mg") of KOH per gram ("g") of sample. TAN is as determined by ASTM Method D664.

"TAP" refers to temporal-analysis-of-products.

"TMS" refers to transition metal sulfide.

"VGO" refers to components with a boiling range distribution between about 343° C. and about 538° C. (650-1000° F.) at 0.101 MPa. VGO content is as determined by ASTM Method D2887.

All referenced methods are incorporated herein by reference. In the context of this application, it is to be understood that if the value obtained for a property of the composition tested is outside of the limits of the test method, the test method may be recalibrated to test for such property. It should be understood that other standardized testing methods that are considered equivalent to the referenced testing methods may be used.

Crudes may be produced and/or retorted from hydrocarbon containing formations and then stabilized. Crudes are generally solid, semi-solid, and/or liquid. Crudes may include crude oil. Stabilization may include, but is not limited to, removal of non-condensable gases, water, salts, or combinations thereof, from the crude to form a stabilized crude. Such stabilization may often occur at, or proximate to, the production and/or retorting site.

Stabilized crudes typically have not been distilled and/or fractionally distilled in a treatment facility to produce multiple components with specific boiling range distributions (for example, naphtha, distillates, VGO, and/or lubricating oils). Distillation includes, but is not limited to, atmospheric distillation methods and/or vacuum distillation methods. Undistilled and/or unfractionated stabilized crudes may include components that have a carbon number above 4 in quantities of at least 0.5 grams of components per gram of crude. Examples of stabilized crudes include whole crudes, topped crudes, desalted crudes, desalted topped crudes, or combinations thereof. "Topped" refers to a crude that has been treated such that at least some of the components that have a boiling point below 35° C. at 0.101 MPa are removed. Typically, topped crudes have a content of at most 0.1 grams, at most 0.05 grams, or at most 0.02 grams of such components per gram of the topped crude.

Some stabilized crudes have properties that allow the stabilized crudes to be transported to conventional treatment facilities by transportation carriers (for example, pipelines, trucks, or ships). Other crudes have one or more unsuitable properties that render them disadvantaged. Disadvantaged crudes may be unacceptable to a transportation carrier, and/or a treatment facility, thus imparting a low economic value to the disadvantaged crude. The economic value may be such that a reservoir that includes the disadvantaged crude that is deemed too costly to produce, transport, and/or treat.

Properties of disadvantaged crudes may include, but are not limited to: a) TAN of at least 0.5; b) viscosity of at least about 0.2 Pa·s; c) API gravity of at most 19; d) a total Ni/V/Fe content of at least 0.00005 grams or at least 0.0001 grams of Ni/V/Fe per gram of crude; e) a total heteroatoms content of at least 0.005 grams of heteroatoms per gram of crude; f) a residue content of at least 0.01 grams of residue per gram of crude; g) an asphaltenes content of at least 0.04 grams of asphaltenes per gram of crude; h) a MCR content of at least 0.02 grams of MCR per gram of crude; or i) combinations thereof. In some embodiments, disadvantaged crude may include, per gram of disadvantaged crude, at least 0.2 grams of residue, at least 0.3 grams of residue, at least 0.5 grams of residue, or at least 0.9 grams of residue. In certain embodiments, disadvantaged crude has about 0.2-0.99 grams, about 0.3-0.9 grams, or about 0.4-0.7 grams of residue per gram of disadvantaged crude. In certain embodiments, disadvantaged crudes, per gram of disadvantaged crude, may have a sulfur content of at least 0.001 grams, at least 0.005 grams, at least 0.01 grams, or at least 0.02 grams.

Disadvantaged crudes may include a mixture of hydrocarbons having a range of boiling points. Disadvantaged crudes may include, per gram of disadvantaged crude: at least 0.001 grams, at least 0.005 grams, or at least 0.01 grams of hydrocarbons with a boiling range distribution between about 200° C. and about 300° C. at 0.101 MPa; at least 0.001 grams, at least 0.005 grams, or at least 0.01 grams of hydrocarbons with a boiling range distribution between about 300° C. and about 400° C. at 0.101 MPa; and at least 0.001 grams, at least 0.005 grams, or at least 0.01 grams of hydrocarbons with a boiling range distribution between about 400° C. and about 700° C. at 0.101 MPa, or combinations thereof.

In some embodiments, disadvantaged crudes may also include, per gram of disadvantaged crude, at least 0.001 grams, at least 0.005 grams, or at least 0.01 grams of hydrocarbons with a boiling range distribution of at most 200° C. at 0.101 MPa in addition to higher boiling components. Typically, the disadvantaged crude has, per gram of disadvantaged crude, a content of such hydrocarbons of at most 0.2 grams, or at most 0.1 grams.

In certain embodiments, disadvantaged crudes may include, per gram of disadvantaged crude, up to 0.9 grams, or up to 0.99 grams of hydrocarbons with a boiling range distribution of at least 300° C. In certain embodiments, disadvantaged crudes may also include, per gram of disadvantaged crude, at least 0.001 grams of hydrocarbons with a boiling range distribution of at least 650° C. In certain embodiments, disadvantaged crudes may include, per gram of disadvantaged crude, up to about 0.9 grams, or up to about 0.99 grams of hydrocarbons with a boiling range distribution between about 300° C. and about 1000° C.

Examples of disadvantaged crudes that can be treated using the processes described herein include, but are not limited to, crudes from the following countries and regions of those countries: Canadian Alberta, Venezuelan Orinoco, U.S. southern Californian and north slope Alaska, Mexico Bay of Campeche, Argentinean San Jorge basin, Brazilian Santos and Campos basins, China Bohai Gulf, China Karamay, Iraq Zagros, Kazakhstan Caspian, Nigeria Offshore, United Kingdom North Sea, Madagascar northwest, Oman, and Netherlands Schoonebek.

Treatment of disadvantaged crudes may enhance the properties of the disadvantaged crudes such that the crudes are acceptable for transportation and/or treatment. A crude and/or disadvantaged crude that is to be treated may be referred to as "crude feed". The crude feed may be topped as described herein. The crude product resulting from treatment of the crude feed, using methods described herein, is suitable for transporting and/or refining. Properties of the crude product are closer to the corresponding properties of West Texas Intermediate crude than the crude feed, or closer to the corresponding properties of Brent crude than the crude feed, and thereby have enhanced economic value relative to the economic value of the crude feed. Such crude product may be refined with less or no pre-treatment, thereby enhancing refining efficiencies. Pre-treatment may include desulfurization, demetallization, and/or atmospheric distillation to remove impurities from the crude product.

Methods of contacting a crude feed in accordance with inventions are described herein. Additionally, embodiments to produce products with various concentrations of naphtha, kerosene, diesel, and/or VGO, which are not generally produced in conventional types of processes, are described.

The crude feed may be contacted with a hydrogen source in the presence of one or more of the catalysts in a contacting zone and/or in combinations of two or more contacting zones.

In some embodiments, the hydrogen source is generated in situ. In situ generation of the hydrogen source may include the reaction of at least a portion of the crude feed with the inorganic salt catalyst at temperatures in a range from about 200-500° C. or about 300-400° C. to form hydrogen and/or light hydrocarbons. In situ generation of hydrogen may include the reaction of at least a portion of the inorganic salt catalyst that includes, for example, alkali metal formate.

The total product generally includes gas, vapor, liquids, or mixtures thereof produced during the contacting. The total product includes the crude product that is a liquid mixture at STP and, in some embodiments, hydrocarbons that are not condensable at STP. In some embodiments, the total product and/or the crude product may include solids (such as inorganic solids and/or coke). In certain embodiments, the solids may be entrained in the liquid and/or vapor produced during contacting.

A contacting zone typically includes a reactor, a portion of a reactor, multiple portions of a reactor, or multiple reactors. Examples of reactors that may be used to contact a crude feed with a hydrogen source in the presence of catalyst include a stacked bed reactor, a fixed bed reactor, a continuously stirred tank reactor (CSTR), a spray reactor, a plug-flow reactor, and a liquid/liquid contactor. Examples of a CSTR include a fluidized bed reactor and an ebullating bed reactor.

Contacting conditions typically include temperature, pressure, crude feed flow, total product flow, residence time, hydrogen source flow, or combinations thereof. Contacting conditions may be controlled to produce a crude product with specified properties.

Contacting temperatures may range from about 200-800° C., about 300-700° C., or about 400-600° C. In embodiments in which the hydrogen source is supplied as a gas (for example, hydrogen gas, methane, or ethane), a ratio of the gas to the crude feed will generally range from about 1-16,100 $Nm^3/m^3$, about 2-8000 $Nm^3/m^3$, about 3-4000 $Nm^3/m^3$, or about 5-320 $Nm^3/m^3$. Contacting typically takes place in a pressure range between about 0.1-20 MPa, about 1-16 MPa, about 2-10 MPa, or about 4-8 MPa. In some embodiments in which steam is added, a ratio of steam to crude feed is in a range from about 0.01-3 kilograms, about 0.03-2.5 kilograms, or about 0.1-1 kilogram of steam, per kilogram of crude feed. A flow rate of crude feed may be sufficient to maintain the volume of crude feed in the contacting zone of at least 10%, at least 50%, or at least 90% of the total volume of the contacting zone. Typically, the volume of crude feed in the contacting zone is about 40%, about 60%, or about 80% of the total volume of the contacting zone. In some embodiments, contacting may be done in the presence of an additional gas, for example, argon, nitrogen, methane, ethane, propanes, butanes, propenes, butenes, or combinations thereof.

FIG. 1 is a schematic of an embodiment of contacting system 100 used to produce the total product as a vapor. The crude feed exits crude feed supply 101 and enters contacting zone 102 via conduit 104. A quantity of the catalyst used in the contacting zone may range from about 1-100 grams, about 2-80 grams, about 3-70 grams, or about 4-60 grams, per 100 grams of crude feed in the contacting zone. In certain embodiments, a diluent may be added to the crude feed to lower the viscosity of the crude feed. In some embodiments, the crude feed enters a bottom portion of contacting zone 102 via conduit 104. In certain embodiments, the crude feed may be heated to a temperature of at least 100° C. or at least 300° C. prior to and/or during introduction of the crude feed to contacting zone 102. Typically, the crude feed may be heated to a temperature in a range from about 100-500° C. or about 200-400° C.

In some embodiments, the catalyst is combined with the crude feed and transferred to contacting zone 102. The crude feed/catalyst mixture may be heated to a temperature of at least 100° C. or at least 300° C. prior to introduction into contacting zone 102. Typically, the crude feed may be heated to a temperature in a range from about 200-500° C. or about 300-400° C. In some embodiments, the crude feed/catalyst mixture is a slurry. In certain embodiments, TAN of the crude feed may be reduced prior to introduction of the crude feed into the contacting zone. For example, when the crude feed/catalyst mixture is heated at a temperature in a range from about 100-400° C. or about 200-300° C., alkali salts of acidic components in the crude feed may be formed. The formation of these alkali salts may remove some acidic components from the crude feed to reduce the TAN of the crude feed.

In some embodiments, the crude feed is added continuously to contacting zone 102. Mixing in contacting zone 102 may be sufficient to inhibit separation of the catalyst from the crude feed/catalyst mixture. In certain embodiments, at least a portion of the catalyst may be removed from contacting zone 102, and in some embodiments, such catalyst is regenerated and re-used. In certain embodiments, fresh catalyst may be added to contacting zone 102 during the reaction process.

In some embodiments, the crude feed and/or a mixture of crude feed with the inorganic salt catalyst is introduced into the contacting zone as an emulsion. The emulsion may be prepared by combining an inorganic salt catalyst/water mixture with a crude feed/surfactant mixture. In some embodiments, a stabilizer is added to the emulsion. The emulsion may remain stable for at least 2 days, at least 4 days, or at least 7 days. Typically, the emulsion may remain stable for 30 days, 10 days, 5 days, or 3 days. Surfactants include, but are not limited to, organic polycarboxylic acids (Tenax 2010; Mead-Westvaco Specialty Product Group; Charleston, S.C., U.S.A.), $C_{21}$ dicarboxylic fatty acid (DIACID 1550; Mead-Westvaco Specialty Product Group), petroleum sulfonates (Hostapur SAS 30; Clarient Corporation, Charlotte, N.C., U.S.A.), Tergital NP-40 Surfactant (Union Carbide; Danbury, Conn., U.S.A.), or mixtures thereof. Stabilizers include, but are not limited to, diethyleneamine (Aldrich Chemical Co.; Milwaukee, Wis., U.S.A.) and/or monoethanolamine (J. T. Baker; Phillipsburg, N.J., U.S.A.).

Recycle conduit 106 may couple conduit 108 and conduit 104. In some embodiments, recycle conduit 106 may directly enter and/or exit contacting zone 102. Recycle conduit 106 may include flow control valve 110. Flow control valve 110 may allow at least a portion of the material from conduit 108 to be recycled to conduit 104 and/or contacting zone 102. In some embodiments, a condensing unit may be positioned in conduit 108 to allow at least a portion of the material to be condensed and recycled to contacting zone 102. In certain embodiments, recycle conduit 106 may be a gas recycle line. Flow control valves 110 and 110' may be used to control flow to and from contacting zone 102 such that a constant volume of liquid in the contacting zone is maintained. In some embodiments, a substantially selected volume range of liquid can be maintained in the contacting zone 102. A volume of feed in contacting zone 102 may be monitored using standard instrumentation. Gas inlet port 112 may be used to allow addition of the hydrogen source and/or additional gases to the crude feed as the crude feed enters contacting zone 102. In some embodiments, steam inlet port 114 may be used to allow addition of steam to contacting zone 102. In certain embodiments, an aqueous stream is introduced into contacting zone 102 through steam inlet port 114.

In some embodiments, at least a portion of the total product is produced as vapor from contacting zone 102. In certain embodiments, the total product is produced as vapor and/or a vapor containing small amounts of liquids and solids from the top of contacting zone 102. The vapor is transported to separation zone 116 via conduit 108. The ratio of a hydrogen source to crude feed in contacting zone 102 and/or the pressure in the contacting zone may be changed to control the vapor and/or liquid phase produced from the top of contacting zone 102. In some embodiments, the vapor produced from the top of contacting zone 102 includes at least 0.5 grams, at least 0.8 grams, at least 0.9 grams, or at least 0.97 grams of crude product per gram of crude feed. In certain embodiments, the vapor produced from the top of contacting zone 102 includes from about 0.8-0.99 grams, or about 0.9-0.98 grams of crude product per gram of crude feed.

Used catalyst and/or solids may remain in contacting zone 102 as by-products of the contacting process. The solids and/or used catalyst may include residual crude feed and/or coke.

In separation unit 116, the vapor is cooled and separated to form the crude product and gases using standard separation techniques. The crude product exits separation unit 116 and enters crude product receiver 119 via conduit 118. The resulting crude product may be suitable for transportation and/or treatment. Crude product receiver 119 may include one or more pipelines, one or more storage units, one or more transportation vessels, or combinations thereof. In some embodiments, the separated gas (for example, hydrogen, carbon monoxide, carbon dioxide, hydrogen sulfide, or methane) is transported to other processing units (for example, for use in a fuel cell or a sulfur recovery plant) and/or recycled to contacting zone 102 via conduit 120. In certain embodiments, entrained solids and/or liquids in the crude product may be removed using standard physical separation methods (for example, filtration, centrifugation, or membrane separation).

Figure 2:
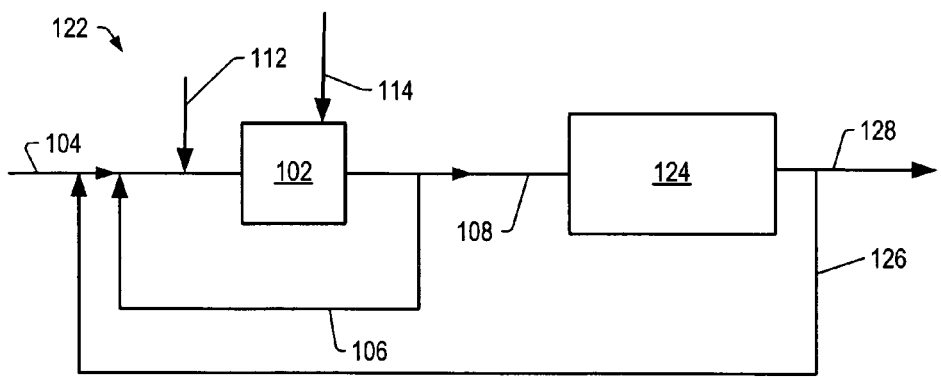
FIG. 2 is a schematic of another embodiment of a contacting system for contacting the crude feed with a hydrogen source in the presence of one or more catalysts to produce the total product.

FIG. 2 depicts contacting system 122 for treating crude feed with one or more catalysts to produce a total product that may be a liquid, or a liquid mixed with gas or solids. The crude feed may enter contacting zone 102 via conduit 104. In some embodiments, the crude feed is received from the crude feed supply. Conduit 104 may include gas inlet port 112. In some embodiments, gas inlet port 112 may directly enter contacting zone 102. In certain embodiments, steam inlet port 114 may be used to allow addition of the steam to contacting zone 102. The crude feed may be contacted with the catalyst in contacting zone 102 to produce a total product. In some embodiments, conduit 106 allows at least a portion of the total product to be recycled to contacting zone 102. A mixture that includes the total product and/or solids and/or unreacted crude feed exits contacting zone 102 and enters separation zone 124 via conduit 108. In some embodiments, a condensing unit may be positioned (for example, in conduit 106) to allow at least a portion of the mixture in the conduit to be condensed and recycled to contacting zone 102 for further processing. In certain embodiments, recycle conduit 106 may be a gas recycle line. In some embodiments, conduit 108 may include a filter for removing particles from the total product.

In separation zone 124, at least a portion of the crude product may be separated from the total product and/or catalyst. In embodiments in which the total product includes solids, the solids may be separated from the total product using standard solid separation techniques (for example, centrifugation, filtration, decantation, membrane separation). Solids include, for example, a combination of catalyst, used catalyst, and/or coke. In some embodiments, a portion of the gases is separated from the total product. In some embodiments, at least a portion of the total product and/or solids may be recycled to conduit 104 and/or, in some embodiments, to contacting zone 102 via conduit 126. The recycled portion may, for example, be combined with the crude feed and enter contacting zone 102 for further processing. The crude product may exit separation zone 124 via conduit 128. In certain embodiments, the crude product may be transported to the crude product receiver.

In some embodiments, the total product and/or crude product may include at least a portion of the catalyst. Gases entrained in the total product and/or crude product may be separated using standard gas/liquid separation techniques, for example, sparging, membrane separation, and pressure reduction. In some embodiments, the separated gas is transported to other processing units (for example, for use in a fuel cell, a sulfur recovery plant, other processing units, or combinations thereof) and/or recycled to the contacting zone.

Figure 3:
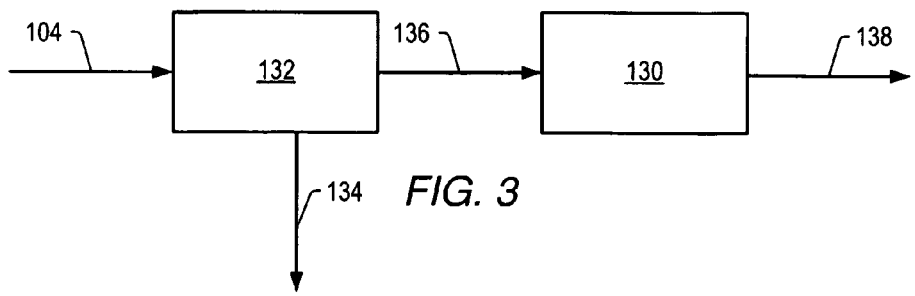
FIG. 3 is a schematic of an embodiment of a separation zone in combination with a contacting system.

In some embodiments, separation of at least a portion of a crude feed is performed before the crude feed enters the contacting zone. FIG. 3 is a schematic of an embodiment of a separation zone in combination with a contacting system. Contacting system 130 may be contacting system 100 and/or contacting system 122 (shown in FIGS. 1 and 2). The crude feed enters separation zone 132 via conduit 104. In separation zone 132, at least a portion of the crude feed is separated using standard separation techniques to produce a separated crude feed and hydrocarbons. The separated crude feed, in some embodiments, includes a mixture of components with a boiling range distribution of at least 100° C., at least 120° C. or, in some embodiments, a boiling range distribution of at least 200° C. Typically, the separated crude feed includes a mixture of components with a boiling range distribution between about 100-1000° C., about 120-900° C., or about 200-800° C. The hydrocarbons separated from the crude feed exit separation zone 132 via conduit 134 to be transported to other processing units, treatment facilities, storage facilities, or combinations thereof.

At least a portion of the separated crude feed exits separation zone 132 and enters contacting system 130 via conduit 136 to be further processed to form the crude product, which exits contacting system 130 via conduit 138.

In some embodiments, the crude product produced from a crude feed by any method described herein is blended with a crude that is the same as or different from the crude feed. For example, the crude product may be combined with a crude having a different viscosity thereby resulting in a blended product having a viscosity that is between the viscosity of the crude product and the viscosity of the crude. The resulting blended product may be suitable for transportation and/or treatment.

Figure 4:
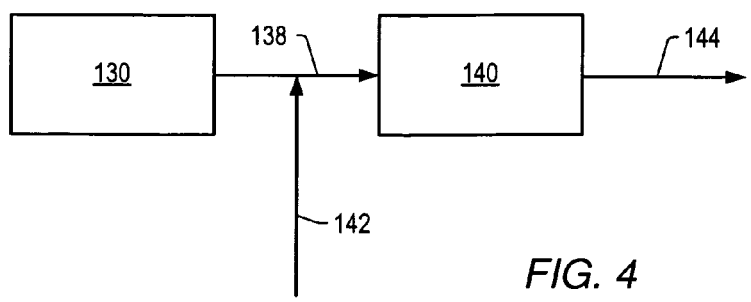
FIG. 4 is a schematic of an embodiment of a blending zone in combination with a contacting system.

FIG. 4 is a schematic of an embodiment of a combination of blending zone 140 and contacting system 130. In certain embodiments, at least a portion of the crude product exits contacting system 130 via conduit 138 and enters blending zone 140. In blending zone 140, at least a portion of the crude product is combined with one or more process streams (for example, a hydrocarbon stream produced from separation of one or more crude feeds, or naphtha), a crude, a crude feed, or mixtures thereof, to produce a blended product. The process streams, crude feed, crude, or mixtures thereof, are introduced directly into blending zone 140 or upstream of the blending zone via conduit 142. A mixing system may be located in or near blending zone 140. The blended product may meet specific product specifications. Specific product specifications include, but are not limited to, a range of or a limit of API gravity, TAN, viscosity, or combinations thereof. The blended product exits blending zone 140 via conduit 144 to be transported and/or processed.

In some embodiments, methanol is generated during the contacting process using the catalyst. For example, hydrogen and carbon monoxide may react to form methanol. The recovered methanol may contain dissolved salts, for example, potassium hydroxide. The recovered methanol may be combined with additional crude feed to form a crude feed/methanol mixture. Combining methanol with the crude feed tends to lower the viscosity of the crude feed. Heating the crude feed/methanol mixture to at most 500° C. may reduce TAN of the crude feed to less than 1.

Figure 5:
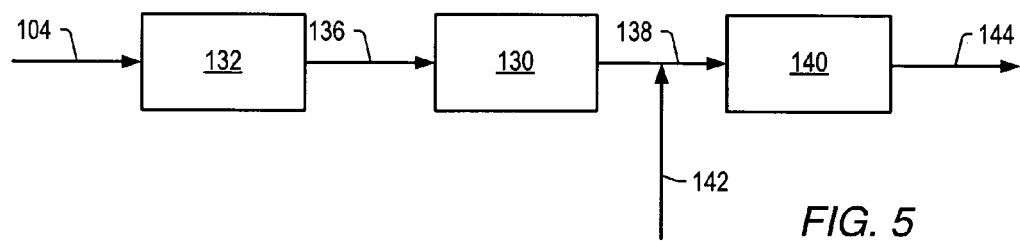
FIG. 5 is a schematic of an embodiment of a separation zone, a contacting system, and a blending zone.

FIG. 5 is a schematic of an embodiment of a separation zone in combination with a contacting system in combination with a blending zone. The crude feed enters separation zone 132 through conduit 104. The crude feed is separated as previously described to form a separated crude feed. The separated crude feed enters contacting system 130 through conduit 136. The crude product exits contacting system 130 and enters blending zone 140 through conduit 138. In blending zone 140, other process stream and/or crudes introduced via conduit 142 are combined with the crude product to form a blended product. The blended product exits blending zone 140 via conduit 144.

Figure 6:
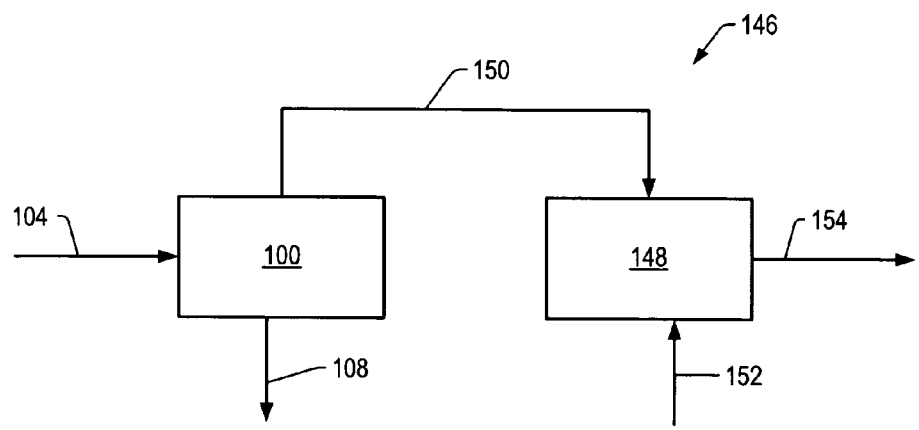
FIG. 6 is a schematic of an embodiment of multiple contacting systems.

FIG. 6 is a schematic of multiple contacting system 146. Contacting system 100 (shown in FIG. 1) may be positioned before contacting system 148. In an alternate embodiment, the positions of the contacting systems can be reversed. Contacting system 100 includes an inorganic salt catalyst. Contacting system 148 may include one or more catalysts. The catalyst in contacting system 148 may be an additional inorganic salt catalyst, the transition metal sulfide catalyst, commercial catalysts, or mixtures thereof. The crude feed enters contacting system 100 via conduit 104 and is contacted with a hydrogen source in the presence of the inorganic salt catalyst to produce the total product. The total product includes hydrogen and, in some embodiments, a crude product. The total product may exit contacting system 100 via conduit 108. The hydrogen generated from contact of the inorganic salt catalyst with the crude feed may be used as a hydrogen source for contacting system 148. At least a portion of the generated hydrogen is transferred to contacting system 148 from contacting system 100 via conduit 150.

In an alternate embodiment, such generated hydrogen may be separated and/or treated, and then transferred to contacting system 148 via conduit 150. In certain embodiments, contacting system 148 may be a part of contacting system 100 such that the generated hydrogen flows directly from contacting system 100 to contacting system 148. In some embodiments, a vapor stream produced from contacting system 100 is directly mixed with the crude feed entering contacting system 148.

A second crude feed enters contacting system 148 via conduit 152. In contacting system 148, contact of the crude feed with at least a portion of the generated hydrogen and the catalyst produces a product. The product is, in some embodiments, the total product. The product exits contacting system 148 via conduit 154.

In certain embodiments, a system that includes contacting systems, contacting zones, separation zones, and/or blending zones, as shown in FIGS. 1-6, may be located at or proximate to a production site that produces disadvantaged crude feed. After processing through the catalytic system, the crude feed may be considered suitable for transportation and/or for use in a refinery process.

In some embodiments, the crude product and/or the blended product are transported to a refinery and/or a treatment facility. The crude product and/or the blended product may be processed to produce commercial products such as transportation fuel, heating fuel, lubricants, or chemicals. Processing may include distilling and/or fractionally distilling the crude product and/or blended product to produce one or more distillate fractions. In some embodiments, the crude product, the blended product, and/or the one or more distillate fractions may be hydrotreated.

The total product includes, in some embodiments, at most 0.05 grams, at most 0.03 grams, or at most 0.01 grams of coke per gram of total product. In certain embodiments, the total product is substantially free of coke (that is, coke is not detectable). In some embodiments, the crude product may include at most 0.05 grams, at most 0.03 grams, at most 0.01 grams, at most 0.005 grams, or at most 0.003 grams of coke per gram of crude product. In certain embodiments, the crude product has a coke content in a range from above 0 to about 0.05, about 0.00001-0.03 grams, about 0.0001-0.01 grams, or about 0.001-0.005 grams per gram of crude product, or is not detectable.

In certain embodiments, the crude product has an MCR content that is at most 90%, at most 80%, at most 50%, at most 30%, or at most 10% of the MCR content of the crude feed. In some embodiments, the crude product has a negligible MCR content. In some embodiments, the crude product has, per gram of crude product, at most 0.05 grams, at most 0.03 grams, at most 0.01 grams, or at most 0.001 grams of MCR. Typically, the crude product has from about 0 grams to about 0.04 grams, about 0.000001-0.03 grams, or about 0.00001-0.01 grams of MCR per gram of crude product.

In some embodiments, the total product includes non-condensable gas. The non-condensable gas typically includes, but is not limited to, carbon dioxide, ammonia, hydrogen sulfide, hydrogen, carbon monoxide, methane, other hydrocarbons that are not condensable at STP, or a mixture thereof.

In certain embodiments, hydrogen gas, carbon dioxide, carbon monoxide, or combinations thereof can be formed in situ by contact of steam and light hydrocarbons with the inorganic salt catalyst. Typically, under thermodynamic conditions a molar ratio of carbon monoxide to carbon dioxide is about 0.07. A molar ratio of the generated carbon monoxide to the generated carbon dioxide, in some embodiments, is at least 0.3, at least 0.5, or at least 0.7. In some embodiments, a molar ratio of the generated carbon monoxide to the generated carbon dioxide is in a range from about 0.3-1.0, about 0.4-0.9, or about 0.5-0.8. The ability to generate carbon monoxide preferentially to carbon dioxide in situ may be beneficial to other processes located in a proximate area or upstream of the process. For example, the generated carbon monoxide may be used as a reducing agent in treating hydrocarbon formations or used in other processes, for example, syngas processes.

In some embodiments, the total product as produced herein may include a mixture of compounds that have a boiling range distribution between about −10° C. and about 538° C. The mixture may include hydrocarbons that have carbon numbers in a range from 1 to 4. The mixture may include from about 0.001-0.8 grams, about 0.003-0.1 grams, or about 0.005-0.01 grams, of $C_4$ hydrocarbons per gram of such mixture. The $C_4$ hydrocarbons may include from about 0.001-0.8 grams, about 0.003-0.1 grams, or about 0.005-0.01 grams of butadiene per gram of $C_4$ hydrocarbons. In some embodiments, iso-paraffins are produced relative to n-paraffins at a weight ratio of at most 1.5, at most 1.4, at most 1.0, at most 0.8, at most 0.3, or at most 0.1. In certain embodiments, iso-paraffins are produce relative to n-paraffins at a weight ratio in a range from about 0.00001-1.5, about 0.0001-1.0, or about 0.001-0.1. The paraffins may include iso-paraffins and/or n-paraffins.

In some embodiments, the total product and/or crude product may include olefins and/or paraffins in ratios or amounts that are not generally found in crudes produced and/or retorted from a formation. The olefins include a mixture of olefins with a terminal double bond ("alpha olefins") and olefins with internal double bonds. In certain embodiments, the olefin content of the crude product is greater than the olefin content of the crude feed by a factor of about 2, about 10, about 50, about 100, or at least 200. In some embodiments, the olefin content of the crude product is greater than the olefin content of the crude feed by a factor of at most 1,000, at most 500, at most 300, or at most 250.

In certain embodiments, the hydrocarbons with a boiling range distribution between 20-400° C. have an olefins content in a range from about 0.00001-0.1 grams, about 0.0001-0.05 grams, or about 0.01-0.04 grams per gram of hydrocarbons having a boiling range distribution in a range between 20-400° C.

In some embodiments, at least 0.001 grams, at least 0.005 grams, or at least 0.01 grams of alpha olefins per gram of crude product may be produced. In certain embodiments, the crude product has from about 0.0001-0.5 grams, about 0.001-0.2 grams, or about 0.01-0.1 grams of alpha olefins per gram of crude product. In certain embodiments, the hydrocarbons with a boiling range distribution between about 20-400° C. have an alpha olefins content in a range from about 0.0001-0.08 grams, about 0.001-0.05 grams, or about 0.01-0.04 grams per gram of hydrocarbons with a boiling range distribution between about 20-400° C.

In some embodiments, the hydrocarbons with a boiling range distribution between 20-204° C. have a weight ratio of alpha olefins to internal double bond olefins of at least 0.7, at least 0.8, at least 0.9, at least 1.0, at least 1.4, or at least 1.5. In some embodiments, the hydrocarbons with a boiling range distribution between 20-204° C. have a weight ratio of alpha olefins to internal double bond olefins in a range from about 0.7-10, about 0.8-5, about 0.9-3, or about 1-2. A weight ratio of alpha olefins to internal double bond olefins of the crudes and commercial products is typically at most 0.5. The ability to produce an increased amount of alpha olefins to olefins with internal double bonds may facilitate the conversion of the crude product to commercial products.

In some embodiments, contact of a crude feed with a hydrogen source in the presence of an inorganic salt catalyst may produce hydrocarbons with a boiling range distribution between 20-204° C. that include linear olefins. The linear olefins have cis and trans double bonds. A weight ratio of linear olefins with trans double bonds to linear olefins with cis double bonds is at most 0.4, at most 1.0, or at most 1.4. In certain embodiments, the weight ratio of linear olefins with trans double bonds to linear olefins with cis double bonds is in a range from about 0.001-1.4, about 0.01-1.0, or about 0.1-0.4.

In certain embodiments, hydrocarbons having a boiling range distribution in a range between 20-204° C. have a n-paraffins content of at least 0.1 grams, at least 0.15 grams, at least 0.20 grams, or at least 0.30 grams per gram of hydrocarbons having a boiling range distribution in a range between 20-400° C. The n-paraffins content of such hydrocarbons, per gram of hydrocarbons, may be in a range from about 0.001-0.9 grams, about 0.1-0.8 grams, or about 0.2-0.5 grams. In some embodiments, such hydrocarbons have a weight ratio of the iso-paraffins to the n-paraffins of at most 1.5, at most 1.4, at most 1.0, at most 0.8, or at most 0.3. From the n-paraffins content in such hydrocarbons, the n-paraffins content of the crude product may be estimated to be in a range from about 0.001-0.9 grams, about 0.01-0.8 grams, or about 0.1-0.5 grams per gram of crude product.

In some embodiments, the crude product has a total Ni/V/Fe content of at most 90%, at most 50%, at most 10%, at most 5%, or at most 3% of a Ni/V/Fe content of the crude feed. In certain embodiments, the crude product includes, per gram of crude product, at most 0.0001 grams, at most $1\times10^{-5}$ grams, or at most $1\times10^{-6}$ grams of Ni/V/Fe. In certain embodiments, the crude product has, per gram of crude product, a total Ni/V/Fe content in a range from about $1\times10^{-7}$ grams to about $5\times10^{-5}$ grams, about $3\times10^{-7}$ grams to about $2\times10^{-5}$ grams, or about $1\times10^{-6}$ grams to about $1\times10^{-5}$ grams.

In some embodiments, the crude product has a TAN of at most 90%, at most 50%, or at most 10% of the TAN of the crude feed. The crude product may, in certain embodiments, have a TAN of at most 1, at most 0.5, at most 0.1, or at most 0.05. In some embodiments, TAN of the crude product may be in a range from about 0.001 to about 0.5, about 0.01 to about 0.2, or about 0.05 to about 0.1.

In certain embodiments, the API gravity of the crude product is at least 10% higher, at least 50% higher, or at least 90% higher than the API gravity of the crude feed. In certain embodiments, API gravity of the crude product is between about 13-50, about 15-30, or about 16-20.

In some embodiments, the crude product has a total heteroatoms content of at most 70%, at most 50%, or at most 30% of the total heteroatoms content of the crude feed. In certain embodiments, the crude product has a total heteroatoms content of at least 10%, at least 40%, or at least 60% of the total heteroatoms content of the crude feed.

The crude product may have a sulfur content of at most 90%, at most 70%, or at most 60% of a sulfur content of the crude feed. The sulfur content of the crude product, per gram of crude product, may be at most 0.02 grams, at most 0.008 grams, at most 0.005 grams, at most 0.004 grams, at most 0.003 grams, or at most 0.001 grams. In certain embodiments, the crude product has, per gram of crude product, a sulfur content in a range from about 0.0001-0.02 grams or about 0.005-0.01 grams.

In certain embodiments, the crude product may have a nitrogen content of at most 90% or at most 80% of a nitrogen content of the crude feed. The nitrogen content of the crude product, per gram of crude product, may be at most 0.004 grams, at most 0.003 grams, or at most 0.001 grams. In some embodiments, the crude product has, per gram of crude product, a nitrogen content in a range from about 0.0001-0.005 grams, or about 0.001-0.003 grams.

In some embodiments, the crude product has, per gram of crude product, from about 0.05-0.2 grams, or about 0.09-0.15 grams of hydrogen. The H/C of the crude product may be at most 1.8, at most 1.7, at most 1.6, at most 1.5, or at most 1.4. In some embodiments, the H/C of the crude product is about 80-120%, or about 90-110% of the H/C of the crude feed. In other embodiments, the H/C of the crude product is about 100-120% of the H/C of the crude feed. A crude product H/C within 20% of the crude feed H/C indicates that uptake and/or consumption of hydrogen in the process is minimal.

The crude product includes components with a range of boiling points. In some embodiments, the crude product includes: at least 0.001 grams, or from about 0.001 to about 0.5 grams of hydrocarbons with a boiling range distribution of at most 200° C. or at most 204° C. at 0.101 MPa; at least 0.001 grams, or from about 0.001 to about 0.5 grams of hydrocarbons with a boiling range distribution between about 200° C. and about 300° C. at 0.101 MPa; at least 0.001 grams, or from about 0.001 to about 0.5 grams of hydrocarbons with a boiling range distribution between about 300° C. and about 400° C. at 0.101 MPa; and at least 0.001 grams, or from about 0.001 to about 0.5 grams of hydrocarbons with a boiling range distribution between about 400° C. and about 538° C. at 0.101 MPa.

In some embodiments, the crude product has, per gram of crude product, a naphtha content from about 0.00001-0.2 grams, about 0.0001-0.1 grams, or about 0.001-0.05 grams.

In certain embodiments, the crude product has from 0.001-0.2 grams or 0.01-0.05 grams of naphtha. In some embodiments, the naphtha has at most 0.15 grams, at most 0.1 grams, or at most 0.05 grams of olefins per gram of naphtha. The crude product has, in certain embodiments, from 0.00001-0.15 grams, 0.0001-0.1 grams, or 0.001-0.05 grams of olefins per gram of crude product. In some embodiments, the naphtha has, per gram of naphtha, a benzene content of at most 0.01 grams, at most 0.005 grams, or at most 0.002 grams. In certain embodiments, the naphtha has a benzene content that is non-detectable, or in a range from about $1 \times 10^{-7}$ grams to about $1 \times 10^{-2}$ grams, about $1 \times 10^{-6}$ grams to about $1 \times 10^{-5}$ grams, about $5 \times 10^{-6}$ grams to about $1 \times 10^{-4}$ grams. Compositions that contain benzene may be considered hazardous to handle, thus a crude product that has a relatively low benzene content may not require special handling.

In certain embodiments, naphtha may include aromatic compounds. Aromatic compounds may include monocyclic ring compounds and/or polycyclic ring compounds. The monocyclic ring compounds may include, but are not limited to, benzene, toluene, ortho-xylene, meta-xylene, para-xylene, ethyl benzene, 1-ethyl-3-methyl benzene; 1-ethyl-2-methyl benzene; 1,2,3-trimethyl benzene; 1,3,5-trimethyl benzene; 1-methyl-3-propyl benzene; 1-methyl-2-propyl benzene; 2-ethyl-1,4-dimethyl benzene; 2-ethyl-2,4-dimethyl benzene; 1,2,3,4-tetra-methyl benzene; ethyl, pentylmethyl benzene; 1,3 diethyl-2,4,5,6-tetramethyl benzene; tri-isopropyl-ortho-xylene; substituted congeners of benzene, toluene, ortho-xylene, meta-xylene, para-xylene, or mixtures thereof. Monocyclic aromatics are used in a variety of commercial products and/or sold as individual components. The crude product produced as described herein typically has an enhanced content of monocyclic aromatics.

In certain embodiments, the crude product has, per gram of crude product, a toluene content from about 0.001-0.2 grams, about 0.05-0.15 grams, or about 0.01-0.1 grams. The crude product has, per gram of crude product, a meta-xylene content from about 0.001-0.1 grams, about 0.005-0.09 grams, or about 0.05-0.08 grams. The crude product has, per gram of crude product, an ortho-xylene content from about 0.001-0.2 grams, about 0.005-0.1 grams, or about 0.01-0.05 grams. The crude product has, per gram of crude product, a para-xylene content from about 0.001-0.09 grams, about 0.005-0.08 grams, or about 0.001-0.06 grams.

An increase in the aromatics content of naphtha tends to increase the octane number of the naphtha. Crudes may be valued based on an estimation of a gasoline potential of the crudes. Gasoline potential may include, but is not limited to, a calculated octane number for the naphtha portion of the crudes. Crudes typically have calculated octane numbers in a range of about 35-60. The octane number of gasoline tends to reduce the requirement for additives that increase the octane number of the gasoline. In certain embodiments, the crude product includes naphtha that has an octane number of at least 60, at least 70, at least 80, or at least 90. Typically, the octane number of the naphtha is in a range from about 60-99, about 70-98, or about 80-95.

In some embodiments, the crude product has a higher total aromatics content in hydrocarbons having a boiling range distribution between 204° C. and 500° C. (total "naphtha and kerosene") relative to the total aromatics content in the total naphtha and kerosene of the crude feed by at least 5%, at least 10%, at least 50%, or at least 99%. Typically, the total aromatics content in the total naphtha and kerosene of crude feed is about 8%, about 20%, about 75%, or about 100% greater than the total aromatics content in the total naphtha and kerosene of the crude feed.

In some embodiments, the kerosene and naphtha may have a total polyaromatic compounds content in a range from about 0.00001-0.5 grams, about 0.0001-0.2 grams, or about 0.001-0.1 grams per gram of total kerosene and naphtha.

The crude product has, per gram of crude product, a distillate content in a range from about 0.0001-0.9 grams, from about 0.001-0.5 grams, from about 0.005-0.3 grams, or from about 0.01-0.2 grams. In some embodiments, a weight ratio of kerosene to diesel in the distillate, is in a range from about 1:4 to about 4:1, about 1:3 to about 3:1, or about 2:5 to about 5:2.

In some embodiments, crude product has, per gram of crude product, at least 0.001 grams, from above 0 to about 0.7 grams, about 0.001-0.5 grams, or about 0.01-0.1 grams of kerosene. In certain embodiments, the crude product has from 0.001-0.5 grams or 0.01-0.3 grams of kerosene. In some embodiments, the kerosene has, per gram of kerosene, an aromatics content of at least 0.2 grams, at least 0.3 grams, or at least 0.4 grams. In certain embodiments, the kerosene has, per gram of kerosene, an aromatics content in a range from about 0.1-0.5 grams, or from about 0.2-0.4 grams.

In certain embodiments, a freezing point of the kerosene may be below −30° C., below −40° C., or below −50° C. An increase in the content of aromatics of the kerosene portion of the crude product tends to increase the density and reduce the freezing point of the kerosene portion of the crude product. A crude product with a kerosene portion having a high density and low freezing point may be refined to produce aviation turbine fuel with the desirable properties of high density and low freezing point.

In certain embodiments, the crude product has, per gram of crude product, a diesel content in a range from about 0.001-0.8 grams or from about 0.01-0.4 grams. In certain embodiments, the diesel has, per gram of diesel, an aromatics content of at least 0.1 grams, at least 0.3 grams, or at least 0.5 grams. In some embodiments, the diesel has, per gram of diesel, an aromatics content in a range from about 0.1-1 grams, about 0.3-0.8 grams, or about 0.2-0.5 grams.

In some embodiments, the crude product has, per gram of crude product, a VGO content in a range from about 0.0001-0.99 grams, from about 0.001-0.8 grams, or from about 0.1-0.3 grams. In certain embodiments, the VGO content in the crude product is in a range from 0.4-0.9 grams, or about 0.6-0.8 grams per gram of crude product. In certain embodiments, the VGO has, per gram of VGO, an aromatics content in a range from about 0.1-0.99 grams, about 0.3-0.8 grams, or about 0.5-0.6 grams.

In some embodiments, the crude product has a residue content of at most 70%, at most 50%, at most 30%, at most 10%, or at most 1% of the crude feed. In certain embodiments, the crude product has, per gram of crude product, a residue content of at most 0.1 grams, at most 0.05 grams, at most 0.03 grams, at most 0.02 grams, at most 0.01 grams, at most 0.005 grams, or at most 0.001 grams. In some embodiments, the crude product has, per gram of crude product, a residue content in a range from about 0.000001-0.1 grams, about 0.00001-0.05 grams, about 0.001-0.03 grams, or about 0.005-0.04 grams.

In some embodiments, the crude product may include at least a portion of the catalyst. In some embodiments, a crude product includes from greater than 0 grams, but less than 0.01 grams, about 0.000001-0.001 grams, or about 0.00001-0.0001 grams of catalyst per gram of crude product. The catalyst may assist in stabilizing the crude product during transportation and/or treatment in processing facilities. The catalyst may inhibit corrosion, inhibit friction, and/or increase water separation abilities of the crude product. A crude product that includes at least a portion of the catalyst may be further processed to produce lubricants and/or other commercial products.

The catalyst used for treatment of a crude feed in the presence of a hydrogen source to produce the total product may be a single catalyst or a plurality of catalysts. The catalysts of the application may first be a catalyst precursor that is converted to the catalyst in the contacting zone when hydrogen and/or a crude feed containing sulfur is contacted with the catalyst precursor.

The catalysts used in contacting the crude feed with a hydrogen source to produce the total product may assist in the reduction of the molecular weight of the crude feed. Not to be bound by theory, the catalyst in combination with the hydrogen source may reduce a molecular weight of components in the crude feed through the action of basic (Lewis basic or Brønsted-Lowry basic) and/or superbasic components in the catalyst. Examples of catalysts that may have Lewis base and/or Brønsted-Lowry base properties include catalysts described herein.

In some embodiments, the catalyst is a TMS catalyst. The TMS catalyst includes a compound that contains a transition metal sulfide. For the purposes of this application, weight of the transition metal sulfide in the TMS catalyst is determined by adding the total weight of the transition metal(s) to the total weight of sulfur in the catalyst. An atomic ratio of the transition metal to sulfur is typically in a range from about 0.2-20, about 0.5-10, or about 1-5. Examples of transition metal sulfides may be found in "Inorganic Sulfur Chemistry"; Edited by G. Nickless; Elsevier Publishing Company; Amsterdam-London-New York; Copyright 1968; Chapter 19, which is incorporated herein by reference.

In certain embodiments, the TMS catalyst may include a total of at least 0.4 grams, at least 0.5 grams, at least 0.8 grams, or at least 0.99 grams of one or more transition metal sulfides per gram of catalyst. In certain embodiments, the TMS catalyst has, per gram of catalyst, a total content of one or more transition metal sulfides in a range from about 0.4-0.999 grams, about 0.5-0.9 grams, or about 0.6-0.8 grams.

The TMS catalyst includes one or more transition metal sulfides. Examples of transition metal sulfides include pentlandite ($Fe_{4.5}Ni_{4.5}S_8$), smythite ($Fe_{6.75}Ni_{2.25}S_{11}$), bravoite ($Fe_{0.7}Ni_{0.2}Co_{0.1}S_2$), mackinawite ($Fe_{0.75}Ni_{0.25}S_{0.9}$), argentopentlandite ($AgFe_6Ni_2S_8$), isocubanite ($CuFe_2S_3$), isocalcopyrite ($Cu_8Fe_9S_{16}$), sphalerite ($Zn_{0.95}Fe_{0.05}S$), mooihoekite ($Cu_9Fe_9S_{16}$), chatkalite ($Cu_6FeSn_2S_8$), sternbergite ($AgFe_2S_3$), chalcopyrite ($CuFeS_2$), troilite (FeS), pyrite ($FeS_2$), pyrrhotite ($Fe_{(1-x)}S$ (x=0 to 0.17)), heazlewoodite ($Ni_3S_2$) or vaesite ($NiS_2$).

In some embodiments, the TMS catalyst includes one or more transition metal sulfides in combination with alkali metal(s), alkaline-earth metal(s), zinc, compounds of zinc, or mixtures thereof. The TMS catalyst is, in some embodiments, represented by the general chemical formula $A_c[M_aS_b]_d$, in which A represents alkali metal, alkaline-earth metal or zinc; M represents a transition metal from Columns 6-10 of the Periodic Table; and S is sulfur. An atomic ratio of a to b is in a range from about 0.5 to about 2.5, or from about 1 to about 2. An atomic ratio of c to a is in a range from 0.0001 to about 1, from about 0.1 to about 0.8, or from about 0.3 to about 0.5. In some embodiments, the transition metal is iron.

In some embodiments, the TMS catalyst may include generally known alkali and/or alkaline-earth metals/transition metal sulfides (for example, bartonite ($K_3Fe_{10}S_{14}$), rasvumite ($KFe_2S_3$), djerfisherite ($K_6NaFe_{19}Cu_4NiS_{26}Cl$), chlorobartonite ($K_{6.1}Fe_{24}Cu_{0.2}S_{26.1}Cl_{0.7}$), and/or coyoteite ($NaFe_3S_5 \cdot (H_2O)_2$). In some embodiments, the TMS catalyst includes bartonite prepared in situ. Bartonite prepared in situ may be referred to as synthetic bartonite. Natural and/or synthetic bartonite may be used as a TMS catalyst in the methods described herein.

In some embodiments, the TMS catalyst may include at most 25 grams, at most 15 grams, or at most 1 gram of support material per 100 grams of the TMS catalyst. Typically, the TMS catalyst has from 0 to about 25 grams, about 0.00001 to about 20 grams, about 0.0001 grams to about 10 grams of support material per 100 grams of the TMS catalyst. Examples of support materials that may be used with the TMS catalyst include refractory oxides, porous carbon materials, zeolites, or mixtures thereof. In some embodiments, the TMS catalyst is substantially free, or free, of support materials.

The TMS catalyst that includes alkali metal(s), alkaline-earth metal(s), zinc, compounds of zinc, or mixtures thereof may contain one or more transition metal sulfides, bimetallic alkali metal-transition metal sulfides, higher valence transition metal sulfides, transition metal oxides, or mixtures thereof, as determined using x-ray diffraction. A portion of the alkali metal(s) component, alkaline-earth metal(s) component, zinc component and/or a portion of the transition metal sulfide component of the TMS catalyst may, in some embodiments, be present as an amorphous composition not detectable by x-ray diffraction techniques.

In some embodiments, crystalline particles of the TMS catalyst and/or mixtures of crystalline particles of the TMS catalyst have a particle size of at most $10^8$ Å, at most $10^3$ Å, at most 100 Å, or at most 40 Å. In normal practice, the particle size of the crystalline particles of the TMS catalyst will generally be at least 10 Å.

The TMS catalyst that includes alkali metal(s), alkaline-earth metal(s), zinc, compounds of zinc, or mixtures thereof may be prepared by mixing a sufficient amount of de-ionized water, a desired amount of a transition metal oxide, and desired amount of Columns 1-2 metal carbonate(s), Columns 1-2 metal oxalate(s), Columns 1-2 metal acetate(s), zinc carbonate, zinc acetate, zinc oxalate, or mixtures thereof to form a wet paste. The wet paste may be dried at a temperature from about 100-300° C. or 150-250° C. to form a transition metal oxide/salt mixture. The transition metal oxide/salt mixture may be calcined at a temperature ranging from about 300-1000° C., about 500-800° C., or about 600-700° C. to form a transition metal oxide/metal salt mixture. The transition metal oxide/metal salt mixture may be reacted with hydrogen to form a reduced intermediate solid. The addition of hydrogen may be performed at a flow rate sufficient to provide an excess amount of hydrogen to the transition metal oxide/metal salt mixture. Hydrogen may be added over about 10-50 hours or about 20-40 hours to the transition metal oxide/metal salt mixture to produce a reduced intermediate solid that includes elemental transition metal. Hydrogen addition may be performed at a temperature of about 35-500° C., about 50-400° C., or about 100-300° C., and a total pressure of about 10-15 MPa, about 11-14 MPa, or about 12-13 MPa. It should be understood that reduction time, reaction temperature, selection of reducing gas, pressure of reducing gas, and/or flow rate of reducing gas used to prepare the intermediate solid is often changed relative to the absolute mass of the selected transition metal oxide. The reduced intermediate solid may, in some embodiments, be passed through a 40-mesh sieve with minimal force.

The reduced intermediate solid may be incrementally added to a hot (for example, about 100° C.) diluent/elemental sulfur, and/or one or more compounds of sulfur, mixture at a rate to control the evolution of heat and production of gas. The diluent may include any suitable diluent that provides a means to dissipate the heat of sulfurization. The diluent may include solvents with a boiling range distributions of at least 100° C., at least 150° C., least 200° C., or at least 300° C. Typically the diluent has a boiling range distribution between about 100-500° C., about 150-400° C., or about 200-300° C. In some embodiments, the diluent is VGO and/or xylenes. Sulfur compounds include, but are not limited to, hydrogen sulfide and/or thiols. An amount of sulfur and/or sulfur compounds may range from 1-100 mole %, 2-80 mole %, 5-50 mole %, 10-30 mole %, based on the moles of Columns 1-2 metal or zinc in the Columns 1-2 metal salt or zinc salt. After addition of the reduced intermediate solid to the diluent/elemental sulfur mixture, the resulting mixture may be incrementally heated to a final temperature of about 200-500° C., about 250-450° C., or about 300-400° C. and maintained at the final temperature for at least 1 hour, at least 2 hours, or at least 10 hours. Typically, the final temperature is maintained for about 15 hours, about 10 hours, about 5 hours, or about 1.5 hours. After heating to the elevated sulfurizing reaction temperature, the diluent/catalyst mixture may be cooled to a temperature in a range from about 0-100° C., about 30-90° C., or about 50-80° C. to facilitate recovery of the catalyst from the mixture. The sulfurized catalyst may be isolated in an oxygen-free atmosphere from the diluent using standard techniques and washed with at least a portion of a low boiling solvent (for example, pentane, heptane, or hexane) to produce the TMS catalyst. The TMS catalyst may be powdered using standard techniques.

In some embodiments, the catalyst is an inorganic salt catalyst. The anion of the inorganic salt catalyst may include an inorganic compound, an organic compound, or mixtures thereof. The inorganic salt catalyst includes alkali metal carbonates, alkali metal hydroxides, alkali metal hydrides, alkali metal amides, alkali metal sulfides, alkali metal acetates, alkali metal oxalates, alkali metal formates, alkali metal pyruvates, alkaline-earth metal carbonates, alkaline-earth metal hydroxides, alkaline-earth metal hydrides, alkaline-earth metal amides, alkaline-earth metal sulfides, alkaline-earth metal acetates, alkaline-earth metal oxalates, alkaline-earth metal formates, alkaline-earth metal pyruvates, or mixtures thereof.

Inorganic salt catalysts include, but are not limited to, mixtures of: NaOH/RbOH/CsOH; KOH/RbOH/CsOH; NaOH/KOH/RbOH; NaOH/KOH/CsOH; $K_2CO_3/Rb_2CO_3/Cs_2CO_3$; $Na_2O/K_2O/K_2CO_3$; $NaHCO_3/KHCO_3/Rb_2CO_3$; $LiHCO_3/KHCO_3/Rb_2CO_3$; KOH/RbOH/CsOH mixed with a mixture of $K_2CO_3/Rb_2CO_3/Cs_2CO_3$; $K_2CO_3/CaCO_3$; $K_2CO_3/MgCO_3$; $Cs_2CO_3/CaCO_3$; $Cs_2CO_3/CaO$; $Na_2CO_3/Ca(OH)_2$; $KH/CsCO_3$; $KOCHO/CaO$; $CsOCHO/CaCO_3$; $CsOCHO/Ca(OCHO)_2$; $NaNH_2/K_2CO_3/Rb_2O$; $K_2CO_3/CaCO_3/Rb_2CO_3$; $K_2CO_3/CaCO_3/Cs_2CO_3$; $K_2CO_3/MgCO_3/Rb_2CO_3$; $K_2CO_3/MgCO_3/Cs_2CO_3$; or $Ca(OH)_2$ mixed with a mixture of $K_2CO_3/Rb_2CO_3/Cs_2CO_3$.

In some embodiments, the inorganic salt catalyst contains at most 0.00001 grams, at most 0.001 grams, or at most 0.01 grams of lithium, calculated as the weight of lithium, per gram of inorganic salt catalyst. The inorganic salt catalyst has, in some embodiments, from about 0 but less than 0.01 grams, about 0.0000001-0.001 grams, or about 0.00001-0.0001 grams of lithium, calculated as the weight of lithium, per gram of inorganic salt catalyst, In certain embodiments, an inorganic salt catalyst includes one or more alkali metal salts that include an alkali metal with an atomic number of at least 11. An atomic ratio of an alkali metal having an atomic number of at least 11 to an alkali metal having an atomic number greater than 11, in some embodiments, is in a range from about 0.1 to about 10, about 0.2 to about 6, or about 0.3 to about 4 when the inorganic salt catalyst has two or more alkali metals. For example, the inorganic salt catalyst may include salts of sodium, potassium, and rubidium with the ratio of sodium to potassium being in a range from about 0.1-6; the ratio of sodium to rubidium being in a range from about 0.1-6; and the ratio of potassium to rubidium being in a range from about 0.1-6. In another example, the inorganic salt catalyst includes a sodium salt and a potassium salt with the atomic ratio of sodium to potassium being in a range from about 0.1 to about 4.

In some embodiments, an inorganic salt catalyst also includes metals from Columns 8-10 of the Periodic Table, compounds of metals from Columns 8-10 of the Periodic Table, metals from Column 6 of the Periodic Table, compounds of metals from Column 6 of the Periodic Table, or mixtures thereof. Metals from Columns 8-10 include, but are not limited to, iron, ruthenium, cobalt, or nickel. Metals from Column 6 include, but are not limited to, chromium, molybdenum, or tungsten. In some embodiments, the inorganic salt catalyst includes about 0.1-0.5 grams, or about 0.2-0.4 grams of Raney nickel per gram of inorganic salt catalyst.

In certain embodiments, the inorganic salt catalyst also includes metal oxides from Columns 1-2 and/or Column 13 of the Periodic Table. Metals from Column 13 include, but are not limited to, boron or aluminum. Non-limiting examples of metal oxides include lithium oxide ($Li_2O$), potassium oxide ($K_2O$), calcium oxide (CaO), or aluminum oxide ($Al_2O_3$).

The inorganic salt catalyst is, in certain embodiments, free of or substantially free of Lewis acids (for example, $BCl_3$, $AlCl_3$, and $SO_3$), Brønsted-Lowry acids (for example, $H_3O^+$, $H_2SO_4$, HCl, and $HNO_3$), glass-forming compositions (for example, borates and silicates), and halides. The inorganic salt may contain, per gram of inorganic salt catalyst: from about 0 grams to about 0.1 grams, about 0.000001-0.01 grams, or about 0.00001-0.005 grams of: a) halides; b) compositions that form glasses at temperatures of at least 350° C., or at most 1000° C.; c) Lewis acids; d) Brønsted-Lowry acids; or e) mixtures thereof.

The inorganic salt catalyst may be prepared using standard techniques. For example, a desired amount of each component of the catalyst may be combined using standard mixing techniques (for example, milling and/or pulverizing). In other embodiments, inorganic compositions are dissolved in a solvent (for example, water or a suitable organic solvent) to form an inorganic composition/solvent mixture. The solvent may be removed using standard separation techniques to produce the inorganic salt catalyst.

In some embodiments, inorganic salts of the inorganic salt catalyst may be incorporated into a support to form a supported inorganic salt catalyst. Examples of supports include, but are not limited to, zirconium oxide, calcium oxide, magnesium oxide, titanium oxide, hydrotalcite, alumina, germania, iron oxide, nickel oxide, zinc oxide, cadmium oxide, antimony oxide, and mixtures thereof. In some embodiments, an inorganic salt, a Columns 6-10 metal and/or a compound of a Columns 6-10 metal may be impregnated in the support. Alternatively, inorganic salts may be melted or softened with heat and forced in and/or onto a metal support or metal oxide support to form a supported inorganic salt catalyst.

A structure of the inorganic salt catalyst typically becomes nonhomogenous, permeable, and/or mobile at a determined temperature or in a temperature range when loss of order occurs in the catalyst structure. The inorganic salt catalyst may become disordered without a substantial change in composition (for example, without decomposition of the salt). Not to be bound by theory, it is believed that the inorganic salt catalyst becomes disordered (mobile) when distances between ions in the lattice of the inorganic salt catalyst increase. As the ionic distances increase, a crude feed and/or a hydrogen source may permeate through the inorganic salt catalyst instead of across the surface of the inorganic salt catalyst. Permeation of the crude feed and/or hydrogen source through the inorganic salt often results in an increase in the contacting area between the inorganic salt catalyst and the crude feed and/or the hydrogen source. An increase in contacting area and/or reactivity area of the inorganic salt catalyst may often increase the yield of crude product, limit production of residue and/or coke, and/or facilitate a change in properties in the crude product relative to the same properties of the crude feed. Disorder of the inorganic salt catalyst (for example, nonhomogeneity, permeability, and/or mobility) may be determined using DSC methods, ionic conductivity measurement methods, TAP methods, visual inspection, x-ray diffraction methods, or combinations thereof.

The use of TAP to determine characteristics of catalysts is described in U.S. Pat. Nos. 4,626,412 to Ebner et al.; 5,039,489 to Gleaves et al.; and 5,264,183 to Ebner et al., all of which are incorporated herein by reference. A TAP system may be obtained from Mithra Technologies (Foley, Mo., U.S.A.). The TAP analysis may be performed in a temperature range from about 25-850° C., about 50-500° C., or about 60-400° C., at a heating rate in a range from about 10-50° C., or about 20-40° C., and at a vacuum in a range from about $1 \times 10^{-13}$ to about $1 \times 10^{-8}$ torr. The temperature may remain constant and/or increase as a function of time. As the temperature of the inorganic salt catalyst increases, gas emission from the inorganic salt catalyst is measured. Examples of gases that evolve from the inorganic salt catalyst include carbon monoxide, carbon dioxide, hydrogen, water, or mixtures thereof. The temperature at which an inflection (sharp increase) in gas evolution from the inorganic salt catalyst is detected is considered to be the temperature at which the inorganic salt catalyst becomes disordered.

In some embodiments, an inflection of emitted gas from the inorganic salt catalyst may be detected over a range of temperatures as determined using TAP. The temperature or the temperature range is referred to as the "TAP temperature". The initial temperature of the temperature range determined using TAP is referred to as the "minimum TAP temperature".

The emitted gas inflection exhibited by inorganic salt catalysts suitable for contact with a crude feed is in a TAP temperature range from about 100-600° C., about 200-500° C., or about 300-400° C. Typically, the TAP temperature is in a range from about 300-500° C. In some embodiments, different compositions of suitable inorganic salt catalysts also exhibit gas inflections, but at different TAP temperatures.

The magnitude of the ionization inflection associated with the emitted gas may be an indication of the order of the particles in a crystal structure. In a highly ordered crystal structure, the ion particles are generally tightly associated, and release of ions, molecules, gases, or combinations thereof, from the structure requires more energy (that is more heat). In a disordered crystal structure, ions are not associated to each other as strongly as ions in a highly ordered crystal structure. Due to the lower ion association, less energy is generally required to release ions, molecules, and/or gases from a disordered crystal structure, and thus, a quantity of ions and/or gas released from a disordered crystal structure is typically greater than a quantity of ions and/or gas released from a highly ordered crystal structure at a selected temperature.

In some embodiments, a heat of dissociation of the inorganic salt catalyst may be observed in a range from about 50° C. to about 500° C. at a heating rate or cooling rate of about 10° C., as determined using a differential scanning calorimeter. In a DSC method, a sample may be heated to a first temperature, cooled to room temperature, and then heated a second time. Transitions observed during the first heating generally are representative of entrained water and/or solvent and may not be representative of the heat of dissociations. For example, easily observed heat of drying of a moist or hydrated sample may generally occur below 250° C., typically between 100-150° C. The transitions observed during the cooling cycle and the second heating correspond to the heat of dissociation of the sample.

"Heat transition" refers to the process that occurs when ordered molecules and/or atoms in a structure become disordered when the temperature increases during the DSC analysis. "Cool transition" refers to the process that occurs when molecules and/or atoms in a structure become more homogeneous when the temperature decreases during the DSC analysis. In some embodiments, the heat/cool transition of the inorganic salt catalyst occurs over a range of temperatures that are detected using DSC. The temperature or temperature range at which the heat transition of the inorganic salt catalyst occurs during a second heating cycle is referred to as "DSC temperature". The lowest DSC temperature of the temperature range during a second heating cycle is referred to as the "minimum DSC temperature". The inorganic salt catalyst may exhibit a heat transition in a range between about 200-500° C., about 250-450° C., or about 300-400° C.

In an inorganic salt that contains inorganic salt particles that are a relatively homogeneous mixture, a shape of the peak associated with the heat absorbed during a second heating cycle may be relatively narrow. In an inorganic salt catalyst that contains inorganic salt particles in a relatively non-homogeneous mixture, the shape of the peak associated with heat absorbed during a second heating cycle may be relatively broad. An absence of peaks in a DSC spectrum indicates that the salt does not absorb or release heat in the scanned temperature range. Lack of a heat transition generally indicates that the structure of the sample does not change upon heating.

As homogeneity of the particles of an inorganic salt mixture increases, the ability of the mixture to remain a solid and/or a semiliquid during heating decreases. Homogeneity of an inorganic mixture may be related to the ionic radius of the cations in the mixtures. For cations with smaller ionic radii, the ability of a cation to share electron density with a corresponding anion increases and the acidity of the corresponding anion increases. For a series of ions of similar charges, a smaller ionic radius results in higher interionic attractive forces between the cation and the anion if the anion is a hard base. The higher interionic attractive forces tend to result in higher heat transition temperatures for the salt and/or more homogeneous mixture of particles in the salt (sharper peak and increased area under the DSC curve). Mixtures that include cations with small ionic radii tend to be more acidic than cations of larger ionic radii, and thus acidity of the inorganic salt mixture increases with decreasing cationic radii. For example, contact of a crude feed with a hydrogen source in the presence of an inorganic mixture that includes lithium cations tends to produce increased quantities of gas and/or coke relative to contact of the crude feed with a hydrogen source in the presence of an inorganic salt catalyst that includes cations with a larger ionic radii than lithium. The ability to inhibit generation of gas and/or coke increases the total liquid product yield of the process.

In certain embodiments, the inorganic salt catalyst may include two or more inorganic salts. A minimum DSC temperature for each of the inorganic salts may be determined. The minimum DSC temperature of the inorganic salt catalyst may be below the minimum DSC temperature of at least one of the inorganic metal salts in the inorganic salt catalyst. For example, the inorganic salt catalyst may include potassium carbonate and cesium carbonate. Potassium carbonate and cesium carbonate exhibit DSC temperatures greater than 500° C. A $K_2CO_3/Rb_2CO_3/Cs_2CO_3$ catalyst exhibits a DSC temperature in a range from about 290-300° C.

In some embodiments, the TAP temperature may be between the DSC temperature of at least one of the inorganic salts and the DSC temperature of the inorganic salt catalyst. For example, the TAP temperature of the inorganic salt catalyst may be in a range from about 350-500° C. The DSC temperature of the same inorganic salt catalyst may be in a range from about 200-300° C., and the DSC temperature of the individual salts may be at least 500° C. or at most 1000° C.

An inorganic salt catalyst that has a TAP and/or DSC temperature between about 150-500° C., about 200-450° C., or about 300-400° C., and does not undergo decomposition at these temperatures, in many embodiments, can be used to catalyze conversion of high molecular weight and/or high viscosity compositions (for example, crude feed) to liquid products.

In certain embodiments, the inorganic salt catalyst may exhibit increased conductivity relative to individual inorganic salts during heating of the inorganic salt catalyst in a temperature range from about 200-600° C., about 300-500° C., or about 350-450° C. Increased conductivity of the inorganic salt catalyst is generally attributed to the particles in the inorganic salt catalyst becoming mobile. The ionic conductivity of some inorganic salt catalysts changes at a lower temperature than the temperature at which ionic conductivity of a single component of the inorganic salt catalyst changes.

Ionic conductivity of inorganic salts may be determined by applying Ohm's law: V=IR, where V is voltage, I is current, and R is resistance. To measure ionic conductivity, the inorganic salt catalyst may be placed in a quartz vessel with two wires (for example, copper wires or platinum wires) separated from each other, but immersed in the inorganic salt catalyst.

Figures 7, 9:
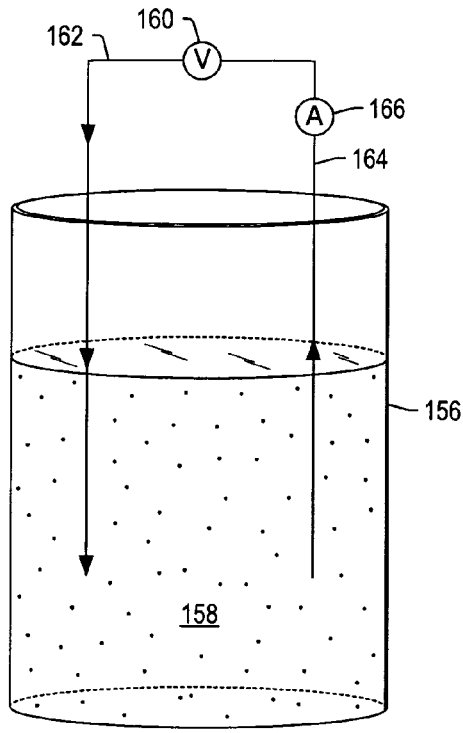
FIG. 7 is a schematic of an embodiment of an ionic conductivity measurement system.
FIG. 9 is a tabulation of compositions of the crude feed and compositions of non-condensable hydrocarbons obtained from embodiments of contacting the crude feed with the transition metal sulfide catalyst.

FIG. 7 is a schematic of a system that may be used to measure ionic conductivity. Quartz vessel 156 containing sample 158 may be placed in a heating apparatus and heated incrementally to a desired temperature. Voltage from source 160 is applied to wire 162 during heating. The resulting current through wires 162 and 164 is measured at meter 166. Meter 166 may be, but is not limited to, a multimeter or a Wheatstone bridge. As sample 158 becomes less homogeneous (more mobile) without decomposition occurring, the resistivity of the sample should decrease and the observed current at meter 166 should increase.

In some embodiments, at a desired temperature, the inorganic salt catalyst may have a different ionic conductivity after heating, cooling, and then heating. The difference in ionic conductivities may indicate that the crystal structure of the inorganic salt catalyst has been altered from an original shape (first form) to a different shape (second form) during heating. The ionic conductivities, after heating, are expected to be similar or the same if the form of the inorganic salt catalyst does not change during heating.

In certain embodiments, the inorganic salt catalyst has a particle size in a range of about 10-1000 microns, about 20-500 microns, or about 50-100 microns, as determined by passing the inorganic salt catalyst through a mesh or a sieve.

The inorganic salt catalyst may soften when heated to temperatures above 50° C. and below 500° C. As the inorganic salt catalyst softens, liquids and catalyst particles may co-exist in the matrix of the inorganic salt catalyst. The catalyst particles may, in some embodiments, self-deform under gravity, or under a pressure of at least 0.007 MPa, or at most 0.101 MPa, when heated to a temperature of at least 300° C., or at most 800° C., such that the inorganic salt catalyst transforms from a first form to a second form. Upon cooling of the inorganic salt catalyst to about 20° C., the second form of the inorganic salt catalyst is incapable of returning to the first form of the inorganic salt catalyst. The temperature at which the inorganic salt transforms from the first form to a second form is referred to as the "deformation" temperature. The deformation temperature may be a temperature range or a single temperature. In certain embodiments, the particles of the inorganic salt catalyst self-deform under gravity or pressure upon heating to a deformation temperature below the deformation temperature of any of the individual inorganic metal salts. In some embodiments, an inorganic salt catalyst includes two or more inorganic salts that have different deformation temperatures. The deformation temperature of the inorganic salt catalyst differs, in some embodiments, from the deformation temperatures of the individual inorganic metal salts.

In certain embodiments, the inorganic salt catalyst is liquid and/or semiliquid at, or above, the TAP and/or DSC temperature. In some embodiments, the inorganic salt catalyst is a liquid or a semiliquid at the minimum TAP and/or DSC temperature. At or above the minimum TAP and/or DSC temperature, liquid or semiliquid inorganic salt catalyst mixed with the crude feed may, in some embodiments, form a separate phase from the crude feed. In some embodiments, the liquid or semiliquid inorganic salt catalyst has low solubility in the crude feed (for example, from about 0 grams to about 0.5 grams, about 0.0000001-0.2 grams, or about 0.0001-0.1 grams of inorganic salt catalyst per gram of crude feed) or is insoluble in the crude feed (for example, from about 0 grams to about 0.05 grams, about 0.000001-0.01 grams, or about 0.00001-0.001 grams of inorganic salt catalyst per gram of crude feed) at the minimum TAP temperature.

In some embodiments, powder x-ray diffraction methods are used to determine the spacing of the atoms in the inorganic salt catalyst. A shape of the $D_{001}$ peak in the x-ray spectrum may be monitored and the relative order of the inorganic salt particles may be estimated. Peaks in the x-ray diffraction represent different compounds of the inorganic salt catalyst. In powder x-ray diffraction, the $D_{001}$ peak may be monitored and the spacing between atoms may be estimated. In an inorganic salt catalyst that contains highly ordered inorganic salt atoms, a shape of the $D_{001}$ peak is relatively narrow. In an inorganic salt catalyst (for example, a $K_2CO_3/Rb_2CO_3/Cs_2CO_3$ catalyst) that contains randomly ordered inorganic salt atoms, the shape of the $D_{001}$ peak may be relatively broad or the $D_{001}$ peak may be absent. To determine if the disorder of inorganic salt atoms changes during heating, an x-ray diffraction spectrum of the inorganic salt catalyst may be taken before heating and compared with an x-ray diffraction spectrum taken after heating. The $D_{001}$ peak (corresponding to the inorganic salt atoms) in the x-ray diffraction spectrum taken at temperatures above 50° C. may be absent or broader than the $D_{001}$ peaks in the x-ray diffraction spectrum taken at temperatures below 50° C. Additionally, the x-ray diffraction pattern of the individual inorganic salt may exhibit relatively narrow $D_{001}$ peaks at the same temperatures.

Contacting conditions may be controlled such that the total product composition (and thus, the crude product) may be varied for a given crude feed in addition to limiting and/or inhibiting formation of by-products. The total product composition includes, but is not limited to, paraffins, olefins, aromatics, or mixtures thereof. These compounds make up the compositions of the crude product and the non-condensable hydrocarbon gases.

Controlling contacting conditions in combination with the catalyst described herein may produce a total product with lower than predicted coke content. Comparison of the MCR content of various crudes may allow crudes to be ranked based on their tendency to form coke. For example, a crude with a MCR content of about 0.1 grams of MCR per gram of crude would be expected to form more coke than a crude with a MCR content of about 0.001 grams of MCR per gram of crude. Disadvantaged crudes typically have MCR contents of at least 0.05 grams of MCR per gram of disadvantaged crude.

In some embodiments, the residue content and/or coke content deposited on the catalyst during a reaction period may be at most 0.1 grams, at most 0.05 grams, or at most 0.03 grams of residue and/or coke per gram of catalyst. In certain embodiments, the weight of residue and/or coke deposited on the catalyst is in a range from about 0.0001-0.1 grams, 0.001-0.05 grams, or about 0.01-0.03 grams. In some embodiments, used catalyst is substantially free of residue and/or coke. In certain embodiments, contacting conditions are controlled such that at most 0.015 grams, at most 0.01 grams, at most 0.005 grams, or at most 0.003 grams of coke is formed per gram of crude product. Contacting a crude feed with the catalyst under controlled contacting conditions produces a reduced quantity of coke and/or residue relative to a quantity of coke and/or residue produced by heating the crude feed in the presence of a refining catalyst, or in the absence of a catalyst, using the same contacting conditions.

The contacting conditions may be controlled, in some embodiments, such that, per gram of crude feed, at least 0.5 grams, at least 0.7 grams, at least 0.8 grams, or at least 0.9 grams of the crude feed is converted to the crude product. Typically, between about 0.5-0.99 grams, about 0.6-0.9 grams, or about 0.7-0.8 grams of the crude product per gram of crude feed is produced during contacting. Conversion of the crude feed to a crude product with a minimal yield of residue and/or coke, if any, in the crude product allows the crude product to be converted to commercial products with a minimal amount of pre-treatment at a refinery. In certain embodiments, per gram of crude feed, at most 0.2 grams, at most 0.1 grams, at most 0.05 grams, at most 0.03 grams, or at most 0.01 grams of the crude feed is converted to non-condensable hydrocarbons. In some embodiments, from about 0 to about 0.2 grams, about 0.0001-0.1 grams, about 0.001-0.05 grams, or about 0.01-0.03 grams of non-condensable hydrocarbons per gram of crude feed is produced.

Controlling a contacting zone temperature, rate of crude feed flow, rate of total product flow, rate and/or amount of catalyst feed, or combinations thereof, may be performed to maintain desired reaction temperatures. In some embodiments, control of the temperature in the contacting zone may be performed by changing a flow of a gaseous hydrogen source and/or inert gas through the contacting zone to dilute the amount of hydrogen and/or remove excess heat from the contacting zone.

In some embodiments, the temperature in the contacting zone may be controlled such that a temperature in the contacting zone is at, above, or below desired temperature "$T_1$". In certain embodiments, the contacting temperature is controlled such that the contacting zone temperature is below the minimum TAP temperature and/or the minimum DSC temperature. In certain embodiments, $T_1$ may be about 30° C. below, about 20° C. below, or about 10° C. below the minimum TAP temperature and/or the minimum DSC temperature. For example, in one embodiment, the contacting temperature may be controlled to be about 370° C., about 380° C., or about 390° C. during the reaction period when the minimum TAP temperature and/or minimum DSC temperature is about 400° C.

In other embodiments, the contacting temperature is controlled such that the temperature is at, or above, the catalyst TAP temperature and/or the catalyst DSC temperature. For example, the contacting temperature may be controlled to be about 450° C., about 500° C., or about 550° C. during the reaction period when the minimum TAP temperature and/or minimum DSC temperature is about 450° C. Controlling the contacting temperature based on catalyst TAP temperatures and/or catalyst DSC temperatures may yield improved crude product properties. Such control may, for example, decrease coke formation, decrease non-condensable gas formation, or combinations thereof.

In certain embodiments, the inorganic salt catalyst may be conditioned prior to addition of the crude feed. In some embodiments, the conditioning may take place in the presence of the crude feed. Conditioning the inorganic salt catalyst may include heating the inorganic salt catalyst to a first temperature of at least 100° C., at least 300° C., at least 400° C., or at least 500° C., and then cooling the inorganic salt catalyst to a second temperature of at most 250° C., at most 200° C., or at most 100° C. In certain embodiments, the inorganic salt catalyst is heated to a temperature in a range from about 150-700° C., about 200-600° C., or about 300-500° C., and then cooled to a second temperature in a range from about 25-240° C., about 30-200° C., or about 50-90° C. The conditioning temperatures may be determined by determining ionic conductivity measurements at different temperatures. In some embodiments, conditioning temperatures may be determined from DSC temperatures obtained from heat/cool transitions obtained by heating and cooling the inorganic salt catalyst multiple times in a DSC. Conditioning of the inorganic salt catalyst may allow contact of a crude feed to be performed at lower reaction temperatures than temperatures used with conventional hydrotreating catalysts.

In some embodiments, a content of naphtha, distillate, VGO, or mixtures thereof, in the total product, may be varied by changing a rate of total product removal from a contacting zone. For example, decreasing a rate of total product removal tends to increase contacting time of the crude feed with the catalyst. Alternately, increasing pressure relative to an initial pressure may increase contacting time, may increase a yield of a crude product, may increase incorporation of hydrogen from the gases into a crude product for a given mass flow rate of crude feed or hydrogen source, or may alter combinations of these effects. Increased contacting times of the crude feed with the catalyst may produce an increased amount of diesel, kerosene, or naphtha and a decreased amount of VGO relative to the amounts of diesel, kerosene, naphtha, and VGO produced at shorter contacting times. Increasing the contacting time of the total product in the contacting zone may also change the average carbon number of the crude product. Increased contacting time may result in a higher weight percentage of lower carbon numbers (and thus, a higher API gravity).

In some embodiments, the contacting conditions may be changed over time. For example, the contacting pressure and/or the contacting temperature may be increased to increase the amount of hydrogen that the crude feed uptakes to produce the crude product. The ability to change the amount of hydrogen uptake of the crude feed, while improving other properties of the crude feed, increases the types of crude products that may be produced from a single crude feed. The ability to produce multiple crude products from a single crude feed may allow different transportation and/or treatment specifications to be satisfied.

Uptake of hydrogen may be assessed by comparing H/C of the crude feed to H/C of the crude product. An increase in the H/C of the crude product relative to H/C of the crude feed indicates incorporation of hydrogen into the crude product from the hydrogen source. Relatively low increase in H/C of the crude product (about 20%, as compared to the crude feed) indicates relatively low consumption of hydrogen gas during the process. Significant improvement of the crude product properties, relative to those of the crude feed, obtained with minimal consumption of hydrogen is desirable.

The ratio of hydrogen source to crude feed may also be altered to alter the properties of the crude product. For example, increasing the ratio of the hydrogen source to crude feed may result in crude product that has an increased VGO content per gram of crude product.

In certain embodiments, contact of the crude feed with the inorganic salt catalyst in the presence of light hydrocarbons and/or steam yields more liquid hydrocarbons and less coke in a crude product than contact of a crude feed with an inorganic salt catalyst in the presence of hydrogen and steam. In embodiments that include contact of the crude feed with methane in the presence of the inorganic salt catalyst, at least a portion of the components of the crude product may include atomic carbon and hydrogen (from the methane) which has been incorporated into the molecular structures of the components.

In certain embodiments, the volume of crude product produced from a crude feed contacted with the hydrogen source in the presence of the inorganic salt catalyst is at least 5% greater, at least 10% greater, or at least 15%, or at most 100% greater than a volume of crude product produced from a thermal process at STP. The total volume of crude product produced by contact of the crude feed with the inorganic salt catalyst may be at least 110 vol % of the volume of the crude feed at STP. The increase in volume is believed to be due to a decrease in density. Lower density may generally be at least partially caused by hydrogenation of the crude feed.

In certain embodiments, a crude feed having, per gram of crude feed, at least 0.02 grams, at least 0.05 grams, or at least 0.1 grams of sulfur, and/or at least 0.001 grams of Ni/V/Fe is contacted with a hydrogen source in the presence of an inorganic salt catalyst without diminishing the activity of the catalyst.

In some embodiments, the inorganic salt catalyst can be regenerated, at least partially, by removal of one or more components that contaminate the catalyst. Contaminants include, but are not limited to, metals, sulfides, nitrogen, coke, or mixtures thereof. Sulfide contaminants may be removed from the used inorganic salt catalyst by contacting steam and carbon dioxide with the used catalyst to produce hydrogen sulfide. Nitrogen contaminants may be removed by contacting the used inorganic salt catalyst with steam to produce ammonia. Coke contaminants may be removed from the used inorganic salt catalyst by contacting the used inorganic salt catalyst with steam and/or methane to produce hydrogen and carbon oxides. In some embodiments, one or more gases are generated from a mixture of used inorganic salt catalyst and residual crude feed.

In certain embodiments, a mixture of used inorganic salt (for example, $K_2CO_3/Rb_2CO_3/Cs_2CO_3$; $KOH/Al_2O_3$; $Cs_2CO_3/CaCO_3$; or $NaOH/KOH/LiOH/ZrO_2$), unreacted crude feed and/or coke may be heated to a temperature in a range from about 700-1000° C. or from about 800-900° C. until the production of gas and/or liquids is minimal in the presence of steam, hydrogen, carbon dioxide, and/or light hydrocarbons to produce a liquid phase and/or gas. The gas may include an increased quantity of hydrogen and/or carbon dioxide relative to reactive gas. For example, the gas may include from about 0.1-99 moles or from about 0.2-8 moles of hydrogen and/or carbon dioxide per mole of reactive gas. The gas may contain a relatively low amount of light hydrocarbons and/or carbon monoxide. For example, less than about 0.05 grams of light hydrocarbons per gram of gas and less than about 0.01 grams of carbon monoxide per gram of gas. The liquid phase may contain water, for example, greater than 0.5-0.99 grams, or greater than 0.9-0.9 grams of water per gram of liquid.

In some embodiments, the used catalyst and/or solids in the contacting zone may be treated to recover metals (for example, vanadium and/or nickel) from the used catalyst and/or solids. The used catalyst and/or solids may be treated using generally known metal separation techniques, for example, heating, chemical treating, and/or gasification.

EXAMPLES

Non-limiting examples of catalyst preparations, testing of catalysts, and systems with controlled contacting conditions are set forth below.

Example 1

Preparation of a K-FE Sulfide Catalyst

A K-FE Sulfide Catalyst was prepared by combining 1000 grams of iron oxide ($Fe_2O_3$) and 580 g of potassium carbonate with 412 grams of de-ionized water to form a wet paste. The wet paste was dried at 200° C. to form an iron oxide/potassium carbonate mixture. The iron oxide/potassium carbonate mixture was calcined at 500° C. to form an iron oxide/potassium carbonate mixture. The iron oxide/potassium carbonate mixture was reacted with hydrogen to form a reduced intermediate solid that included iron metal. Hydrogen addition was performed over 48 hours at 450° C. and 11.5-12.2 MPa (about 1665-1765 psi). The intermediate solid was passed through a 40-mesh sieve with minimal force.

The intermediate solid was added incrementally at a rate to control the evolution of heat and produced gas to a VGO/m-xylene/elemental sulfur mixture at 100° C. After addition of the intermediate solid, the resulting mixture was incrementally heated to 300° C. and maintained at 300° C. for about 1 hour. The solvent/catalyst mixture was cooled to below 100° C. and the sulfurized catalyst was separated from the mixture. The sulfurized catalyst was isolated by filtration in a dry-box under an argon atmosphere, and washed with m-xylene to produce 544.7 grams of the K—Fe sulfide catalyst. The K—Fe sulfide catalyst was powdered by passing the catalyst through a 40-mesh sieve.

The resulting K—Fe sulfide catalyst was analyzed using x-ray diffraction techniques. From analysis of the x-ray diffraction spectrum, it was determined that the catalyst included troilite (FeS), K—Fe sulfide ($KFeS_2$), pyrrhotite, and iron oxides (for example, magnetite, $Fe_3O_4$). A peak associated with iron disulfide (for example, pyrite, $FeS_2$) was not observed in the x-ray diffraction spectrum.

Example 2

Contact of a Crude Feed with a Hydrogen Source in the Presence of a K—Fe Sulfide Catalyst A 600 mL continuously stirred tank reactor (composed of 316 stainless steel) was fitted with a bottom inlet feed port, a single vapor effluent port, three thermocouples located in the reactor interior, and a shaftdriven 1.25-inch diameter six-blade Rushton turbine.

The K—Fe sulfide catalyst (110.3 grams) prepared as described in Example 1 was charged to the reactor. Hydrogen gas was metered at about 8,000 Nm$^3$/m$^3$ (50,000 SCFB) into the reactor and mixed with bitumen (Lloydminster region of Canada). The bitumen entered the reactor through the bottom inlet feed port to form a hydrogen/crude feed mixture. During the reaction run period of about 185 hours, hydrogen gas and crude feed were continuously fed into the reactor and product was continuously removed through the effluent vapor port of the reactor. Crude feed was fed at a rate of 67.0 g/hr to maintain the crude feed liquid level at about 60% of the reactor volume. A 50 milli-curie $^{137}$Cs gamma ray source and a sodium iodide scintillation detector were used to measure the liquid level in the reactor.

The hydrogen gas/crude feed was contacted with the catalyst at an average internal reactor temperature of 430° C. Contacting of the hydrogen/crude feed with the catalyst produced a total product in the form of the reactor effluent vapor. The reactor effluent vapor exited the vessel through the single upper exit port. The reactor head was electrically heated to 430° C. to prevent internal condensation of the reactor effluent vapor on the reactor head.

After exiting the reactor, the reactor effluent vapor was cooled and separated in a high pressure gas/liquid separator and a low-pressure gas/liquid separator to produce a liquid stream and a gas stream. The gas stream was sent to a countercurrent flow caustic scrubber to remove acidic gases, and thereafter quantified using standard chromatographic techniques. The total product included, per gram of total product, 0.918 grams of crude product and 0.089 grams of non-condensable hydrocarbon gases. About 0.027 grams of solids per gram of crude feed remained in the reactor. Properties and compositions of the crude product and the non-condensable hydrocarbon gases produced by this method are summarized in Table 1 in FIG. 8, Table 2 in FIG. 9, and Table 3 in FIG. 10.

This example demonstrates a method of contacting a crude feed with hydrogen in the presence of the transition metal sulfide catalyst to produce a total product with minimal concomitant generation of coke. The total product included a crude product that was a liquid mixture at STP and has at most 0.1 grams of non-condensable hydrocarbon gases per gram of total product.

By comparing the results of the MCR content for the crude feed (13.7 wt %) in Table 1 to the solids formed during the process (2.7 wt %), it is possible to see that the combination of the controlled conditions and the catalyst produced a lower quantity of coke than that indicated by the ASTM Method D4530.

The non-condensable hydrocarbons included $C_2$, $C_3$, and $C_4$ hydrocarbons. From the sum of the weight percentages of the $C_2$ hydrocarbons listed in Table 2 (20.5 grams), the ethylene content per gram of total $C_2$ hydrocarbons may be calculated. The $C_2$ hydrocarbons of the hydrocarbon gases included 0.073 grams of ethylene per gram of total $C_2$ hydrocarbons. From the sum of the weight percentages of the $C_3$ hydrocarbons listed in Table 2 (23.9 grams), the propene content per gram of total $C_3$ hydrocarbons may be calculated. The $C_3$ hydrocarbons of the non-condensable hydrocarbon gases included 0.21 grams of propene per gram of total $C_3$ hydrocarbons. The $C_4$ hydrocarbons of the non-condensable hydrocarbon gases had an iso-butane to n-butane weight ratio of 0.2.

This example demonstrates a method to produce a crude product that includes at least 0.001 grams of hydrocarbons with a boiling range distribution of at most 204° C. (400° F.) at 0.101 MPa, at least 0.001 grams of hydrocarbons with a boiling range distribution between about 204° C. and about 300° C. at 0.101 MPa, at least 0.001 grams of hydrocarbons with a boiling range distribution between about 300° C. and about 400° C. at 0.101 MPa, and at least 0.001 grams of hydrocarbons with a boiling range distribution between about 400° C. and about 538° C. (1,000° F.) at 0.101 MPa. The hydrocarbons that had a boiling range distribution below 204° C. included iso-paraffins and n-paraffins, and the ratio of such iso-paraffins to the n-paraffins was at most 1.4.

The crude product included boiling point distributions that are associated with naphtha, kerosene, diesel, and VGO. The crude product had at least 0.001 grams of naphtha and the naphtha portion of the crude product had an octane number of at least 70. The naphtha portion of the crude product had a benzene content of at most 0.01 grams of benzene per gram of naphtha. The naphtha portion of the crude product had at most 0.15 grams of olefins per gram of naphtha. The naphtha portion of the crude product had at least 0.1 grams of monocyclic ring aromatics per gram of naphtha.

The crude product had at least 0.001 grams of kerosene. The kerosene portion of the crude product had a freezing point below −30° C. The kerosene portion of the crude product included aromatics, and the kerosene portion of the crude product had an aromatics content of at least 0.3 grams of aromatics per gram of kerosene. The kerosene portion of the crude product had at least 0.2 grams of monocyclic ring aromatics per gram of kerosene.

The crude product had at least 0.001 grams of diesel. The diesel fraction of the crude product included aromatics, and the diesel fraction of the crude product had an aromatics content of at least 0.4 grams of aromatics per gram of diesel.

The crude product had at least 0.001 grams of VGO. The VGO portion of the crude product included aromatics, and the VGO had an aromatics content of at least 0.5 grams of aromatics per gram of VGO.

Example 3

Preparation of a K—FE Sulfide Catalyst in the Absence of Hydrocarbon Diluent

A K—Fe sulfide catalyst was prepared by combining 1000 g of iron oxide and 173 g of potassium carbonate with 423 g of de-ionized water to form a wet paste. The wet paste was processed as described in Example 1 to form the intermediate solid. The intermediate solid was passed through a 40-mesh sieve with minimal force.

In contrast to Example 2, the intermediate solid was mixed with elemental sulfur in the absence of a hydrocarbon diluent. In a dry-box using an argon atmosphere, the intermediate solid was mixed with powdered elemental sulfur, placed in a sealed carbon steel cylinder, heated to 400° C., and maintained at 400° C. for about 1 hour. The sulfurized catalyst was recovered from the carbon steel reactor as a solid. The potassium-iron sulfide catalyst was crushed to a powder using a mortar and pestle such that the resulting catalyst powder passed through a 40-mesh sieve.

The resulting potassium iron sulfide catalyst was analyzed using x-ray diffraction techniques. From analysis of the x-ray diffraction spectrum, it was determined that the catalyst included pyrite ($FeS_2$), iron sulfide (FeS), and pyrrhotite ($Fe_{1-x}S$). Mixed potassium-iron sulfide or iron oxide species were not detected using x-ray diffraction techniques.

Example 4

Contact of a Crude Feed with a Hydrogen Source in the Presence of a K—Fe Sulfide Catalyst at an Increased Ratio of Gaseous Hydrogen to Crude Feed The apparatus, crude feed, and reaction procedure were the same as in Example 2, except that the ratio of hydrogen gas to crude feed was about 16,000 Nm$^3$/m$^3$ (100,000 SCFB). The K—Fe sulfide catalyst (75.0 grams), prepared as described in Example 3, was charged to the reactor.

Properties of the crude product produced from this method are summarized in Table 1 in FIG. 8 and in Table 3 in FIG. 10. The weight percentage of VGO produced in Example 4 is greater than the weight percentage of VGO produced in Example 2. The weight percentage of distillate produced in Example 4 is less than the weight percentage of distillate produced in Example 2. The API gravity of the crude product produced in Example 4 is lower than the API gravity of the crude product produced in Example 2. A higher API gravity indicates hydrocarbons with a higher carbon number were produced.

After contact with the crude feed, the TMS catalyst in the reactor was analyzed. From this analysis, the transition metal sulfide catalyst, after being in the presence of the crude feed and hydrogen, included K$_3$Fe$_{10}$S$_{14}$.

Example 5

TAP Testing of a K$_2$CO$_3$/Rb$_2$CO$_3$/Cs$_2$CO$_3$ Catalyst and the Individual Inorganic Salts In all TAP testing, a 300 mg sample was heated in a reactor of a TAP system from room temperature (about 27° C.) to 500° C. at a rate of about 50° C. per minute. Emitted water vapor and carbon dioxide gas were monitored using a mass spectrometer of the TAP system.

Figure 11:
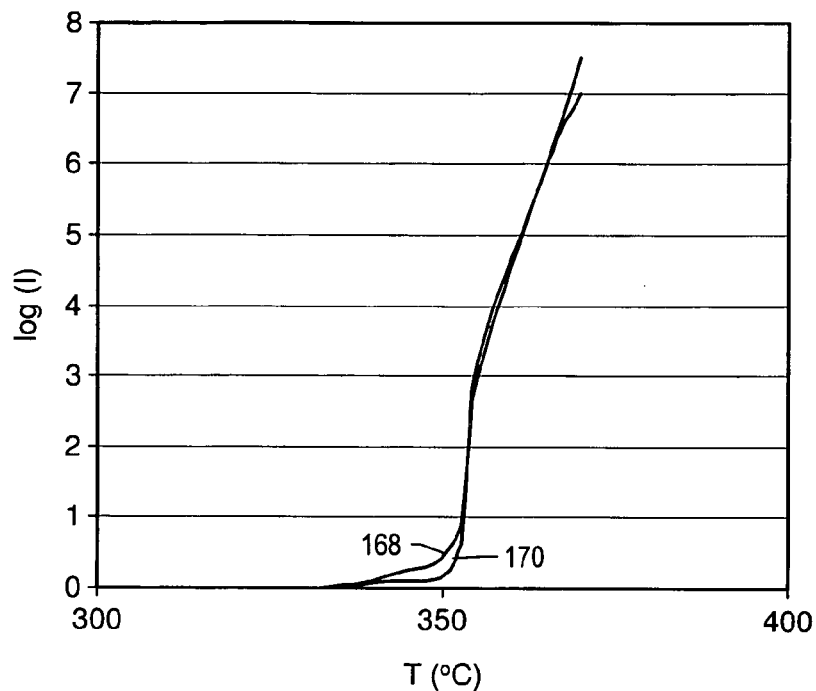
FIG. 11 is a graphical representation of log 10 plots of ion currents of emitted gases of an inorganic salt catalyst versus temperature, as determined by TAP.

The K$_2$CO$_3$/Rb$_2$CO$_3$/Cs$_2$CO$_3$ catalyst supported on alumina showed a current inflection of greater than 0.2 volts for emitted carbon dioxide and a current inflection of 0.01 volts for emitted water from the inorganic salt catalyst at about 360° C. The minimum TAP temperature was about 360° C., as determined by plotting the log 10 of the ion current versus temperature. FIG. 11 is a graphical representation of log 10 plots of ion current of emitted gases from the K$_2$CO$_3$/Rb$_2$CO$_3$/Cs$_2$CO$_3$ catalyst ("log(I)") versus temperature ("T"). Curves 168 and 170 are log 10 values for the ion currents for emitted water and CO$_2$ from the inorganic salt catalyst. Sharp inflections for emitted water and CO$_2$ from the inorganic salt catalyst occurs at about 360° C.

In contrast to the K$_2$CO$_3$/Rb$_2$CO$_3$/Cs$_2$CO$_3$ catalyst, potassium carbonate and cesium carbonate had non-detectable current inflections at 360° C. for both emitted water and carbon dioxide.

The substantial increase in emitted gas for the K$_2$CO$_3$/Rb$_2$CO$_3$/Cs$_2$CO$_3$ catalyst demonstrates that inorganic salt catalysts composed of two or more different inorganic salts may be more disordered than the individual pure carbonate salts.

Example 6

DSC Testing of an Inorganic Salt Catalyst and Individual Inorganic Salts

In all DSC testing, a 10 mg sample was heated to 520° C. at a rate of 10° C. per min, cooled from 520° C. to 0.0° C. at rate of 10° C. per minute, and then heated from 0° C. to 600° C. at a rate of 10.0° C. per min using a differential scanning calorimeter (DSC) Model DSC-7, manufactured by Perkin-Elmer (Norwalk, Conn., U.S.A.).

DSC analysis of a K$_2$CO$_3$/Rb$_2$CO$_3$/Cs$_2$CO$_3$ catalyst during second heating of the sample shows that the salt mixture exhibited a broad heat transition between 219° C. and 260° C. The midpoint of the temperature range was about 250° C. The area under heat transition curve was calculated to be −1.75 Joules per gram. The beginning of crystal disorder was determined to start at the minimum DSC temperature of 219° C.

In contrast to these results, no definite heat transitions were observed for cesium carbonate.

DSC analysis of a mixture of Li$_2$CO$_3$, Na$_2$CO$_3$, and K$_2$CO$_3$ during the second heating cycle shows that the Li$_2$CO$_3$/Na$_2$CO$_3$/K$_2$CO$_3$ mixture exhibited a sharp heat transition between 390° C. to 400° C. The midpoint of the temperature range was about 385° C. The area under heat transition curve was calculated to be −182 Joules per gram. The beginning of mobility is determined to start at the minimum DSC temperature of 390° C. The sharp heat transition indicates a substantially homogeneous mixture of salts.

Example 7

Ionic Conductivity Testing of an Inorganic Salt Catalysts or an Individual Inorganic Salt Relative to K$_2$CO$_3$ All testing was conducted by placing 3.81 cm (1.5 inches) of the inorganic salt catalysts or the individual inorganic salts in a quartz vessel with platinum or copper wires separated from each other, but immersed in the sample in a muffle furnace. The wires were connected to a 9.55 volt dry cell and a 220,000 ohm current limiting resistor. The muffle furnace was heated to 600° C. and the current was measured using a microammeter.

Figure 12:
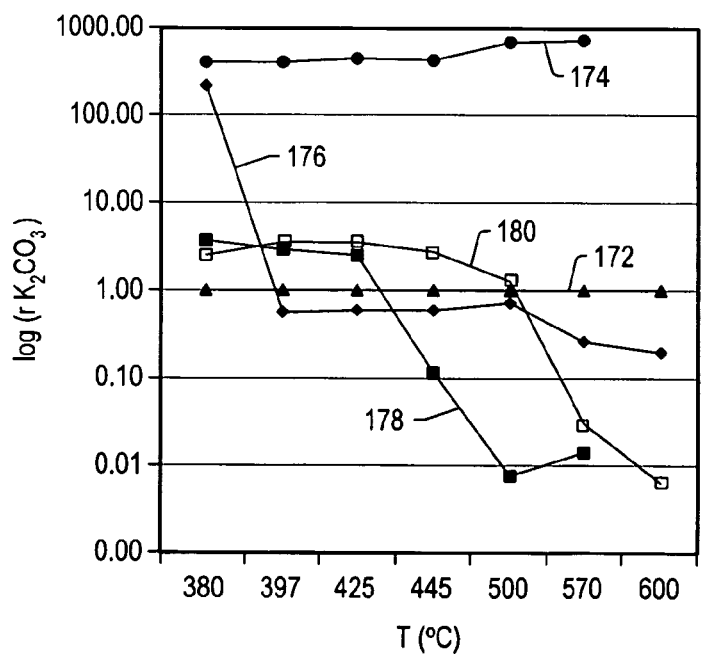
FIG. 12 is a graphic representation of log plots of the resistance of inorganic salt catalysts and an inorganic salt relative to the resistance of potassium carbonate versus temperature.

FIG. 12 is a graphical representation of log plots of the sample resistance relative to potassium carbonate resistance ("log(rK$_2$CO$_3$)") versus temperature ("T"). Curves 172, 174, 176, 178, and 180 are log plots of K$_2$CO$_3$ resistance, CaO resistance, K$_2$CO$_3$/Rb$_2$CO$_3$/Cs$_2$CO$_3$ catalyst resistance, Li$_2$CO$_3$/K$_2$CO$_3$/Rb$_2$CO$_3$/Cs$_2$CO$_3$ catalyst resistance, and Na$_2$CO$_3$/K$_2$CO$_3$/Rb$_2$CO$_3$/Cs$_2$CO$_3$ catalyst resistance, respectively.

CaO (curve 174) exhibits relatively large stable resistance relative to K$_2$CO$_3$ (curve 172) at temperatures in a range between 380-500° C. A stable resistance indicates an ordered structure and/or ions that tend not to move apart from one another during heating. The K$_2$CO$_3$/Rb$_2$CO$_3$/Cs$_2$CO$_3$ catalyst, Li$_2$CO$_3$/K$_2$CO$_3$/Rb$_2$CO$_3$/Cs$_2$CO$_3$ catalyst, and Na$_2$CO$_3$/K$_2$CO$_3$/Rb$_2$CO$_3$/Cs$_2$CO$_3$ catalyst (see curves 176, 178, and 180) show a sharp decrease in resistivity relative to K$_2$CO$_3$ at temperatures in a range from 350-500° C. A decrease in resistivity generally indicates that current flow was detected during application of voltage to the wires embedded in the inorganic salt catalyst. The data from FIG. 12 demonstrate that the inorganic salt catalysts are generally more mobile than the pure inorganic salts at temperatures in a range from 350-600° C.

Figure 13:
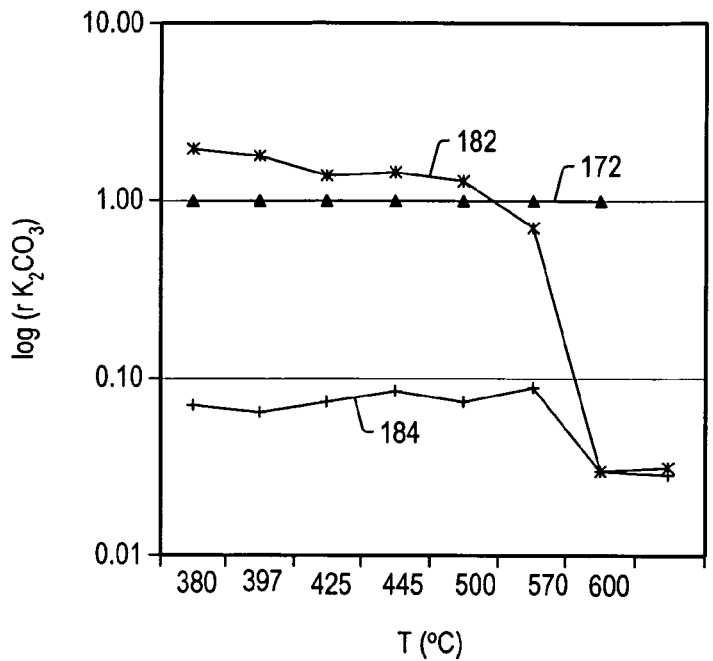
FIG. 13 is a graphic representation of log plots of the resistance of a $Na_2CO_3/K_2CO_3/Rb_2CO_3$ catalyst relative to resistance of the potassium carbonate versus temperature.

FIG. 13 is a graphical representation of log plots of Na$_2$CO$_3$/K$_2$CO$_3$/Rb$_2$CO$_3$/Cs$_2$CO$_3$ catalyst resistance relative to K$_2$CO$_3$ resistance ("log (rK$_2$CO$_3$)") versus temperature ("T"). Curve 182 is a plot of a ratio of Na$_2$CO$_3$/K$_2$CO$_3$/Rb$_2$CO$_3$/Cs$_2$CO$_3$ catalyst resistance relative to K$_2$CO$_3$ resistance (curve 172) versus temperature during heating of the Na$_2$CO$_3$/K$_2$CO$_3$/Rb$_2$CO$_3$/Cs$_2$CO$_3$ catalyst. After heating, the $Na_2CO_3/K_2CO_3/Rb_2CO_3/Cs_2CO_3$ catalyst was cooled to room temperature and then heated in the conductivity apparatus. Curve 184 is a log plot of $Na_2CO_3/K_2CO_3/Rb_2CO_3/Cs_2CO_3$ catalyst resistance relative to $K_2CO_3$ resistance versus temperature during heating of the inorganic salt catalyst after being cooled from 600° C. to 25° C. The ionic conductivity of the reheated $Na_2CO_3/K_2CO_3/Rb_2CO_3/Cs_2CO_3$ catalyst increased relative to the ionic conductivity of the original $Na_2CO_3/K_2CO_3/Rb_2CO_3/Cs_2CO_3$ catalyst.

From the difference in ionic conductivities of the inorganic salt catalyst during the first heating and second heating, it may be inferred that the inorganic salt catalyst forms a different form (a second form) upon cooling that is not the same as the form (a first form) before any heating.

Example 8

Flow Property Testing of an Inorganic Salt Catalyst

A 1-2 cm thick layer of powdered $K_2CO_3/Rb_2CO_3/Cs_2CO_3$ catalyst was placed in a quartz dish. The dish was placed in a furnace and heated to 500° C. for about 1 hour. To determine flow properties of the catalyst, the dish was manually tilted in the oven after heating. The $K_2CO_3/Rb_2CO_3/Cs_2CO_3$ catalyst did not flow. When pressed with a spatula, the catalyst had a consistency of taffy.

In contrast, the individual carbonate salts were free flowing powders under the same conditions.

A $Na_2CO_3/K_2CO_3/Rb_2CO_3/Cs_2CO_3$ catalyst became liquid and readily flowed (similar, for example, to water) in the dish under the same conditions.

Examples 9-10

Contact of a Crude Feed with a Hydrogen Source in the Presence of a $K_2CO_3/Rb_2CO_3/Cs_2CO_3$ Catalyst and Steam The following equipment and general procedure was used in Examples 9-27 except where variations are described.
Reactor:
A 250 mL Hastelloy C Parr Autoclave (Parr Model #4576) rated at 35 MPa working pressure (5000 psi) at 500° C., was fitted with a mechanical stirrer and an 800 watt Gaumer band heater on a Eurotherm controller capable of maintaining the autoclave at ±5° C. from ambient to 625° C., a gas inlet port, a steam inlet port, one outlet port, and a thermocouple to register internal temperature. Prior to heating, the top of the autoclave was insulated with glass cloth.
Addition Vessel:
An addition vessel (a 250 mL, 316 stainless steel hoke vessel) was equipped with a controlled heating system, suitable gas control valving, a pressure relief device, thermocouples, a pressure gauge, and a high temperature control valve (Swagelok Valve # SS-4UW) capable of regulating flow of a hot, viscous, and/or pressurized crude feed at a flow rate from 0-500 g/min. An outlet side of the high temperature control valve was attached to the first inlet port of the reactor after crude feed was charged to the addition vessel. Prior to use, the addition vessel line was insulated.
Product Collection:
Vapor from the reactor exited the outlet port of the reactor and was introduced into a series of cold traps of decreasing temperatures (dip tubes connected to a series of 150 mL, 316 stainless steel hoke vessels). Liquid from the vapor was condensed in the cold traps to form a gas stream and a liquid condensate stream. Flow rate of the vapor from the reactor and through the cold traps was regulated, as needed, using a back pressure regulator. A rate of flow and a total gas volume for the gas stream exiting the cold traps were measured using a wet test meter (Ritter Model # TG 05 Wet Test Meter). After exiting the wet test meter, the gas stream was collected in a gas bag (a Tedlar gas collection bag) for analysis. The gas was analyzed using GC/MS (Hewlett-Packard Model 5890, now Agilent Model 5890; manufactured by Agilent Technologies, Zion Ill., U.S.A.). The liquid condensate stream was removed from the cold traps and weighed. Crude product and water were separated from the liquid condensate stream. The crude product was weighed and analyzed.
Procedure:
Cerro Negro (137.5 grams) was charged to the addition vessel. The crude feed had an API gravity of 6.7. The crude feed had, per gram of crude feed, a sulfur content of 0.042 grams, a nitrogen content of 0.011 grams, and a total Ni/V content of 0.009 grams. The crude feed was heated to 150° C. The $K_2CO_3/Rb_2CO_3/Cs_2CO_3$ catalyst (31.39 grams) was charged to the reactor.

The $K_2CO_3/Rb_2CO_3/Cs_2CO_3$ catalyst was prepared by combining of 16.44 grams of $K_2CO_3$, 19.44 grams of $Rb_2CO_3$, and 24.49 grams of $Cs_2CO_3$. The $K_2CO_3/Rb_2CO_3/Cs_2CO_3$ catalyst had a minimum TAP temperature of 360° C. The $K_2CO_3/Rb_2CO_3/Cs_2CO_3$ catalyst had a DSC temperature of 250° C. The individual salts ($K_2CO_3$, $Rb_2CO_3$, and $Cs_2CO_3$) did not exhibit DSC temperatures in a range from 50-500° C. This TAP temperature is above the DSC temperature of the inorganic salt catalyst and below the DSC temperature of the individual metal carbonates.

The catalyst was heated rapidly to 450° C. under an atmospheric pressure flow of methane of 250 $cm^3$/min. After reaching the desired reaction temperature, steam at a rate of 0.4 mL/min, and methane at rate of 250 $cm^3$/min, was metered to the reactor. The steam and methane were continuously metered during the addition of the crude feed to the reactor over about 2.6 hours. The crude feed was pressurized into the reactor using 1.5 MPa (229 psi) of $CH_4$ over 16 minutes. Residual crude feed (0.56 grams) remained in the addition vessel after the addition of the crude feed was complete. A decrease in temperature to 370° C. was observed during the addition of the crude feed.

The catalyst/crude feed mixture was heated to a reaction temperature of 450° C. and maintained at that temperature for about 2 hours. After two hours, the reactor was cooled and the resulting residue/catalyst mixture was weighed to determine a percentage of coke produced and/or not consumed in the reaction.

From a difference in initial catalyst weight and coke/catalyst mixture weight, 0.046 grams of coke remained in the reactor per gram of crude feed. The total product included 0.87 grams of a crude product with an average API gravity of 13 and gas. The gas included unreacted $CH_4$, hydrogen, $C_2$ and $C_4$-$C_6$ hydrocarbons, and $CO_2$ (0.08 grams of $CO_2$ per gram of gas).

The crude product had, per gram of crude product, 0.01 grams of sulfur and 0.000005 grams of a total Ni and V. The crude product was not further analyzed.

In Example 10, the reaction procedures, conditions, crude feed, and catalyst were the same as in Example 9. The crude product of Example 10 was analyzed to determine boiling range distributions for the crude product. The crude product had, per gram of crude product, 0.14 grams of naphtha, 0.19 grams of distillate, 0.45 grams of VGO, and residue content of 0.001 grams, and non-detectable amounts of coke.

Examples 9 and 10 demonstrate that contact of the crude feed with a hydrogen source in the presence of at most 3 grams of catalyst per 100 grams of crude feed produces a total product that includes a crude product that is a liquid mixture at STP. The crude product had a residue content of at most 30% of the residue content of the crude feed. The crude product had a sulfur content and total Ni/V content of at most 90% of the sulfur content and Ni/V content of the crude feed.

The crude product included at least 0.001 grams of hydrocarbons with a boiling range distribution of at most 200° C. at 0.101 MPa, at least 0.001 grams of hydrocarbons with a boiling range distribution between 200-300° C. at 0.101 MPa, at least 0.001 grams of hydrocarbons with a boiling range distribution between 400-538° C. (1000° F.) at 0.101 MPa.

Examples 11-12

Figure 14:
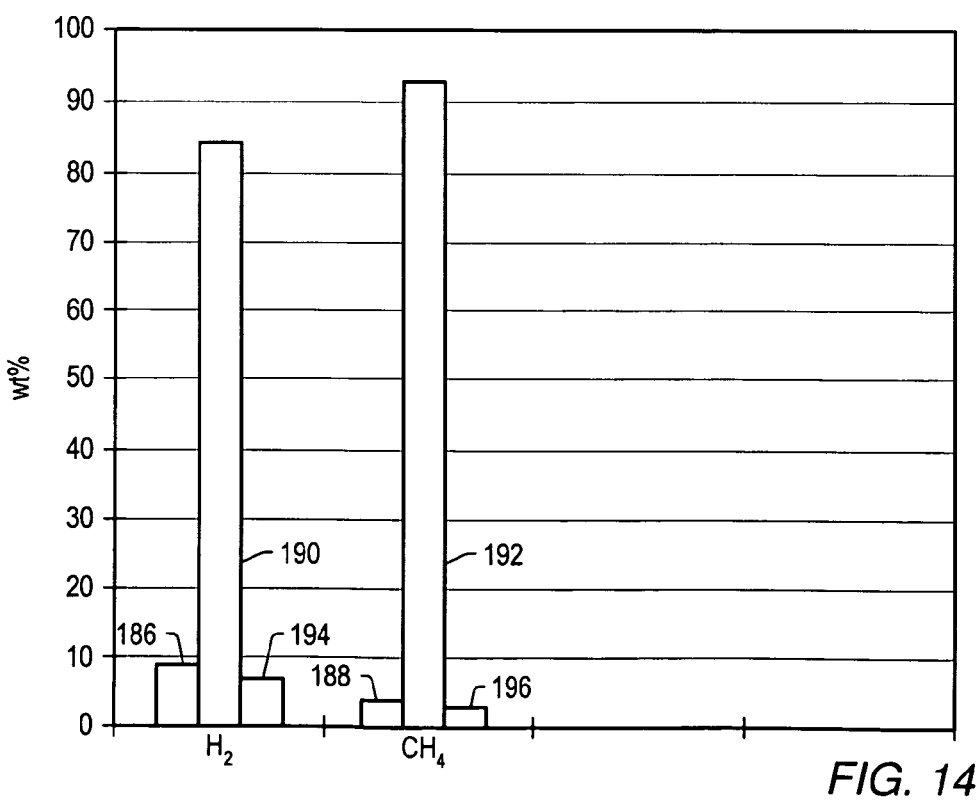
FIG. 14 is a graphical representation of weight percent of coke, liquid hydrocarbons, and gas versus various hydrogen sources produced from embodiments of contacting the crude feed with the inorganic salt catalyst.

Contact of a Crude Feed with a Hydrogen Source in the Presence of the $K_2CO_3/Rb_2CO_3/Cs_2CO_3$ Catalyst and Steam The reaction procedures, conditions, and the $K_2CO_3/Rb_2CO_3/Cs_2CO_3$ catalyst in Examples 11 and 12 were the same as in Example 9, except that 130 grams of crude feed (Cerro Negro) and 60 grams of the $K_2CO_3/Rb_2CO_3/Cs_2CO_3$ catalyst were used. In Example 11, methane was used as the hydrogen source. In Example 12, hydrogen gas was used as the hydrogen source. A graphical representation of the amounts of non-condensable gas, crude product, and coke is depicted in FIG. 14. Bars 186 and 188 represent wt % coke produced, bars 190 and 192 represent wt % liquid hydrocarbons produced, and bars 194 and 196 represent wt % gas produced, based on the weight of the crude feed.

In Example 11, 93 wt % of crude product (bar 192), 3 wt % of gas (bar 196), and 4 wt % of coke (bar 188), based on the weight of the Cerro Negro, was produced.

In Example 12, 84 wt % of crude product (bar 190), 7 wt % of gas (bar 194), and 9 wt % of coke were produced (bar 186), based on the weight of the Cerro Negro.

Examples 11 and 12 provide a comparison of the use of methane as a hydrogen source to the use of hydrogen gas as a hydrogen source. Methane is generally less expensive to produce and/or transport than hydrogen, thus a process that utilizes methane is desirable. As demonstrated, methane is at least as effective as hydrogen gas as a hydrogen source when contacting a crude feed in the presence of an inorganic salt catalyst to produce a total product.

Examples 13-14

Producing a Crude Product with a Selected API Gravity

The apparatus, reaction procedure and the inorganic salt catalyst were the same as in Example 9, except that the reactor pressure was varied.

Figure 15:
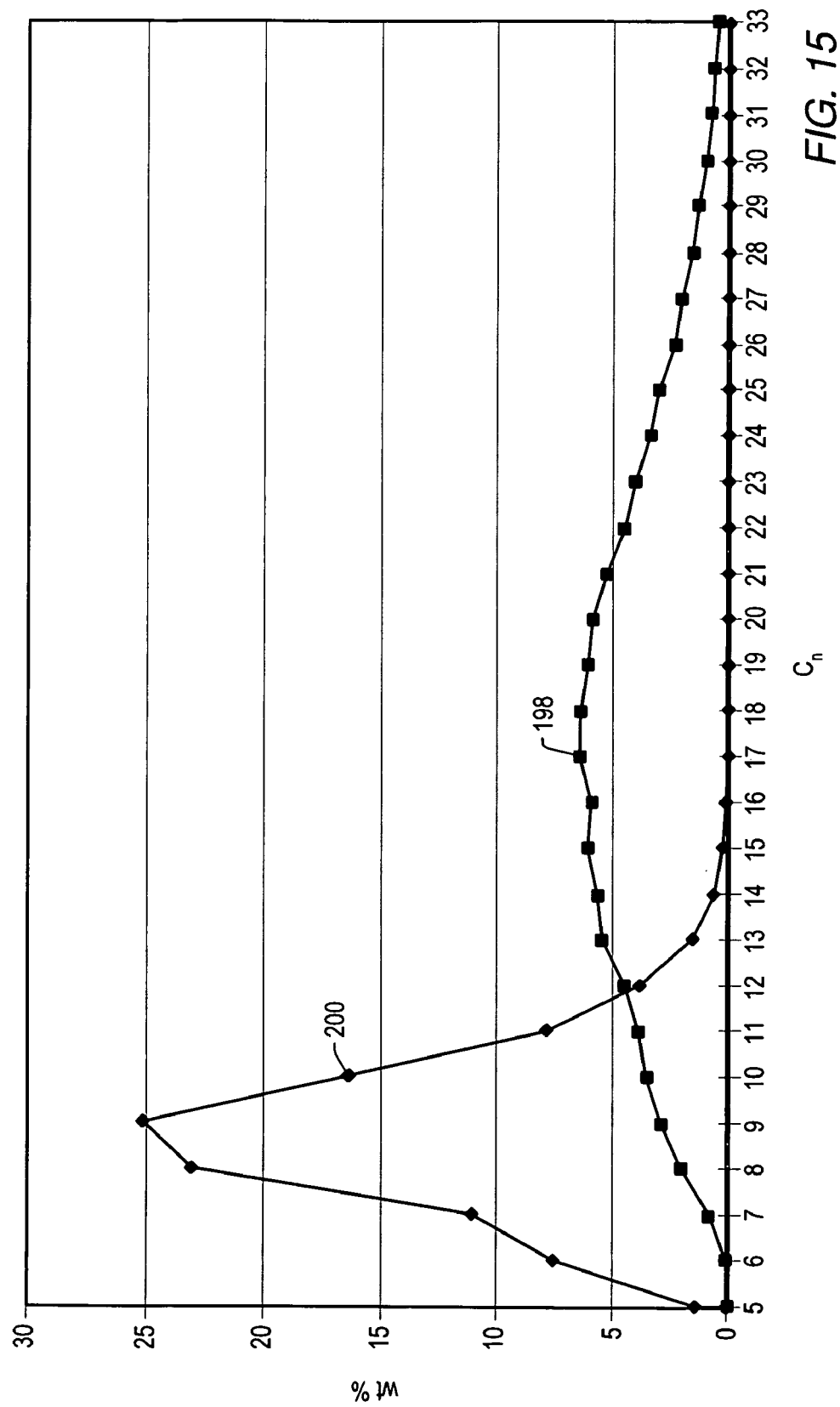
FIG. 15 is a graphical representation of weight percentage versus carbon number of crude products produced from embodiments of contacting the crude feed with the inorganic salt catalyst.

Example 13, the reactor pressure was 0.1 MPa (14.7 psi) during the contacting period. A crude product with API gravity of 25 at 15.5° C. was produced. The total product had hydrocarbons with a distribution of carbon numbers in a range from 5 to 32 (see curve 198 in FIG. 15).

In Example 14, the reactor pressure was 3.4 MPa (514.7 psi) during the contacting period. A crude product with API gravity of 51.6 at 15.5° C. was produced. The total product had hydrocarbons with a distribution of carbon numbers in a range from 5 to 15 (see curve 200 in FIG. 15).

These examples demonstrate methods for contacting the crude feed with hydrogen in the presence of an inorganic salt catalyst at various pressures to produce a crude product with a selected API gravity. By varying the pressure, a crude product with a higher or lower API gravity was produced.

Examples 15-16

Contact of a Crude Feed in the Presence of a $K_2CO_3/Rb_2CO_3/Cs_2CO_3$ Catalyst or Silicon Carbide in the Absence of an External Hydrogen Source In Examples 15 and 16, the apparatus, crude feed, and reaction procedure were the same as in Example 9, except that the crude feed and catalyst (or silicon carbide) were directly charged into the reactor at the same time. Carbon dioxide ($CO_2$) was used as a carrier gas. In Example 15, 138 grams of Cerro Negro was combined with 60.4 grams of the $K_2CO_3/Rb_2CO_3/Cs_2CO_3$ catalyst (same catalyst as in Example 9). In Example 16, 132 g of Cerro Negro was combined with 83.13 grams of silicon carbide (40 mesh, Stanford Materials; Aliso Viejo, Calif.). Such silicon carbide is believed to have low, if any, catalytic properties under the process conditions described herein.

In each example, the mixture was heated to a reaction temperature of 500° C. over a period of about 2 hours. The $CO_2$ was metered into the reactor at a rate of 100 cm³/min. Vapor generated from the reactor was collected in the cold traps and a gas bag using a back pressure of about 3.2 MPa (479.7 psi). Crude product from the cold traps was consolidated and analyzed.

In Example 15, 36.82 grams (26.68 wt %, based on the weight of the crude feed) of a colorless hydrocarbon liquid with API gravity of at least 50 was produced from contact of the crude feed with the inorganic salt catalyst in the carbon dioxide atmosphere.

In Example 16, 15.78 grams (11.95 wt %, based on the weight of the crude feed) of a yellow hydrocarbon liquid with an API gravity of 12 was produced from contact of the crude feed with silicon carbide in the carbon dioxide atmosphere.

Although the yield in Example 15 is low, the in-situ generation of a hydrogen source in the presence of the inorganic salt catalyst is greater than the in-situ generation of hydrogen under non-catalytic conditions. The yield of crude product in Example 16 is one-half of the yield of crude product in Example 15. Example 15 also demonstrates that hydrogen is generated during contact of the crude feed in the presence of the inorganic salt and in the absence of a gaseous hydrogen source.

Examples 17-20

Contact of a Crude Feed with a Hydrogen Source in the Presence of $K_2CO_3/Rb_2CO_3/Cs_2CO_3$ Catalyst, Calcium Oxide, and Silicon Carbide at Atmospheric Conditions The apparatus, reaction procedure, crude feed and the inorganic salt catalyst were the same as in Example 9, except that the Cerro Negro was added directly to the reactor instead of addition through the addition vessel and hydrogen gas was used as the hydrogen source. The reactor pressure was 0.101 MPa (14.7 psi) during the contacting period. The hydrogen gas flow rate was 250 cm³/min. Reaction temperatures, steam flow rates, and percentages of crude product, gas, and coke produced are tabulated in Table 4 in FIG. 16.

In Examples 17 and 18, the $K_2CO_3/Rb_2CO_3/Cs_2CO_3$ catalyst was used. In Example 17, the contacting temperature was 375° C. In Example 18, the contacting temperature was in a temperature range from 500-600° C.

As shown in Table 4 (FIG. 16), for Examples 17 and 18, when the temperature was increased from 375° C. to 500° C., production of gas increased from 0.02 grams to 0.05 grams of gas per gram of total product. Coke production, however, decreased from 0.17 grams to 0.09 grams of coke per gram of crude feed at the higher temperature. The sulfur content of the crude product also decreased from 0.01 grams to 0.008 grams of sulfur per gram of crude product at the higher temperature. Both crude products had H/C of 1.8.

In Example 19, a crude feed was contacted with $CaCO_3$ under conditions similar to the conditions described for Example 18. Percentages of crude product, gas, and coke production are tabulated in Table 4 in FIG. 16. Gas production increased in Example 19 relative to the gas production in Example 18. Desulfurization of the crude feed was not as effective as in Example 18. The crude product produced in Example 19 had, per gram of crude product, 0.01 grams of sulfur as compared to the sulfur content of 0.008 grams per gram of crude product for the crude product produced in Example 18.

Example 20 is a comparative example for Example 18. In Example 20, 83.13 grams of silicon carbide instead of the inorganic salt catalyst was charged to the reactor. Gas production and coke production significantly increased in Example 20 relative to the gas production and coke production in Example 18. Under these non-catalytic conditions, 0.22 grams of coke per gram of crude product, 0.25 grams of non-condensable gas, and 0.5 grams of crude product were produced. The crude product produced in Example 20 had 0.036 grams of sulfur per gram of crude product, compared to of 0.01 grams of sulfur per gram of crude product produced in Example 18.

These examples demonstrated that the catalysts used in Examples 17 and 18 provide improved results over non-catalytic conditions and conventional metal salts. At 500° C., and a hydrogen flow rate of 250 $cm^3$/min, the amounts of coke and non-condensable gas were significantly lower than the amounts of coke and of non-condensable gas produced under non-catalytic conditions.

In examples using inorganic salt catalysts (See Examples 17-18 in Table 4, FIG. 16), a decrease was observed in the weight percent of produced gas relative to the produced gas formed during the control experiment (for example, Example 20 in Table 4, FIG. 16). From the quantity of hydrocarbons in the produced gas, the thermal cracking of the crude feed is estimated to be at most 20 wt %, at most 15 wt %, at most 10 wt %, at most 5 wt %, or none, based on the total amount of crude feed contacted with a hydrogen source.

Examples 21 and 22

Contact of a Crude Feed with a Gaseous Hydrogen Source in the Presence of Water and a $K_2CO_3$/$Rb_2CO_3$/$Cs_2CO_3$ Catalyst or Silicon Carbide Apparatus in Examples 21 and 22 were the same as in Example 9 except that hydrogen gas was used as the hydrogen source. In Example 21, 130.4 grams of Cerro Negro was combined with 30.88 grams of the $K_2CO_3$/$Rb_2CO_3$/$Cs_2CO_3$ catalyst to form a crude feed mixture. In Example 22, 139.6 grams of Cerro Negro was combined with 80.14 grams of silicon carbide to form the crude feed mixture.

The crude feed mixture was charged directly into the reactor. The hydrogen gas was metered at 250 $cm^3$/min into the reactor during the heating and holding periods. The crude feed mixture was heated to 300° C. over about 1.5 hours and maintained at 300° C. for about 1 hour. The reaction temperature was increased to 400° C. over about 1 hour and maintained at 400° C. for about 1 hour. After the reaction temperature reached 400° C., water was introduced into the reactor at a rate of 0.4 g/min in combination with the hydrogen gas. Water and hydrogen were metered into the reactor for the remaining heating and holding periods. After maintaining the reaction mixture at 400° C., the reaction temperature was increased to 500° C. and maintained at 500° C. for about 2 hours. Generated vapor from the reactor was collected in the cold traps and a gas bag. Liquid product from the cold traps was consolidated and analyzed.

In Example 21, 86.17 grams (66.1 wt %, based on the weight of the crude feed) of a dark reddish brown hydrocarbon liquid (crude product) and water (97.5 g) were produced as a vapor from contact of the crude feed with the $K_2CO_3$/$Rb_2CO_3$/$Cs_2CO_3$ catalyst in the hydrogen atmosphere.

In Example 22, water vapor and a small amount of gas was produced from the reactor. The reactor was inspected, and a dark brown viscous hydrocarbon liquid was removed from the reactor. Less than 50 wt % of the dark brown viscous liquid was produced from contact of the crude feed with silicon carbide in the hydrogen atmosphere. A 25% increase in yield of crude product was observed in Example 21 relative to a yield of crude product produced in Example 22.

Example 21 demonstrates an improvement of the properties of the crude product produced using methods described herein relative to a crude product produced using hot water. Specifically, the crude product in Example 21 was lower boiling than the crude product from Example 22, as demonstrated by the crude product produced in Example 22 not being able to be produced as a vapor. The crude product produced in Example 21 had enhanced flow properties relative to the crude product produced in Example 22, as determined by visual inspection.

Examples 23-24

Contact of a Crude Feed with a Hydrogen Source in the Presence of a $K_2CO_3$/$Rb_2CO_3$/$Cs_2CO_3$ Catalyst to Produce a Crude Product with Increased Volume Relative to a Crude Product Volume Produced Under Non-Catalytic Conditions The apparatus, crude feed, inorganic catalyst, and reaction procedure was the same as described in Example 9, except the crude feed was directly charged to the reactor and hydrogen gas was used as the hydrogen source. The crude feed (Cerro Negro) had an API gravity 6.7 and a density of 1.02 g/mL at 15.5° C.

In Example 23, 102 grams of the crude feed (about 100 mL of crude feed) and 31 grams of $K_2CO_3$/$Rb_2CO_3$/$Cs_2CO_3$ catalyst were charged to the reactor. A crude product (87.6 grams) with an API gravity of 50 and a density of 0.7796 g/mL at 15.5° C. (112 mL) was produced.

In Example 24, 102 grams of crude feed (about 100 mL of crude feed) and 80 grams of silicon carbide were charged to the reactor. A crude product (70 grams) of with an API gravity of 12 and a density of 0.9861 g/mL at 15.5° C. (about 70 mL) was produced.

Under these conditions, the volume of the crude product produced from Example 23 was approximately 10% greater than the volume of the crude feed. The volume of the crude product produced in Example 24 was significantly less (40% less) than the volume of crude product produced in Example 23. A significant increase in volume of product enhances a producer's ability to generate more volume of crude product per volume of input crude.

Example 25

Contact of a Crude Feed with a Hydrogen Source in the Presence of a $K_2CO_3/Rb_2CO_3/Cs_2CO_3$ Catalyst, Sulfur, and Coke The apparatus and reaction procedure were the same as in Example 9, except that the steam was metered into the reactor at 300 cm³/min. The $K_2CO_3/Rb_2CO_3/Cs_2CO_3$ catalyst was prepared by combining 27.2 grams of $K_2CO_3$, 32.2 grams of $Rb_2CO_3$ and 40.6 grams of $Cs_2CO_3$.

The crude feed (130.35 grams) and $K_2CO_3/Rb_2CO_3/Cs_2CO_3$ catalyst (31.6 grams) was charged to the reactor. The Cerro Negro crude included, per gram of crude feed, 0.04 grams total aromatics content in a boiling range distribution between 149-260° C. (300-500° F.), 0.000640 grams of nickel and vanadium combined, 0.042 grams of sulfur, and 0.56 grams of residue. API gravity of the crude feed was 6.7.

Contact of the crude feed with methane in the presence of the $K_2CO_3/Rb_2CO_3/Cs_2CO_3$ catalyst produced, per gram of crude feed, 0.95 grams of total product, and 0.041 grams of coke.

The total product included, per gram of total product, 0.91 grams of crude product and 0.028 grams of hydrocarbon gas. The total gas collected included, per mole of gas, 0.16 moles of hydrogen, 0.045 moles of carbon dioxide, and 0.025 moles of $C_2$ and $C_4$-$C_6$ hydrocarbons, as determined by GC/MS. The balance of the gas was methane, air, carbon monoxide, and a trace (0.004 moles) of evaporated crude product.

The crude product was analyzed using a combination of gas chromatography and mass spectrometry. The crude product included a mixture of hydrocarbons with a boiling range between 100-538° C. The total liquid product mixture included 0.006 grams ethyl benzene (a monocyclic ring compound with a boiling point of 136.2° C. at 0.101 MPa) per gram of mixture. This product was not detected in the crude feed.

The used catalyst ("first used catalyst") was removed from the reactor, weighed, and then analyzed. The first used catalyst had an increase in weight from 31.6 grams to a total weight of 37.38 grams (an increase of 18 wt %, based on the weight of the original $K_2CO_3/Rb_2CO_3/Cs_2CO_3$ catalyst). The first used catalyst included 0.15 grams of additional coke, 0.0035 grams of sulfur, 0.0014 grams of Ni/V, and 0.845 grams of $K_2CO_3/Rb_2CO_3/Cs_2CO_3$ per gram of used catalyst.

Additional crude feed (152.71 grams) was contacted with the first used catalyst (36.63 grams) to produce 150 grams of recovered total product after losses. The total product included, per gram of total product, 0.92 grams of liquid crude product, 0.058 grams of additional coke, and 0.017 grams of gas. The gas included, per mole of gas, 0.18 moles of hydrogen, 0.07 grams of carbon dioxide, and 0.035 moles of $C_2$-$C_6$ hydrocarbons. The balance of the gas was methane, nitrogen, some air, and traces of evaporated oil product (<1% mole).

The crude product included a mixture of hydrocarbons with a boiling range between 100-538° C. The portion of the mixture with a boiling range distribution below 149° C. included, per mole of total liquid hydrocarbons, 0.018 mole % of ethyl benzene, 0.04 mole % of toluene, 0.03 mole % of meta-xylene, and 0.060 mole % of para-xylene (monocyclic ring compounds with boiling points below 149° C. at 0.101 MPa). These products were not detectable in the crude feed.

The used catalyst ("second used catalyst") was removed from the reactor, weighed, and then analyzed. The second used catalyst had an increase in weight from 36.63 grams to a total weight of 45.44 grams (an increase of 43 wt %, based on the weight of the original $K_2CO_3/Rb_2CO_3/Cs_2CO_3$ catalyst). The second used catalyst included 0.32 grams of coke, and 0.01 grams of sulfur, and 0.67 grams per gram of second used catalyst.

Additional crude feed (104 grams) was contacted with the second used catalyst (44.84 grams) to produce, per gram of crude feed, 104 grams of total product and 0.114 grams of coke was collected. A portion of the coke was attributed to coke formation in the addition vessel due to overheating the addition vessel since 104.1 grams of the 133 grams of crude feed transferred was crude feed.

The total product included, per gram of total product, 0.86 grams of crude product and 0.025 grams of hydrocarbon gas. The total gas included, per mole of gas, 0.18 moles of hydrogen, 0.052 moles of carbon dioxide, and 0.03 moles of $C_2$-$C_6$ hydrocarbons. The balance of the gas was methane, air, carbon monoxide, hydrogen sulfide, and a small trace of evaporated oil.

The crude product included a mixture of hydrocarbons with a boiling range between 100-538° C. The portion of the mixture with a boiling range distribution below 149° C. included, per gram of hydrocarbon mixture, 0.021 grams ethyl benzene, 0.027 grams of toluene, 0.042 grams of meta-xylene, and 0.020 grams of para-xylene, determined as before by GC/MS.

The used catalyst ("third used catalyst") was removed from the reactor, weighed, and then analyzed. The third used catalyst had an increase in weight from 44.84 grams to a total weight of 56.59 grams (an increase of 79 wt %, based on the weight of the original $K_2CO_3/Rb_2CO_3/Cs_2CO_3$ catalyst). Detailed elemental analysis of the third used catalyst was performed. The third used catalyst included, per gram of additional matter, 0.90 grams of carbon, 0.028 grams of hydrogen, 0.0025 grams of oxygen, 0.046 grams of sulfur, 0.017 grams of nitrogen, 0.0018 grams of vanadium, 0.0007 grams of nickel, 0.0015 grams of iron, and 0.00025 grams of chloride with the balance being other transition metals such as chromium, titanium and zirconium.

As demonstrated in this example, coke, sulfur, and/or metals deposited on and/or in the inorganic salt catalyst do not affect the overall yield of crude product (at least 80% for each run) produced by contact of a crude feed with a hydrogen source in the presence of the inorganic salt catalyst. The crude product had a monocyclic aromatics content at least 100 times the monocyclic ring aromatics content of the crude feed in a boiling range distribution below 149° C.

For the three runs, the average crude product yield (based on the weight of the crude feed) was 89.7 wt %, with a standard deviation of 2.6%; the average coke yield was 7.5 wt % (based on the weight of the crude feed), with a standard deviation of 2.7%, and the average weight yield of gaseous cracked hydrocarbons was 2.3 wt % (based on the weight of the crude feed) with a standard deviation of 0.46%. The comparatively large standard deviation of both liquid and coke was due to the third trial, in which the temperature controller of the feed vessel failed, overheating the crude feed in the addition vessel. Even so, there is no apparent significant deleterious effect of even the large amounts of coke tested here on the activity of the catalyst system.

The ratio of $C_2$ olefins to total $C_2$ was 0.19. The ratio of $C_3$ olefin to total $C_3$ was 0.4. The alpha olefins to internal olefins ratio of the $C_4$ hydrocarbons was 0.61. The $C_4$ cis/trans olefins ratio was 6.34. This ratio was substantially higher than the predicted thermodynamic $C_4$ cis/trans olefins ratio of 0.68. The alpha olefins to internal olefins ratio of the $C_5$ hydrocarbons was 0.92. This ratio was greater than the predicted thermodynamic $C_5$ alpha olefins to $C_5$ internal olefins ratio of 0.194. The $C_5$ cis/trans olefins ratio was 1.25. This ratio was greater than the predicted thermodynamic $C_5$ cis/trans olefins ratio of 0.9.

Example 26

Contact of a Relatively High Sulfur Containing Crude Feed with a Hydrogen Source in the Presence of the $K_2CO_3/Rb_2CO_3/Cs_2CO_3$ Catalyst The apparatus and reaction procedure were the same as described in Example 9, except that the crude feed, methane, and steam were continuously fed to the reactor. The level of feed in the reactor was monitored using a change in weight of the reactor. Methane gas was continuously metered at 500 cm³/min to the reactor. Steam was continuously metered at 6 g/min to the reactor.

The inorganic salt catalyst was prepared by combining 27.2 grams of $K_2CO_3$, 32.2 grams of $Rb_2CO_3$ and 40.6 grams of $Cs_2CO_3$. The $K_2CO_3/Rb_2CO_3/Cs_2CO_3$ catalyst (59.88 grams) was charged to the reactor.

A crude feed (bitumen, Lloydminster, Canada) having an API gravity of 9.4, a sulfur content of 0.02 grams of sulfur, and a residue content of 0.40 grams, per gram of crude feed, was heated in the addition vessel to 150° C. The hot bitumen was continuously metered from the addition vessel at 10.5 g/min to the reactor in an attempt to maintain the crude feed liquid level of 50% of the reactor volume, however, the rate was insufficient to maintain that level.

The methane/steam/crude feed was contacted with the catalyst at an average internal reactor temperature of 456° C. Contacting of the methane/steam/crude feed with the catalyst produced a total product (in this example in the form of the reactor effluent vapor).

A total of 1640 grams of crude feed was processed over 6 hours. From a difference in initial catalyst weight and residue/catalyst mixture weight, 0.085 grams of coke per gram of crude feed remained in the reactor. From contact of the crude feed with the methane in the presence of the $K_2CO_3/Rb_2CO_3/Cs_2CO_3$ catalyst, 0.93 grams of total product per gram of crude feed was produced. The total product included, per gram of total product, 0.03 grams of gas and 0.97 grams of crude product, excluding the amount of methane and water used in the reaction.

The gas included, per gram of gas, 0.014 grams of hydrogen, 0.018 grams of carbon monoxide, 0.08 grams of carbon dioxide, 0.13 grams of hydrogen sulfide, and 0.68 grams of non-condensable hydrocarbons. From the amount of hydrogen sulfide generated, it may be estimated that the sulfur content of the crude feed was reduced by 18 wt %. As shown in this example, hydrogen, carbon monoxide, and carbon dioxide were produced. The molar ratio of carbon monoxide to carbon dioxide was 0.4.

The $C_2$-$C_5$ hydrocarbons included, per gram of hydrocarbons, 0.30 grams of $C_2$ compounds, 0.32 grams of $C_3$ compounds, 0.26 grams of $C_4$ compounds, and 0.10 grams of $C_5$ compounds. The weight ratio of iso-pentane to n-pentane in the non-condensable hydrocarbons was 0.3. The weight ratio of isobutane to n-butane in the non-condensable hydrocarbons was 0.189. The $C_4$ compounds had, per gram of $C_4$ compounds, a butadiene content of 0.003 grams. A weight ratio of alpha $C_4$ olefins to internal $C_4$ olefins was 0.75. A weight ratio of alpha $C_5$ olefins to internal $C_5$ olefins was 1.08.

The data in Example 25 demonstrates that continuous processing of a relatively high sulfur crude feed with the same catalyst in the presence of coke did not diminish the activity of the inorganic salt catalyst, and produced a crude product suitable for transportation.

Example 27

Contact of a Crude Feed with a Hydrogen Source in the Presence of a $K_2CO_3/Rb_2CO_3/Cs_2CO_3$ Catalyst and Coke The apparatus and reaction procedure was performed using conditions as described in Example 26. The $K_2CO_3/Rb_2CO_3/Cs_2CO_3$ catalyst (56.5 grams) was charged to the reactor. A total of 2550 grams of crude feed was processed over 6 hours. From a difference in initial catalyst weight and residue/catalyst mixture weight, 0.114 grams of coke per gram of crude feed remained in the reactor, based on the weight of the crude feed. A total of 0.89 grams of total product per gram of crude feed was produced. The total product included, per gram of total product, 0.04 grams of gas and 0.96 grams of crude product, excluding the amount of methane and water used in the reaction.

The gas included, per gram of gas, 0.021 grams of hydrogen, 0.018 grams of carbon monoxide, 0.052 grams of carbon dioxide, 0.18 grams of hydrogen sulfide, and 0.65 grams of non-condensable hydrocarbons. From the amount of hydrogen sulfide produced, it may be estimated that the sulfur content of the crude feed was reduced by 14 wt %, based on the weight of the crude feed. As shown in this example, hydrogen, carbon monoxide, and carbon dioxide were produced. The molar ratio of carbon monoxide to carbon dioxide was 0.6.

The $C_2$-$C_6$ hydrocarbons included, per gram of $C_2$-$C_6$ hydrocarbons, 0.44 grams of $C_2$ compounds, 0.31 grams of $C_3$ compounds, 0.19 grams of $C_4$ compound and 0.068 grams of $C_5$ compounds. The weight ratio of iso-pentane to n-pentane in the non-condensable hydrocarbons was 0.25. The weight ratio of iso-butane to n-butane in the non-condensable hydrocarbons was 0.15. The $C_4$ compounds had, per gram of $C_4$ compounds, a butadiene content of 0.003 grams.

This example demonstrates that repeated processing of the a relatively high sulfur crude feed (2550 grams of crude feed) with the same catalyst (56.5 grams) in the presence of coke did not diminish the activity of the inorganic salt catalyst, and produced a crude product suitable for transportation.

In this patent, certain U.S. patents have been incorporated by reference. The text of such U.S. patents is, however, only incorporated by reference to the extent that no conflict exists between such text and the other statements and drawings set forth herein. In the event of such conflict, then any such conflicting text in such incorporated by reference U.S. patents is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A crude product having, per gram of crude product:
   at least 0.001 grams of naphtha, the naphtha having an octane number of at least 70, and the naphtha having at most 0.15 grams of olefins per gram of naphtha, as determined by ASTM Method D6730;
   at least 0.001 grams of kerosene, the kerosene having at least 0.2 grams of aromatics per gram of kerosene, as determined by ASTM D5186, and the kerosene having a freezing point at a temperature of at most −30° C., as determined by ASTM Method D2386; and
   at most 0.05 grams of residue, as determined by ASTM Method D5307.

2. The crude product of claim 1, wherein the crude product also has at least 0.001 grams of diesel per gram of crude product, and the diesel has at least 0.3 grams of aromatics per gram of diesel, as determined by ASTM Method D5186.

3. The crude product of claim 1, wherein the crude product also has at least 0.001 grams of VGO per gram of crude product, and the VGO has at least 0.3 grams of aromatics per gram of VGO, as determined by IP Method 368/90.

4. The crude product of claim 1, wherein the naphtha also has at most 0.01 grams of benzene per gram of naphtha, as determined by ASTM Method D6730.

5. The crude product of claim 1, wherein the naphtha further comprises iso-paraffins and n-paraffins with a weight ratio of the iso-paraffins to the n-paraffins of at most 1.4, as determined by ASTM Method D6730.

6. The crude product of claim 1, wherein the crude product also has from about 0.09 to about 0.13 grams of atomic hydrogen per gram of crude product.

7. The crude product of claim 1, wherein the crude product has a weight ratio of atomic hydrogen to atomic carbon of at most 1.75.

8. A method, comprising processing the crude product of claim 1 to produce a transportation fuel.

9. The method of claim 8, wherein the processing comprises distilling the crude product into one or more distillate fractions.

10. The method of claim 8, wherein the processing comprises hydrotreating.

* * * * *